US012694594B2

(12) United States Patent
Hellge et al.

(10) Patent No.: US 12,694,594 B2
(45) Date of Patent: Jul. 28, 2026

(54) ENCODER, DECODER AND SCENE DESCRIPTION DATA SUPPORTING MULTIPLE ANIMATIONS AND/OR MOVEMENTS FOR AN OBJECT

(71) Applicant: Fraunhofer-Gesellschaft zur Foerderung der angewandten Forschung e.V., Munich (DE)

(72) Inventors: Cornelius Hellge, Berlin (DE); Thomas Schierl, Berlin (DE); Peter Eisert, Berlin (DE); Anna Hilsmann, Berlin (DE); Robert Skupin, Berlin (DE); Yago Sánchez De La Fuente, Berlin (DE); Wieland Morgenstern, Berlin (DE); Gurdeep Singh Bhullar, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 170 days.

(21) Appl. No.: 18/334,586

(22) Filed: Jun. 14, 2023

(65) Prior Publication Data
US 2023/0326113 A1      Oct. 12, 2023

Related U.S. Application Data

(63) Continuation of application No. PCT/EP2021/085540, filed on Dec. 13, 2021.

(30) Foreign Application Priority Data

Dec. 14, 2020     (EP) ..................................... 20213939

(51) Int. Cl.
*G06T 13/40*          (2011.01)

(52) U.S. Cl.
CPC .......... *G06T 13/40* (2013.01); *G06T 2210/61* (2013.01)

(58) Field of Classification Search
CPC . G06T 13/40; G06T 2210/61; G06T 2213/12; G06T 13/20
See application file for complete search history.

(56) References Cited

U.S. PATENT DOCUMENTS

| | | | | |
|---|---|---|---|---|
| 7,667,705 | B2 * | 2/2010 | Sterchi ................... | G06T 13/40 345/474 |
| 8,276,071 | B2 * | 9/2012 | Shuster ................. | A63F 13/358 463/32 |
| 8,319,778 | B2 * | 11/2012 | Sayre ........................ | G06T 5/70 345/475 |
| 9,216,351 | B2 * | 12/2015 | Herman .................. | G06T 13/40 |

(Continued)

OTHER PUBLICATIONS

Mixamo—Get animated—Empowering creativity with animated 3D characters—https://www.mixamo.com/ (gesp) (6 pages).

(Continued)

*Primary Examiner* — Daniel F Hajnik
*Assistant Examiner* — Chris Alejandro Puntier
(74) *Attorney, Agent, or Firm* — Perkins Coie LLP; Michael A. Glenn

(57) ABSTRACT

Scene description data having first data defining a 3D object and second data triggering an animation of the 3D object. The second data triggers an application of the animation to the 3D object and has a parameter discriminating between several animation modes of the application.

20 Claims, 45 Drawing Sheets

(56)  References Cited

U.S. PATENT DOCUMENTS

| | | | |
|---|---|---|---|
| 10,275,921 B2* | 4/2019 | Dahl ....................... | G06T 13/40 |
| 2009/0195544 A1* | 8/2009 | Wrinch ................... | G06T 13/40 |
| | | | 345/473 |
| 2009/0315896 A1* | 12/2009 | Kwiatkowski .......... | G06T 13/00 |
| | | | 345/473 |
| 2011/0142354 A1* | 6/2011 | Sung ......................... | G06T 7/73 |
| | | | 382/209 |
| 2017/0071547 A1* | 3/2017 | van Dinther ......... | A61B 5/0261 |
| 2019/0156545 A1* | 5/2019 | Horn ........................ | G06T 13/20 |
| 2022/0335674 A1* | 10/2022 | Stevenson .............. | G06T 13/40 |

OTHER PUBLICATIONS

Technology For Teachers And Students, "3D Models and 3D Animation in PowerPoint", https://www.youtube.com/watch?v=2-9g6fVL7uQ ( Jan. 14, 2019), XP055907881 (gesp) (2 pages).
School of Motion, "How to Use the Loop Expression in After Effects", YouTube [online], 2017.08.30., Internet <URL https://youtu.be/QoOnfuEkz9M?si=8sOZ2iUTV1UaqQB3> (New Prior Art).

* cited by examiner

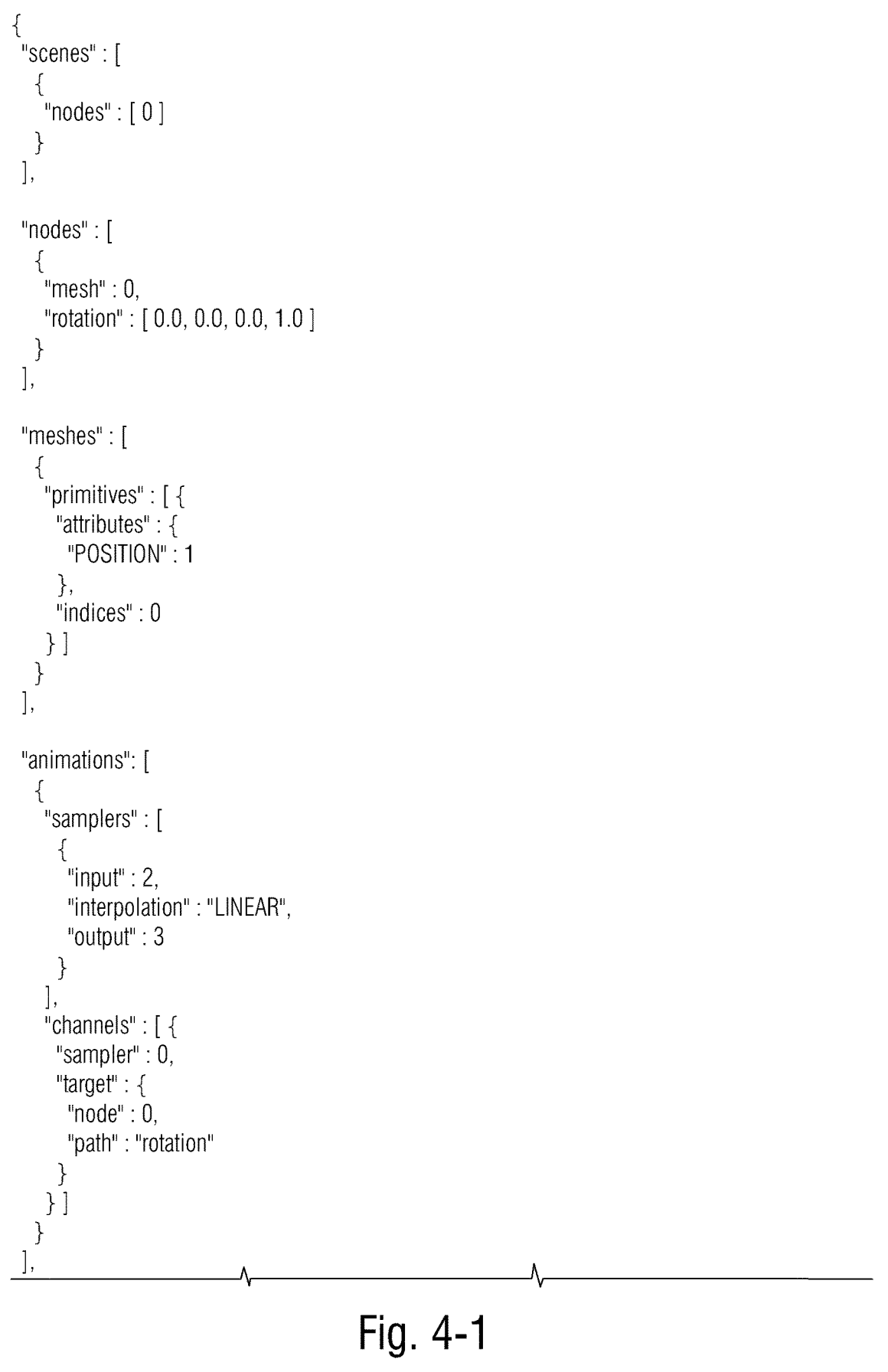

```
{
 "scenes" : [
   {
    "nodes" : [ 0 ]
   }
 ],

"nodes" : [
   {
    "mesh" : 0,
    "rotation" : [ 0.0, 0.0, 0.0, 1.0 ]
   }
 ], "meshes" : [
   {
    "primitives" : [ {
      "attributes" : {
       "POSITION" : 1
      },
      "indices" : 0
    } ]
   }
 ], "animations": [
   {
    "samplers" : [
      {
       "input" : 2,
       "interpolation" : "LINEAR",
       "output" : 3
      }
    ],
    "channels" : [ {
      "sampler" : 0,
      "target" : {
       "node" : 0,
       "path" : "rotation"
      }
    } ]
   }
 ],
```

Fig. 4-1

```
"buffers" : [
  {
    "uri" : "data:application/octet-
stream;base64,AAABAAIAAAAAAAAAAAAAAAAAAAAAIA/AAAAAAAAAAAAAAAAAACAPwAAAAA=",
    "byteLength" : 44
  },
  {
    "uri" : "data:application/octet-
stream;base64,AAAAAAAAgD4AAAA/AABAPwAAgD8AAAAAAAAAAAAAAAAAIA/AAAAAAAAADO/TQ/
9P00PwAAAAAAAAAACAPwAAAAAAAAAAAAAPT9ND/0/TS/AAAAAAAAAAAAAAAAACAPw==",
    "byteLength" : 100
  }
],
"bufferViews" : [
  {
    "buffer" : 0,
    "byteOffset" : 0,
    "byteLength" : 6,
    "target" : 34963
  },
  {
    "buffer" : 0,
    "byteOffset" : 8,
    "byteLength" : 36,
    "target" : 34962
  },
  {
    "buffer" : 1,
    "byteOffset" : 0,
    "byteLength" : 100
  }
],
"accessors" : [
  {
    "bufferView" : 0,
    "byteOffset" : 0,
    "componentType" : 5123,
    "count" : 3,
    "type" : "SCALAR",
    "max" : [ 2 ],
    "min" : [ 0 ]
  },
```

Fig. 4-2

```
{
    "bufferView" : 1,
    "byteOffset" : 0,
    "componentType" : 5126,
    "count" : 3,
    "type" : "VEC3",
    "max" : [ 1.0, 1.0, 0.0 ],
    "min" : [ 0.0, 0.0, 0.0 ]
  },
  {
    "bufferView" : 2,
    "byteOffset" : 0,
    "componentType" : 5126,
    "count" : 5,
    "type" : "SCALAR",
    "max" : [ 1.0 ],
    "min" : [ 0.0 ]
  },
  {
    "bufferView" : 2,
    "byteOffset" : 20,
    "componentType" : 5126,
    "count" : 5,
    "type" : "VEC4",
    "max" : [ 0.0, 0.0, 1.0, 1.0 ],
    "min" : [ 0.0, 0.0, 0.0, -0.707 ]
  }
], "asset" : {
  "version" : "2.0"
}

```
{
    "children": [
        1,
        60,
        65
    ],
    "name": "Hips",
    "rotation": [
        0.0,
        0.7071068286895752,
        0.7071068286895752,
        0.0
    ],
    "scale": [
        1.0,
        1.0,
        1.0
    ],
    "translation": [
        0.0,
        0.24705205857753754,
        99.67206573486328
    ]
},
{
    "children": [
        2
    ],
    "name": " Spine",
    "rotation": [
        0.0,
        0.0,
```

```
        0.0,
        1.0
    ],
    "scale": [
        1.0,
        1.0,
        1.0
    ],
    "translation": [
        5.648319643114519e-07,
        9.9234619140625,
        -1.22733485569869995
    ]
},
{
    "children": [
        3
    ],
    "name": " Spine1",
    "rotation": [
        0.0,
        0.0,
        0.0,
        1.0
    ],
    "scale": [
        1.0,
        1.0,
        1.0
    ],
    "translation": [
        -0.00013886521628592163,
```

Fig. 6-1

```
      11.645439147949219,
      -1.4223413467407227
   ]
},
{
   "children": [
      4,
      12,
      36
   ],
   "name": " Spine2",
   "rotation": [
      0.0,
      0.0,
      0.0,
      1.0
   ],
   "scale": [
      1.0,
      1.0,
      1.0
   ],
   "translation": [
      9.144072100752965e-05,
      13.360198974609375,
      -1.6264595985412598
   ]
},
{
   "children": [
      5
   ],
```

```
   "name": " Neck",
   "rotation": [
      0.0,
      0.0,
      0.0,
      1.0
   ],
   "scale": [
      1.0,
      1.0,
      1.0
   ],
   "translation": [
      2.52020836342126113e-05,
      15.032501220703125,
      0.7929048538208008
   ]
},
```

Fig. 6-2

```
{
    "meshes": [
        {
            "name": "skinned-mesh_1",
            "primitives": [
                {
                    "attributes": {
                        "JOINTS_0": 179,    <===
                        "NORMAL": 165,
                        "POSITION": 163,
                        "TEXCOORD_0": 167,
                        "WEIGHTS_0": 176    <===
                    },
                    "indices": 161,
                    "material": 1,
                    "mode": 4
                }
            ]
        }
    ]
}
```

Fig. 7

```
aligned(8) class glTFAnimationSample
    {
            unsigned int(1) apply_to_all;
            unsigned int(7) reserved;
            unsigned int(16) num_events;
            for( i=0; i < num_events; i++ ){
                    unsigned int(32) index;
                    int(32) speed;
                    unsigned int(8) state;
            }
    }
```

Fig. 9

```
{
  "extensions": {
    "MPEG_media": {
      media: [
        {
          "name": "source 0",
          "alternatives": [
            {
              "mimeType": "application/mp4",
              "uri": "file.mp4",
              "tracks": [
                {
                  "track": "#track_ID=1"
                }
              ]
            }
          ]
        }
      ]
    }
  },
  "animations": [
    {
      "name": "Animate all properties of one node with different samplers",
      "channels": [
        {
          "sampler": 0,
          "target": {
            "node": 1,
            "path": "rotation"
          }
        },
        }
```

Fig. 10-1

```
{
            "sampler": 1,
            "target": {
                "node": 1,
                "path": "scale"
            }
        },
    ],
    "samplers": [
        {
            "input": 4,
            "interpolation": "LINEAR",
            "output": 5
        },
        {
            "input": 4,
            "interpolation": "LINEAR",
            "output": 6
        }
    ]
  }
"extensions": {
        "MPEG_animation_timing": {
            "source": 0,
            "track": 0
        }
    }
}
```

Fig. 10-2

```
aligned(8) class glTFAnimationSample
    {
        unsigned int(1) apply_to_all;
        unsigned int(7) reserved;
        unsigned int(16) num_events;
        for( i=0; i < num_events; i++ ){ // for each layer
                unsigned int(32) index;
                int(32) speed;
                unsigned int(8) state;
                if( state == 5 ){
                        unsigned int (32) start_frame;
                        unsigned int (32) end_frame;
                        unsigned int (8) loop_mode;
                }
        }
    }
```

```
aligned(8) class glTFAnimationSample
    {
        unsigned int(1) apply_to_all;
        unsigned int(7) reserved;
        unsigned int(16) num_events;
        for( i=0; i < num_events; i++ ){ // for each layer
            unsigned int(32) index;
            int(32) speed;
            unsigned int(8) state;
            bool enable_offsets;
            int(7) reserved;
            if( state = = 5 || enable_offsets){
                unsigned int (32) start_frame;
                unsigned int (32) end_frame;
            }
            if( state = = 5)
                unsigned int (8) loop_mode;
        }
    }
```

```
aligned(8) class glTFAnimationSample
        {
                unsigned int(1) apply_to_all;
                unsigned int(7) reserved;
                unsigned int(16) num_events;
                for( i=0; i < num_events; i++ ){ // for each layer
                        unsigned int(32) index;
                        int(32) speed;
                        unsigned int(8) state;
                        int (32) weight;        ←‾‾‾128
                }
        }
```

Fig. 16

```
"animations" : [ {
      "channels" : [ {
         "sampler" : 0,
         "target" : {
            "node" : 2,
            "path" : "translation"
         }
      } ],
      "samplers" : [ {
         "input" : 5,  // timeAccessor; only for explanation
         "interpolation" : "LINEAR",
         "output" : 6  // translationAccessor; only for explanation
      } ]
```

```
"animations": [
    {
      "name": "Animation1",
      "channels": [
        {
          "sampler": 0,
          "target": {
            "node": 0,
            "path": "rotation"
          }
        },
        {
          "sampler": 1,
          "target": {
            "node": 0,
            "path": "translation"
          }
        },
        {
          "sampler": 2,
          "target": {
            "node": 6,
            "path": "rotation"
          }
        },
        {
          "sampler": 3,
          "target": {
            "node": 12,
            "path": "rotation"
          }
        }
      ],
                                            "samplers": [
                                                {
                                                  "input": 0,
                                                  "interpolation": "LINEAR",
                                                  "output": 1
                                                },
                                                {
                                                  "input": 0,
                                                  "interpolation": "LINEAR",
                                                  "output": 2
                                                },
                                                {
                                                  "input": 0,
                                                  "interpolation": "LINEAR",
                                                  "output": 3
                                                },
                                                {
                                                  "input": 0,
                                                  "interpolation": "LINEAR",
                                                  "output": 4
                                                },
                                            ]
                                        },
                                        {
                                          "name": "Animation2",
                                    ...
                                        },
                                    ]
```

Fig. 18

```
aligned(8) class glTFAnimationSample
        {
                unsigned int(1) apply_to_all;
                unsigned int(7) reserved;
                unsigned int(16) num_events;
                for( i=0; i < num_events; i++ ){ // for each layer
                        unsigned int(32) index;
                        int(32) speed;
                        unsigned int(8) state;
                        unsigned int(32) num_channels;
                        for (int j = 0; j < num_channels; j++) {
                                int (32) weight;
                                unsigned int (32) channel_index;
                        }
                }
        }
```

Fig. 19

```
aligned(8) class glTFAnimationSample
        {
                unsigned int(1) apply_to_all;
                unsigned int(7) reserved;
                unsigned int(16) num_events;
                for( i=0; i < num_events; i++ ){ // for each layer
                        unsigned int(32) index;
                        int(32) speed;
                        unsigned int(8) state;
                        int (32) default_channel_weight;
                        unsigned int(32) num_channels;
                        for (int j = 0; j < num_channels; j++) {
                                int (32) weight;
                                unsigned int (32) channel_index;
                        }
                }
        }
```

Fig. 20

```
aligned(8) class glTFAnimationSample
        {
                unsigned int(1) apply_to_all;
                unsigned int(7) reserved;
                unsigned int(16) num_events;
                for( i=0; i < num_events; I++ ){
                        unsigned int(32) index;
                        int(32) speed;
                        bool explicit_order;      128
                        int(7) reserved;
                        unsigned int (32) weight;       121
                        if(explicit_order)
                                unsigned int (8) order_id;
                }
        }
```

Fig. 23

```
aligned(8) class glTFAnimationSample
        {
                unsigned int(1) apply_to_all;
                unsigned int(7) reserved;
                unsigned int(16) num_events;
                for( i=0; i < num_events; I++ ){
                        unsigned int(32) index;
                        int(32) speed;
                        bool explicit_order;      128
                        int(7) reserved;
                        unsigned int (32) weight;       121
                        if(explicit_order) {                 129
                                unsigned int (8) order_id;
                                unsigned int (8) order_mode;
                        }
                }
        }
```

Fig. 24

```
{
  "scenes" : [
    {
      "nodes" : [ 0 ]
    }
  ],

"nodes" : [
    {
      "mesh" : 0,
      "rotation" : [ 0.0, 0.0, 0.0, 1.0 ]
    }
  ], "meshes" : [
    {
      "primitives" : [ {
        "attributes" : {
          "POSITION" : 1
        },
        "indices" : 0
      } ]
    }
  ],
```

Fig. 26

```
{
  "scenes" : [
    {
      "nodes" : [ 0 ]
    }
...
  ],

"nodes" : [
    {
      "name" :  "volumetric video node",
      "mesh" : 1,
      "rotation" : [ 0.0, 0.0, 0.0, 1.0 ]
    }
...
  ], "meshes" : [
...
    {
      "primitives" : [ {
        "attributes" : {
          "POSITION" : 2
        },
        "indices" : 3
      } ]
    }
...
  ],
```

Fig. 27

```
{
  "scenes" : [
    {
      "nodes" : [ 0 ]
    }
    . . .
  ],

"nodes" : [
    {
      "name" : "volumetric video node",
      "mesh" : 1,
      "rotation" : [ 0.0, 0.0, 0.0, 1.0 ]
    }
    . . .
  ], "meshes" : [
    . . .
    {
      "primitives" : [ {
        "attributes" : {
          "POSITION" : 2
        },
        "indices" : 3
      } ]
    }
    . . .
  ],
  "animations": [
        "extensions": {
                "MPEG_animation_timing": {
                        "source": 0,
                        "track": 0,
```

127 →

"mode": 1 "mode": 0 # mode indicating 0 pause video and use T-pose for animation, 1 pause video and use last frame for animation, 2 combine video and animation (no pausing video)

```
aligned(8) class glTFAnimationSample
        {
                unsigned int(1) apply_to_all;
                unsigned int(7) reserved;                    128b
                unsigned int(16) num_events;
                unsigned int (32) vol_scan_weight;
                for( i=0; i < num_events; i++ ){
                        unsigned int(32) index;
                        int(32) speed;
                        bool explicit_order;
                        int(7) reserved;
                        unsigned int (32) weight;
                        if(explicit_order) {
                                unsigned int (8) order_id;
                                unsigned int (8) order_mode;
                        }
                }
        }
```

Fig. 30

```
{
  "scenes" : [
    {
      "nodes" : [ 0 ]
    }
    . . .
  ],

"nodes" : [
    {
      "name" : "volumetric video node",
      "mesh" : 1,
      "rotation" : [ 0.0, 0.0, 0.0, 1.0 ]
    }
    . . .
  ], "meshes" : [
    . . .
    {
      "primitives" : [ {
        "attributes" : {
          "POSITION" : 2
        },
        "indices" : 3
      } ]
    }
    . . .
  ],
  "animations": [
    "extensions": {
      "MPEG_animation_timing": {
        "source": 0,
        "track": 0,
        "target_node": 0,
        "mode": 1 # mode indicating 0 pause video and use T-pose for
animation, 1 pause video and use last frame for animation, 2 combine video and
animation (no pausing video)
      }
    }
  ]
}
```

```
aligned(8) class gITFAnimationSample
        {
                unsigned int(1) apply_to_all;
                unsigned int(7) reserved;
                unsigned int(16) num_events;
                unsigned int(16) num_objects;                128b
                for( i=0; i < num_objects; I++ ){
                        unsigned int (32) vol_scan_weight;
                        unsigned int (32) object_index;
                }
                for( i=0; i < num_events; I++ ){
                        unsigned int(32) index;
                        int(32) speed;
                        bool explicit_order;
                        int(7) reserved;
                        unsigned int (32) weight;
                        if(explicit_order) {
                                unsigned int (8) order_id;
                                unsigned int (8) order_mode;
                        }
                }
        }
```

Fig. 34

```
aligned(8) class glTFAnimationSample
        {
                unsigned int(1) apply_to_all;
                unsigned int(7) reserved;
                unsigned int(16) num_events;
                unsigned int(16) num_objects;
                for( i=0; i < num_objects; i++ ){
                        unsigned int(32) vol_num_channels;
                        for (int i = 0; i < vol_num_channels; i++) {
                                int (32) vol_scan_weight;
                                unsigned int (32) vol_channel_index;
                                unsigned int (32) order_id;
                        }
                        unsigned int (32) object_index;
                }
                for( i=0; i < num_events; I++ ){
                        unsigned int(32) index;
                        int(32) speed;
                        unsigned int(32) num_channels;
                        for (int i = 0; i < num_channels; I++) {
                                int (32) weight;
                                unsigned int (32) channel_index;
                        }
                }
        }
```

Fig. 36

```
class ChannelTransformationConfigBox extends FullBox('ctab', 0, 0) { {
            unsigned int (8) number_of_channels;
            for (unsigned int i = 0; i < number_of_channels; I++){
            unsigned int (32) channel_index;
    }
}
```

Fig. 38

```
aligned(8)   ChannelTransformationSample()
{
        for (unsigned int (32) i = 0; i < number_of_channels; I++)
        {
                unsigned int (32) node_index;
                unsigned int (4) transform_property;
                unsinged int (4) reserved;
                if (transform_property == 0) {
                        signed int (32)  translation_x;
                        signed int (32)  translation_y;
                        signed int (32)  translation_z;
                } else if (transform_property == 1) {
                        signed int (32)  rotation_w;
                        signed int (32)  rotation_y;
                        signed int (32)  rotation_y;
                        signed int (32)  rotation_z;
                } else if (transform_property == 2) {
                        signed int (32)  scale_x;
                        signed int (32)  scale_y;
                        signed int (32)  scale_z;
                } else if (transform_property == 3) {
                                Unsigned int (32) target;
                                unsigned int (32) weight;
                }
        }
}
```

Fig. 39

```
{
  "scenes" : [
    {
      "nodes" : [ 0 ]
    }
    . . .
  ],

"nodes" : [
    {
      "name" : "volumetric video node",
      "mesh" : 1,
      "rotation" : [ 0.0, 0.0, 0.0, 1.0 ]
    }
    . . .
  ], "meshes" : [
    . . .
    {
      "primitives" : [ {
        "attributes" : {
          "POSITION" : 2
        },
        "indices" : 3
      } ]
    }
    . . .
  ],
```

Fig. 40

```
{
  "scenes" : [
    {
     "nodes" : [ 0 ]
    }
    . . .
  ],

"nodes" : [
    {
      "name" : "volumetric video node",
      "mesh" : 1,
      "rotation" : [ 0.0, 0.0, 0.0, 1.0 ]
    }
    . . .
  ], "meshes" : [
  . . "extensions" : {
        "MPEG_extension" : {
        {
          "primitives", : [ {
            "attributes" : {
               "POSITION" : 2
                  "interpolate" : 0,
            },
            "indices" : 3
        }  } ]
    }
    . . .
  ],
```

Fig. 42

```
"animations" : [ {
     "name" : "Per-frame update"
     "channels" : [ {
          "sampler" : 0,
          "target" : {
               "node" : 2,
               "path" : "translation"
          }
     } ],
     "samplers" : [ {
          "input" : 5, // timeAccessor; only for explanation
          "interpolation" : "LINEAR",
          "output" : 6 // translationAccessor; only for explanation
     } ]
```

Fig. 43

ENCODER, DECODER AND SCENE DESCRIPTION DATA SUPPORTING MULTIPLE ANIMATIONS AND/OR MOVEMENTS FOR AN OBJECT

CROSS-REFERENCE TO RELATED APPLICATIONS

This application is a continuation of copending International Application No. PCT/EP2021/085540, filed Dec. 13, 2021, which is incorporated herein by reference in its entirety, and additionally claims priority from European Application No. 20213939.0, filed Dec. 14, 2020, which is also incorporated herein by reference in its entirety.

TECHNICAL FIELD

Embodiments according to the invention related to Encoder, Decoder and Scene description data supporting multiple animations and/or movements for an object.

BACKGROUND OF THE INVENTION

6 Degree of Freedom (6DoF) is becoming more popular in the last days as technology related to such applications is improving. Better Head Mounted Displays (HMD) are being brought into the market and several activities in the industry have been started to provide efficient delivery of such content, e.g. Point Cloud Compression or Mesh compression, as well as further standards, e.g., scene description for immersive activities are being carried out in MPEG.

gITF is an example of one such scene description formats that has grown interest in the last years. gITF allows for describing a scene, placing object within that scene, describing relationships among them and providing some kind of animation to such objects. As for now, support for static objects has been provided that can be dynamically transformed using the means of pre-defined animations. An animation could be translation/rotation movement of the complete object (e.g position the humanoid) or transformations of parts of the object (e.g only the limbs of the humanoid).

Transformation of 3D objects is particularly useful in some scenarios, e.g. when 6DoF content is streamed to users and some kind of modification of the scene is envisioned. The description provided here refers to animations as pre-defined transformations of objects that describe the timeline and the particular transformation target(s) of an object and the transformation itself as e.g., translation, rotation and magnitudes thereof. Although further transformations of object are possible, i.e. transforming an object "freely" without any pre-defined transformation. The description herein focuses on animations, which provide a way in which an object is animatable and specifies clearly what is to be the result.

The current specification and scene description miss in covering several aspects related to animation of objects in a scene.

First, there could be multiple animations acting on the same object simultaneously and how such animations are to be applied simultaneously is not specified and therefore the end-results is not clear and two different implementations could end up having different results which is undesirable. For example; a gITF file contains an object and two animations acting on the object. Anim1 moves object by 1 unit in x direction, and Anim2 moves object by 2 unit in y direction assuming both the animations have same time period.

gITF supports key frame animations where the object to be animatable is transformed whilst interpolating between the values available at each key frame. However, the mechanism to convey information on how to combine multiple animation acting simultaneously or blend a sequence of different animation sequences is missing.

Second, the current solutions focus on static objects and lack support for dynamic objects provided by so called volumetric video. As compression video for dynamic 3D objects continues, some interest has been shown in introducing support for dynamic object in standards such as gITF. This means that objects are not provided as static objects for the presentation time of a scene but dynamically change over time as a volumetric video. As for the case of static object, one can envision that one or more animations can be applied on top of the volumetric video and the interaction between a volumetric scan that changes over time with the animation that makes an object transform as well need to be defined.

gITF also supports skeleton animations. A gITF may contain a humanoid animation which could be triggered to transform a human's volumetric video. Note that two transformations happened at the same time to a particular object (e.g. through modifying the skeleton), one coming from the volumetric scan itself that updates the dynamic object and one from an animation.

Both combining several animations onto a single object or combining one or more animations with a dynamic object (volumetric scan) present similar issue.

Imagine for instance basketball player is placed in a 3D scene which constitutes a basketball court. The director of the scene directs the basketball player to move from Point A to Point B in the court. The player is recorded in a static pose (or an ideal pose). Initially the player is positioned at Point A. For a natural movement, a character skeleton animation is applied to Josh. This could be a skeleton walk animation running in loop starting with left leg and ending on right leg. There might be similar move animations; run. There will be at least two simultaneous animations to achieve this.

1. Walk animation: this animation controls the joint movement which represent a walk
2. Translation animation: this animation controls the translation of the character body from point A to point B
3. Run animation: this animation controls the joint movement which represent a run In the case of animations, both the animations could have a similar keyframe positions, or could have different keyframe positions. In which case, playback of two animation layers has to be normalized to match a keyframe timeline. Also, there might be scenarios where the director would like to play multiple number of loops of walk animation during the translation animation; this could be controlled with speed. Also, the behaviour of the object state at the end of the loop can be decided whether it goes back to the initial position, next key-frame is relative to previous.

Note also that the described movement as an animation above could be actually the volumetric scan, i.e. the player instead of being captured in a static pose could be moving around. On top of it an animation could be played that made the player to turn its head. Note that in this example it is clear that many of the joints of the skeleton are only affected by the volumetric scan, i.e., there is a translatory movement that needs to be applied but the head turning affects a joint so that the head is turned. Therefore, the combination of the two transformation needs to be combined in a fine granular way, e.g. the joint affecting the head applies the translatory transformation from the video and the rotational transformation from the animation.

The volumetric video can be made animatable using a model-based approach or self-rigging. In a model-based approach, a model contains the necessary sematic information such as an underlying skeleton, joints, etc for vertex skinning transformation. An animation transforms the joint of the skeleton which further transforms the model mesh. The transformation of the model mesh can be extracted and applied to the volumetric video using the method of vertex correspondence. The gITF file may also contain multiple humanoid animations which could be applied to the model mesh simultaneously. Similarly, multiple humanoid animation could be triggered to transform a self-rigged volumetric video. In any case, whether the animation and transformations for the volumetric video apply to a model and thereby to the volumetric scan or directly on a rigged volumetric scan, the issues and solutions described herein are the same.

There have been some additions to support timely triggering of animations in gITF.

It entails that the gITF animation alignment focuses on triggering an animation using an ISOBMFF metadata track. Such a mechanism can be used to represent sequenced animations to express a series of motions whereby animations are trigged in a way which puts each of the animations in a specific order with a specific storyline in mind.

Basically, the idea is to indicate within a timed metadata when to start an animation i.e. at a particular time instant an "Animation Sample" is played that indicates an index of the animations included in the gITF file that is considered and a state that tells whether to play, stop, loop, etc., see FIG. 9, wherein Table 1 below indicates options for the state.

TABLE 1

| Semantics of state value of gITFAnimationSample | | |
| --- | --- | --- |
| value | identifier | description |
| 0 | play | Play the animation |
| 1 | stop | Stop the animation and return to the initial state |
| 2 | pause | Pause animation |
| 3 | restart | Restart the animation, equivalent to stopping animation and playing it from the beginning. |
| 4 | update | Update the animation characteristic, e.g. speed |
| 5 | loop | Sets the animation to be run repeatedly in a loop. |
| 9 . . . 63 | reserved | Reserved for future use |

An example of an extension in the animation node of the gITF is shown in FIGS. 10-1 and 10-2.

However, there are several aspects missing currently. Issues that need to be solved:

When an animation is played for a longer time that the animation duration, what needs to be done. How is the loop to be performed if desired?

How to apply animations simultaneously to a target? How to combine them

How to combine a dynamic object (volumetric scan) with an animation

SUMMARY

An embodiment may have an apparatus configured to receive scene description data, obtain, from the scene description data, first data defining a 3D object; obtain, from the scene description data, second data triggering an animation of the 3D object, apply the animation to the 3D object dependent on a mode parameter comprised by the second data, according to one of several animation modes, including one or more of apply the animation to the 3D object repeatedly in loops with starting each loop from an initial pose of the 3D object, and apply the animation to the 3D object repeatedly in loops with using a pose assumed by the 3D object at the end of one loop for starting a subsequent loop, and apply the animation to the 3D object with maintaining a pose assumed by the 3D object at the end of the animation, and apply the animation to the 3D object with returning to a pose assumed by the 3D object upon a start of the application of the animation to the 3D object, and apply the animation to the 3D object in reverse with starting from a pose assumed by the 3D object at the end of a previously applied animation.

Another embodiment may have an apparatus configured to receive scene description data, obtain, from the scene description data, first data defining a 3D object; obtain, from the scene description data, second data triggering an animation of the 3D object, apply a temporal subinterval of the animation or of a cyclic application of the animation to the 3D object based on a trimming parameter comprised by the second data, wherein the trimming parameter controls as to which temporal subinterval of the animation or of a cyclic application of the animation is to be applied to the 3D object by the apparatus.

Another embodiment may have an apparatus configured to receive scene description data, obtain, from the scene description data, first data defining a 3D object; obtain, from the scene description data, second data triggering an animation of the 3D object, and amplify or dampen pose movements of the 3D object caused by the animation using a weighting parameter comprised by the second data.

Another embodiment may have an apparatus configured to receive scene description data, obtain, from the scene description data, first data defining a 3D object; obtain, from the scene description data, second data triggering an animation of the 3D object, obtain, from the scene description data, third data triggering a second animation of the 3D object, apply the first animation and the second animation to the 3D object so that the first animation and the second animation are running simultaneously at least for a certain time interval, wherein the apparatus is configured to apply the second animation comprised by the third data to the 3D object in a manner acting on the 3D object along with the first animation, and/or apply the second animation to the 3D object based on an inter-animation-control parameter comprised by the third data, wherein the inter-animation-control parameter discriminates between different animation combination modes, having two or more of applying the second animation overriding the first animation so that the first animation is not applied to the 3D object as long as the second animation lasts; applying the second animation overriding the first animation with respect to a portion of the 3D object affected by the first animation; adding the second animation to the first animation so that a combined animation is applied to the 3D object, wherein the combined animation is obtained by forming a sum of pose movements caused by the first animation and the second animation, divided by a number of animations adding to the combined animation, adding the second animation to the first animation so that a combined animation is applied to the 3D object, wherein the combined animation is obtained by forming a sum of pose movements of the first animation and the second animation.

Another embodiment may have an apparatus configured to receive scene description data, obtain, from the scene description data, first data defining a 3D object; obtain, from the scene description data, second data triggering a first animation of the 3D object, obtain, from the scene description data, third data triggering a second animation of the 3D object, apply the first animation and the second animation to the 3D object so that the first animation and the second animation are running simultaneously at least for a certain time interval, apply the second animation comprised by the third data to the 3D object in a manner acting on the 3D object along with the first animation, and apply the first and second animation to the 3D object dependent on animation IDs, wherein a first animation ID is associated with the first animation and a second animation ID is associated with the second animation.

Another embodiment may have an apparatus configured to receive scene description data, obtain, from the scene description data, first data defining a 3D object and a movement of the 3D object; obtain, from the scene description data, second data triggering an animation of the 3D object, wherein the apparatus is configured to apply the animation to the 3D object in a manner acting on the 3D object along with the movement of the 3D object defined by the first data, and/or apply the animation based on an animation-movement-interaction-control parameter comprised by the second data, wherein the animation-movement-interaction-control parameter discriminates between different modes of applying the animation to the 3D object, having one or more of applying the animation in a manner overriding the movement defined by the first data by using a pose of the 3D object at the time instant at which the animation is triggered by the second data as an initial pose of the 3D object to which the animation is applied; applying the animation in a manner overriding the movement defined by the first data by using a default pose as an initial pose of the 3D object to which the animation is applied instead of the pose of the 3D object at the time instant at which the animation is triggered by the second data; and applying the animation to the 3D object in a manner acting on the 3D object along with the movement defined by the first data.

Another embodiment may have an apparatus configured to receive scene description data, obtain, from the scene description data, first data defining a 3D object and a movement of the 3D object; wherein the first data defines the movement of the 3D object into a set of one or more channels so that one joint of the 3D object is moved, concurrently, by more than one channel.

Another embodiment may have an apparatus configured to receive scene description data, obtain, from the scene description data, first data defining a 3D object and a movement of the 3D object, wherein the movement of the 3D object is defined by the first data in units of time frames so that per time frame a pose of the 3D object is defined, wherein the apparatus is configured to apply a pose transition mode indicated by the second data to render the 3D object on the basis of the first data, wherein, if the second data indicates a first predetermined mode, the apparatus is configured to interpolate between the poses of the 3D object at the time frames and, if the second data indicates a second predetermined mode, the apparatus is configured to obtain, form the scene description data, third data which triggers, for each of one or more of the time frames, one or more animations of the 3D object, wherein the apparatus is configured to apply the one or more animations to transition the 3D object between the pose of the 3D object at the respective time frame towards the pose of the object at a subsequent time frame.

In accordance with a first aspect of the present invention, the inventors of the present application realized that one problem encountered when trying to loop an animation for animating the object for a longer time than the duration of the animation stems from the fact that a simple restart of the animation might not result in the desired animation of the object. According to the first aspect of the present application, this difficulty is overcome by introducing different animation modes to choose from for animating an object. Thus a high flexibility for animating the object can be achieved. The inventors found, that it is advantageous to animate the object in different ways using the same animation. This is based on the idea that it is more efficient, e.g., in terms of memory requirement, to indicate an animation mode instead of having to define for each desired animation of an object a separate animation of the desired duration, especially, if the animations differ among each other only marginally but could not be achieved by simply looping a predetermined animation. With the new animation modes it might be possible to smoothly continue a movement of an object induced by the animation or to reverse the animation or to assume different end poses of the object. Therefore it is possible to achieve different movements of the object with the same animation but with different animation modes. This is especially advantageous, since the inventors found that it is not necessary to introduce additional syntax elements indicating the animation mode, since existing syntax elements, e.g. a state value indicating an application of the animation to the object, might be usable. A bit stream, e.g. scene description data, and thus a signalization cost may not be increased.

Accordingly, in accordance with a first aspect of the present application, scene description data comprises first data defining a 3D object and second data triggering an animation of the 3D object. The second data triggers an application of the animation to the 3D object and comprises a parameter discriminating between several animation modes of the application, including one or more of a first animation mode, a second animation mode, a third animation mode, a fourth animation mode and a fifth animation mode. For the invention it is only important that at least one of the aforementioned animation modes is comprised by the several animation modes so that this mode is selectable. It is clear that the several animation modes may comprise additionally to the at least one animation mode of the aforementioned animation modes further animation modes, like modes indicating to run, pause or stop the animation. According to an embodiment, the several animation modes include two or more of the five animation modes or all of the five animation modes. At the first animation mode the animation is applied to the 3D object repeatedly in loops with starting each loop from an initial pose of the 3D object. At the second animation mode the animation is applied to the 3D object repeatedly in loops with using a pose assumed by the 3D object at the end of one loop for starting a subsequent loop. In other words, the animation is applied repeatedly in loops with the initial object position of the current loop being the final object position of the previous loop. The second animation mode is especially advantageous for cases where the final object position of the previous loop would be equal to an initial state of the animation. By using the final object position of the previous loop as the initial object position of the current loop it is avoided that the same object position is applied to the object twice in direct succession. Thus, the second animation mode can reduce artefacts. At the third animation mode the animation is applied to the 3D object with maintaining a pose assumed by the 3D object at the end of the animation. For example, the animation is applied once and an end position of the 3D object at the end of the animation is kept, e.g. when the animation is stopped the final state is kept. Alternatively, the animation is applied repeatedly in loops and an end position of the 3D object at an end of a last loop is kept, e.g., once stopped the final position is kept. For example, the animation could be placed once or in a loop but when stopped a particular first position is kept. This third animation mode enables a flexible and efficient animation of the object, since the end pose of the object is not predetermined by the animation itself. On the contrary, it is possible to move the object into a desired pose and leave the object in this pose. The desired pose can be one of the poses assumable by the object during the animation. At the fourth animation mode the animation is applied to the 3D object with returning to a pose assumed by the 3D object upon a start of the application of the animation to the 3D object. For example, the animation is applied once and an end position of the 3D object at an end of the animation equals an initial pose of the 3D object at a start of the animation or the animation is applied repeatedly in loops and an end position of the 3D object at a last loop equals an initial pose of the 3D object at a start of the animation at a first loop. For example, once stopped the initial position is kept. For example, the animation could be placed once or in a loop but when stopped a particular second position is kept. At the fifth animation mode the animation being applied, e.g., once or repeatedly in loops, to the 3D object in reverse with starting from a pose assumed by the 3D object at the end of a previously applied animation. For example, apply the animation to the object at an initial position and then inverse the animation from the last position of the object so that the last position assumed after the reverse animation by the object is again the initial position. The loop begins mirroring the previous interval from the last state of the previous animation. Alternatively, the animation is directly applied in a reverse manner to the object.

Advantageously, the several animation modes may comprise the second animation mode and/or the third animation mode.

Accordingly, in accordance with a first aspect of the present application an apparatus is configured to receive scene description data, e.g., the scene description data described above. Additionally the apparatus is configured to obtain, from the scene description data, first data defining a 3D object and second data triggering an animation of the 3D object. Furthermore, the apparatus is configured to apply the animation to the 3D object dependent on a mode parameter comprised by the second data, according to one of several animation modes, including one or more of the first animation mode, the second animation mode, the third animation mode, the fourth animation mode and the fifth animation mode. The five animation modes might be implemented as described above with regard to the scene description data. At the first animation mode, the apparatus is configured to apply the animation to the 3D object repeatedly in loops with starting each loop from an initial pose of the 3D object. At the second animation mode, the apparatus is configured to apply the animation to the 3D object repeatedly in loops with using a pose assumed by the 3D object at the end of one loop for starting a subsequent loop. At the third animation mode, the apparatus is configured to apply the animation to the 3D object with maintaining a pose assumed by the 3D object at the end of the animation (e.g., the animation is applied once and an end position of the 3D object at the end of the animation is kept or the animation is applied repeatedly in loops and an end position of the 3D object at an end of a last loop is kept; e.g., once stopped the final position is kept; e.g., the animation could be placed once or in a loop but when stopped a particular first position is kept). At the fourth animation mode, the apparatus is configured to apply the animation to the 3D object with returning to a pose assumed by the 3D object upon a start of the application of the animation to the 3D object (e.g., the animation is applied once and an end position of the 3D object at an end of the animation equals an initial pose of the 3D object at a start of the animation or the animation is applied repeatedly in loops and an end position of the 3D object at a last loop equals an initial pose of the 3D object at a start of the animation at a first loop; e.g., once stopped the initial position is kept; e.g., the animation could be placed once or in a loop but when stopped a particular second position is kept). At the fifth animation mode, the apparatus is configured to apply the animation, e.g., once or repeatedly in loops, to the 3D object in reverse with starting from a pose assumed by the 3D object at the end of a previously applied animation.

In accordance with a second aspect of the present invention, the inventors of the present application realized that one problem encountered when trying to apply an animation for animating an object stems from the fact that it is not possible to apply only a certain part of the animation. According to the first aspect of the present application, this difficulty is overcome by introducing a trimming parameter. The trimming parameter can indicate a temporal subinterval of the animation. The inventors found, that the indication of temporal subintervals of an animation is advantageous in terms of efficiency and memory requirement. This is based on the idea that such an indication avoids defining for each desired animation of an object a separate animation with the desired duration and content, especially, if the animations differ among each other only marginally. Thus, in case not the whole animation sequence is needed, it is possible to select a subinterval of the animation and the subinterval can be applied to the object. This increases the flexibility in applying animations, since it is possible to animate the object in different ways using different subintervals of the same animation. A specially advantage accompanied by the trimming parameter is that it is not necessary to always start a certain animation with a predetermined initial pose, since the initial pose can differ dependent on the selected temporal subinterval.

Accordingly, in accordance with a second aspect of the present application, scene description data comprises first data defining a 3D object and second data triggering an animation of the 3D object. The second data comprises a trimming parameter, e.g., a timing parameter, controlling as to which temporal subinterval of the animation or of a cyclic application of the animation is applied to the 3D object. The trimming parameter indicates, for example, a first frame of the animation at which the subinterval starts and a second frame of the animation at which the subinterval ends. In case of cyclic application of the animation, the first frame may specify the frame of the animation used after each loop, e.g., as an initial pose, and the second frame may specify the last frame of the subinterval, e.g., the last pose, before looping the animation, e.g., before looping the subinterval of the animation.

Accordingly, in accordance with a second aspect of the present application an apparatus is configured to receive scene description data, e.g., the scene description data

US 12,694,594 B2

9 described above. Additionally, the apparatus is configured to obtain, from the scene description data, first data defining a 3D object and second data triggering an animation of the 3D object. Furthermore, the apparatus is configured to apply a temporal subinterval of the animation or of a cyclic application of the animation to the 3D object based on a trimming parameter comprised by the second data, wherein the trimming parameter, e.g., a timing parameter, controls as to which temporal subinterval of the animation or of a cyclic application of the animation is to be applied to the 3D object by the apparatus.

In accordance with a third aspect of the present invention, the inventors of the present application realized that one problem encountered when trying to apply an animation for animating an object stems from the fact that several pose movements may act on the same object by applying the animation to the object. According to the first aspect of the present application, this difficulty is overcome by introducing a weighting parameter. The weighting parameter amplifies or dampens pose movements of the 3D object caused by the animation. The inventors found, that the weighting parameter can advantageously identify how these pose movements are used to transform the object. This is based on the idea that the weighting parameter may avoid an visually unrealistic animation of the object by indicating at least for some pose movements how much of the respective pose movement is used. Thus, the animation can be applied to the object more efficiently and more realistically.

Accordingly, in accordance with a third aspect of the present application, scene description data comprises first data defining a 3D object and second data triggering an animation of the 3D object. The second data comprises a weighting parameter amplifying or dampening pose movements of the 3D object caused by the animation. According to an embodiment, the animation of the 3D object is defined in the scene description data in a manner decomposed into channels and the weighting parameter may specify the amplification or attenuation to be applied to pose movements associated with a channel of the animation.

Accordingly, in accordance with a third aspect of the present application an apparatus is configured to receive scene description data, e.g., the scene description data described above. Additionally, the apparatus is configured to obtain, from the scene description data, first data defining a 3D object and second data triggering an animation of the 3D object. Furthermore, the apparatus is configured to amplify or dampen pose movements of the 3D object caused by the animation using a weighting parameter comprised by the second data.

In accordance with a fourth aspect of the present invention, the inventors of the present application realized that one problem encountered when trying to apply at the same time two or more animations to an object stems from the fact that the order in which the animations are applied to the object plays an important role. According to the first aspect of the present application, this difficulty is overcome by using animation IDs to indicate the ordering. For example, animations with lower animation ID are applied before animation with higher animation ID. The inventors found, that the usage of animation IDs can increase the efficiency and avoid to redundantly have to re-introduce already running animations into a sample when an additional new animation starts. This is based on the idea that the animation IDs allow to apply the transformations in increasing order, i.e. with increasing animation ID, during a time frame where more than one animation is running. Thus, it is not necessary to include the already running animation and the new

10 animation in a new sample to indicate the order in which the two animations have to be applied to the object. A bit stream, e.g. scene description data, and thus a signalization cost may be reduced. An animation ID might also be understood as an order ID.

Accordingly, in accordance with a fourth aspect of the present application, scene description data comprises first data defining a 3D object, second data triggering a first animation of the 3D object and third data triggering a second animation of the 3D object. The third data triggers the second animation of the object so that the first animation and the second animation are running simultaneously at least for a certain time interval and the third data triggers the second animation to be applied to the 3D object in a manner acting on the 3D object along with the first animation. The second and third data trigger the first and second animation to be applied to the 3D object in a manner associating the first animation with a first animation ID and the second animation with a second animation ID. Thus, both animations are associated with an animation ID and, for example, the animation IDs indicate an order in which the first animation and the second animation are applied to the 3D object. For example, the first and second animation IDs are defined on an ordinal scale and a rank of the second animation ID relative to the first animation ID defines as to how a final animation of the 3D object emerges from the first and second animations.

Accordingly, in accordance with a fourth aspect of the present application an apparatus is configured to receive scene description data, e.g., the scene description data described above. Additionally, the apparatus is configured to obtain, from the scene description data, first data defining a 3D object, second data triggering an animation of the 3D object and third data triggering a second animation of the 3D object. Furthermore, the apparatus is configured to apply the first animation and the second animation to the 3D object so that the first animation and the second animation are running simultaneously at least for a certain time interval and apply the second animation comprised by the third data to the 3D object in a manner acting on the 3D object along with the first animation. Additionally, the apparatus is configured to apply the first and second animation to the 3D object dependent on animation IDs, wherein a first animation ID is associated with the first animation and a second animation ID is associated with the second animation.

A further embodiment relates to scene description data comprising first data defining a 3D object, second data triggering a first animation of the 3D object and third data triggering a second animation of the 3D object. The third data triggers the second animation of the object so that the first animation and the second animation are running simultaneously at least for a certain time interval. Additionally, the third data triggers the second animation to be applied to the 3D object in a manner acting on the 3D object along with the first animation, and/or comprises an inter-animation-control parameter discriminating between different animation combination modes at which the second animation is triggered. The different animation combination modes comprise two or more of a first animation combination mode, a second animation combination mode, a third animation combination mode and a fourth animation combination mode. The first animation combination mode may indicate a triggering of the second animation overriding the first animation so that the first animation is not applied to the 3D object as long as the second animation lasts. The second animation combination mode may indicate a triggering of the second animation overriding the first animation with respect to a portion of the 3D object affected by the first animation, for example, so that the first animation is not applied to joints of the 3D object, which joints the first animation has in common with the second animation, as long as the second animation lasts. The third animation combination mode may indicate a triggering of the second animation adding to the first animation so that a combined animation is applied to the 3D object, wherein the combined animation is obtained by forming a sum of pose movements caused by the first animation and the second animation, divided by a number of animations adding to the combined animation. For example, the pose movements caused by animations applied in the same time interval are normalized by a number of the animations applied in the same time interval; e.g., triggering of an n-th animation adding to the first to (n−1)-th animations so that a combined animation is applied to the 3D object, wherein the combined animation is obtained by forming a sum of pose movements caused by the n animations, divided by a number n of animations adding to the combined animation. At the third animation combination mode, for example, the combined animation is obtained by decomposing the first animation into a first set of channels and decomposing the second animation into a second set of channels, wherein one or more channels are comprised in the first set of channels and in the second set of channels and by using a first weighting parameter amplifying or dampening the pose movements of the 3D object caused by the first animation specifically with respect to the one or more channels comprised in the first set of channels and in the second set of channels and leaving the pose movements of the 3D object caused by the first animation uninfluenced with respect to remaining channels of the first set of channels and by using a second weighting parameter amplifying or dampening the pose movements of the 3D object caused by the second animation specifically with respect to the one or more channels comprised in the first set of channels and in the second set of channels and leaving the pose movements of the 3D object caused by the second animation uninfluenced with respect to remaining channels of the second set of channels. The third animation combination mode, for example, indicates the triggering of the second animation adding to the first animation, for each common joint, so that a combined animation is applied to the respective joint of the 3D object, wherein the combined animation is obtained by forming a sum of pose movements caused by the first animation and the second animation, divided by a number of animations adding to the combined animation for the respective joint. The fourth animation combination mode may indicate a triggering of the second animation adding to the first animation so that a combined animation is applied to the 3D object, wherein the combined animation is obtained by forming a sum of pose movements of the first animation and the second animation.

A further embodiment relates to an apparatus configured to receive scene description data, e.g., the scene description data described above. Additionally, the apparatus is configured to obtain, from the scene description data, first data defining a 3D object, second data triggering an animation of the 3D object and third data triggering a second animation of the 3D object. Furthermore, the apparatus is configured to apply the first animation and the second animation to the 3D object so that the first animation and the second animation are running simultaneously at least for a certain time interval. Additionally, the apparatus is configured to apply the second animation comprised by the third data to the 3D object in a manner acting on the 3D object along with the first animation, and/or apply the second animation to the 3D object based on, e.g., dependent on, an inter-animation-control parameter comprised by the third data, wherein the inter-animation-control parameter discriminates between different animation combination modes, comprising two or more of applying the second animation overriding the first animation so that the first animation is not applied to the 3D object as long as the second animation lasts; and applying the second animation overriding the first animation with respect to a portion of the 3D object affected by the first animation (e.g. so that the first animation is not applied to joints of the 3D object, which joints the first animation has in common with the second animation, as long as the second animation lasts); and adding the second animation to the first animation so that a combined animation is applied to the 3D object, wherein the combined animation is obtained by forming a sum of pose movements caused by the first animation and the second animation, divided by a number of animations adding to the combined animation, (e.g., the pose movements caused by animations applied in the same time interval are normalized by a number of the animations applied in the same time interval; e.g., triggering of an n-th animation adding to the first to (n−1)-th animations so that a combined animation is applied to the 3D object, wherein the combined animation is obtained by forming a sum of pose movements caused by the n animations, divided by a number n of animations adding to the combined animation)

(e.g., by decomposing the first animation into a first set of channels and decomposing the second animation into a second set of channels, wherein one or more channels are comprised in the first set of channels and in the second set of channels and by using a first weighting parameter amplifying or dampening the pose movements of the 3D object caused by the first animation specifically with respect to the one or more channels comprised in the first set of channels and in the second set of channels and leaving the pose movements of the 3D object caused by the first animation uninfluenced with respect to remaining channels of the first set of channels and by using a second weighting parameter amplifying or dampening the pose movements of the 3D object caused by the second animation specifically with respect to the one or more channels comprised in the first set of channels and in the second set of channels and leaving the pose movements of the 3D object caused by the second animation uninfluenced with respect to remaining channels of the second set of channels)

(e.g., the triggering of the second animation adding to the first animation, for each common joint, so that a combined animation is applied to the respective joint of the 3D object, wherein the combined animation is obtained by forming a sum of pose movements caused by the first animation and the second animation, divided by a number of animations adding to the combined animation for the respective joint);

and adding the second animation to the first animation so that a combined animation is applied to the 3D object, wherein the combined animation is obtained by forming a sum of pose movements of the first animation and the second animation.

In accordance with a fifth aspect of the present invention, the inventors of the present application realized that one problem encountered when trying to apply an animation to a moving object stems from the fact that it is not clear how a transformation associated with the animation might be combinable with a transformation associated with the movement of the object. According to the first aspect of the present application, this difficulty can be overcome by triggering the animation to be applied to the 3D object in a manner acting on the 3D object along with the movement of the 3D object defined by the first data. Additionally, or alternatively, an animation-movement-interaction-control parameter can be used. Thus, it is clearly defined how the animation and the movement are to be combined. With this approach it is possible to not only animate static objects but also moving objects opening up new possibilities for describing a scene with an object and increasing the efficiency in describing a scene. The animation-movement-interaction-control parameter may reduce artefacts, since it can clearly define how the animation and the movement may act on the object.

Accordingly, in accordance with a fifth aspect of the present application, scene description data comprises first data defining a 3D object and a movement of the 3D object and second data triggering an animation of the 3D object. The movement of the 3D object might be defined by a sequence of time frames, wherein each time frame defines a pose of the 3D object. The second data may trigger the animation to be applied to the 3D object in a manner acting on the 3D object along with the movement of the 3D object defined by the first data. Additionally, or alternatively the second data may comprise an animation-movement-interaction-control parameter discriminating between different modes of applying the animation to the 3D object. The different modes comprise one or more of a first mode, a second mode and a third mode. At the first mode the animation is applied in a manner overriding the movement defined by the first data by using a pose of the 3D object at the time instant at which the animation is triggered by the second data as an initial pose of the 3D object to which the animation is applied. At the second mode the animation is applied in a manner overriding the movement defined by the first data by using a default pose as an initial pose of the 3D object to which the animation is applied instead of the pose of the 3D object at the time instant at which the animation is triggered by the second data. At the third mode the animation is applied to the 3D object in a manner acting on the 3D object along with the movement defined by the 3D object. For example, by decomposing the movement defined by the first data into time frames defining poses of the 3D object at different time instants over time and combining per time frame these poses with pose movements associated with the animation at the respective time instant.

Accordingly, in accordance with a fifth aspect of the present application an apparatus is configured to receive scene description data, e.g., the scene description data described above. Additionally, the apparatus is configured to obtain, from the scene description data, second data triggering an animation of the 3D object. Furthermore, the apparatus is configured to apply the animation to the 3D object in a manner acting on the 3D object along with the movement of the 3D object defined by the first data, and/or apply the animation based on, e.g., dependent on, an animation-movement-interaction-control parameter comprised by the second data, wherein the animation-movement-interaction-control parameter discriminates between different modes of applying the animation to the 3D object, comprising one or more of applying the animation in a manner overriding the movement defined by the first data by using a pose of the 3D object at the time instant at which the animation is triggered by the second data as an initial pose of the 3D object to which the animation is applied; and applying the animation in a manner overriding the movement defined by the first data by using a default pose as an initial pose of the 3D object to which the animation is applied instead of the pose of the 3D object at the time instant at which the animation is triggered by the second data; and applying the animation to the 3D object in a manner acting on the 3D object along with the movement defined by the 3D object (e.g., by decomposing the movement defined by the first data into time frames defining poses of the 3D object at different time instants over time and combining per time frame these poses with pose movements associated with the animation at the respective time instant).

In accordance with a sixth aspect of the present invention, the inventors of the present application realized that it is advantageous to control a transformation of a joint of the object using channels, wherein each channel affects only one particular transform property. For example, a first channel might indicate a rotation of the joint, a second channel might indicate a translation of the joint and a third channel might indicate a scaling or weighting. Thus, it is possible to divide/split a movement of a joint into one or more individual transforms each associated with its own channel. This provides a flexible and efficient implementation of a movement of an object. By decomposing the movement into channels it is possible to control each transformation involved with the movement individually. This enables a much finer control of the movement of the object.

Accordingly, in accordance with a sixth aspect of the present application, scene description data comprises first data defining a 3D object and a movement of the 3D object. The movement of the 3D object might be defined by a sequence of time frames, wherein each time frame defines a pose of the 3D object. The first data defines the movement of the 3D object into a set of one or more channels so that one joint of the 3D object is moved, concurrently, by more than one channel.

Accordingly, in accordance with a sixth aspect of the present application an apparatus is configured to receive scene description data, e.g., the scene description data described above. Additionally, the apparatus is configured to obtain, from the scene description data, first data defining a 3D object and a movement of the 3D object. The first data defines the movement of the 3D object into a set of one or more channels so that one joint of the 3D object is moved, concurrently, by more than one channel, e.g., the apparatus is configured to apply movements defined by one or more channels of the set of one or more channels to the one joint.

In accordance with a seventh aspect of the present invention, the inventors of the present application realized that one problem encountered when trying to use a moving object attached to a scene stems from the fact that it cannot be guaranteed that enough time frames associated with the movement of the object are transmitted. According to the first aspect of the present application, this difficulty is overcome by enabling to either interpolate between such time frames and/or by enabling to trigger an animation as a transition between two consecutive time frames. The inventors found that such an approach allows to use moving objects even if a throughput of data is not high enough to transmit enough time frames associated with the movement of the object, since the interpolation or the triggered animation provide a smooth movement of the object. This is based on the idea that a transmission of some time frames together with an information indicating that interpolations or animations have to be used instead of transmitting all time frames associated with the movement of the object reduces a bit rate and thus a signalization cost.

Accordingly, in accordance with a seventh aspect of the present application, scene description data comprises first data defining a 3D object and a movement of the 3D object. The movement of the 3D object is defined by the first data in units of time frames so that per time frame a pose of the 3D object is defined. Additionally, the scene description data comprises second data which is indicative of a pose transition mode to be applied so as to render the 3D object on the basis of the first data. If the second data indicates a first predetermined mode, e.g., a first predetermined pose transition mode, interpolation is to be used between the poses of the 3D object at the time frames, for example, an interpolation between the poses of the 3D object at two consecutive time frames. If the second data indicates a second predetermined mode, e.g., a second predetermined pose transition mode, the scene description data comprises third data which triggers, for each of one or more of the time frames, one or more animations of the 3D object which transition(s) the 3D object between the pose of the 3D object at the respective time frame towards the pose of the object at a subsequent time frame.

Accordingly, in accordance with a seventh aspect of the present application an apparatus is configured to receive scene description data, e.g., the scene description data described above. Additionally, the apparatus is configured to obtain, from the scene description data, first data defining a 3D object and a movement of the 3D object. The movement of the 3D object is defined by the first data in units of time frames so that per time frame a pose of the 3D object is defined. Additionally, the apparatus is configured to apply a pose transition mode indicated by the second data to render the 3D object on the basis of the first data, wherein, if the second data indicates a first predetermined mode, e.g., a first predetermined pose transition mode, the apparatus is configured to interpolate between the poses of the 3D object at the time frames and, if the second data indicates a second predetermined mode, e.g., a second predetermined pose transition mode, the apparatus is configured to obtain, form the scene description data, third data which triggers, for each of one or more of the time frames, one or more animations of the 3D object, wherein the apparatus is configured to apply the one or more animations to transition the 3D object between the pose of the 3D object at the respective time frame towards the pose of the object at a subsequent time frame.

Another embodiment relates to an apparatus for providing any of the herein described Scene description data.

Another embodiment relates to methods, which are based on the same considerations as the above-described apparatuses. The methods can, by the way, be completed with all features and functionalities, which are also described with regard to the apparatuses.

An embodiment is related to a computer program having a program code for performing, when running on a computer, a herein described method.

BRIEF DESCRIPTION OF THE DRAWINGS

The drawings are not necessarily to scale, emphasis instead generally being placed upon illustrating the principles of the invention. In the following description, various embodiments of the invention are described with reference to the following drawings, in which:

FIGS. 4-1, 4-2, and 4-3 show a valid gITF file which represents a triangle and includes an animation which rotates the triangle;

FIGS. 6-1 and 6-2 show a pseudo file representing joint hierarchy;

FIG. 7 shows data which represents the influence of joints to a vertex;

FIG. 9 shows syntax with a syntax element state that tells whether to play, stop, loop an animation;

FIGS. 10-1 and 10-2 show an example of an extension in the animation node of the gITF;

FIG. 12 shows an extension of the animation sample with further syntax elements start_frame, end_frame and loop_mode;

FIG. 13 shows an extension of the animation sample, wherein the further syntax elements start_frame, end_frame can be used independent of loop_mode;

FIG. 16 shows syntax with a weight attribute being added to the animation sample;

FIG. 18 shows a gITF file describing animations with more than one transformation;

FIG. 19 shows an example of syntax using a weighting parameter to weight each of the channels into which an animation is decomposed;

FIG. 20 shows syntax with weights that weight non-listed channels with a default weight;

FIG. 23 shows syntax with explicit signalling to indicate ordering information of simultaneously running animations;

FIG. 24 shows syntax comprising ordering information and an inter-animation-control parameter;

FIG. 26 shows how something can be added to a scene in a gITF file;

FIG. 27 shows a gITF file with a volumetric scan being added to a scene;

FIG. 28 shows syntax with an animation-movement-interaction-control parameter;

FIG. 30 shows syntax with a weight, which is to be applied to a volumetric scan;

FIG. 32 shows a linkage of the gITFAnimationSample to an object in the gITF;

FIG. 34 shows syntax linking a volumetric scan weight to an object;

FIG. 36 shows syntax for weighting different transformation differently;

FIG. 38 shows syntax specifying channels defining a movement of an object;

FIG. 39 shows syntax with static properties channel_index and number_of_channels;

FIG. 40 shows a gITF pseudo file, in which a volumetric video is attached to a node index;

FIG. 42 shows syntax with pose transition mode information; and

FIG. 43 shows syntax indicating animations for a pose transition.

DETAILED DESCRIPTION OF THE INVENTION

Figure 1:
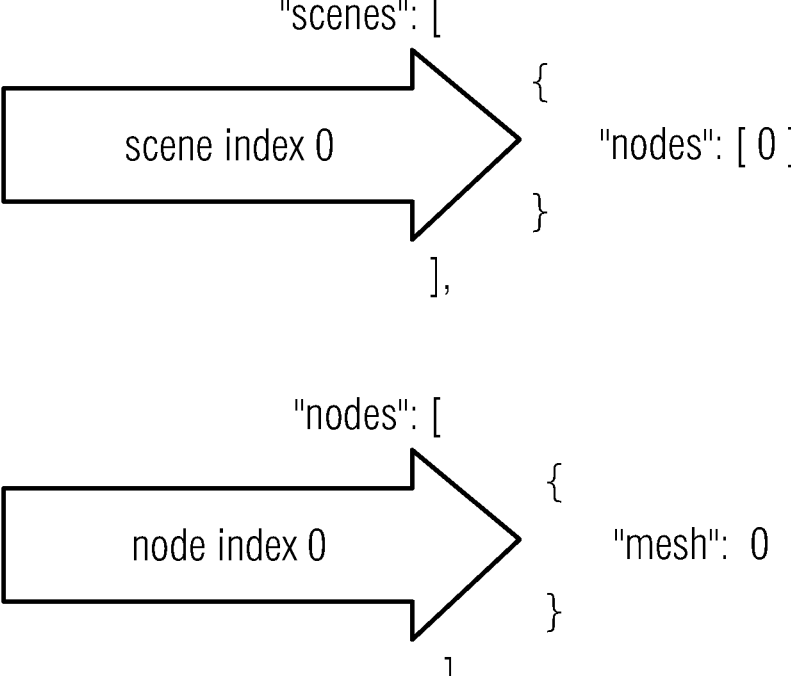
FIG. 1 shows an example of syntax describing a scene.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

In order to ease the understanding of the following embodiments of the present application, the description starts with a presentation of possible concepts into which the subsequently outlined embodiments of the present application could be built or with which the subsequently outlined embodiments of the present application could be combined with. In the following chapters one to three various examples are described which may assist in achieving a more effective compression when using multiple animations, volumetric video and/or combinations of animations and volumetric video.

1 gITF Scene and Nodes

In a gITF file, the major entry point is the scenes. There can be multiple scenes in scenes array. Typically, there will be only a single scene, as shown in FIG. 1. Each scene contains an array of nodes, which are the indices of root nodes of the scene graphs. Again, there can be multiple root nodes, wherein each root node forms different hierarchies, but in many cases, the scene will have a single root node, as shown in FIG. 1. In the example shown in FIG. 1, the nodes in scene.nodes are added to the scene.

Figure 2:
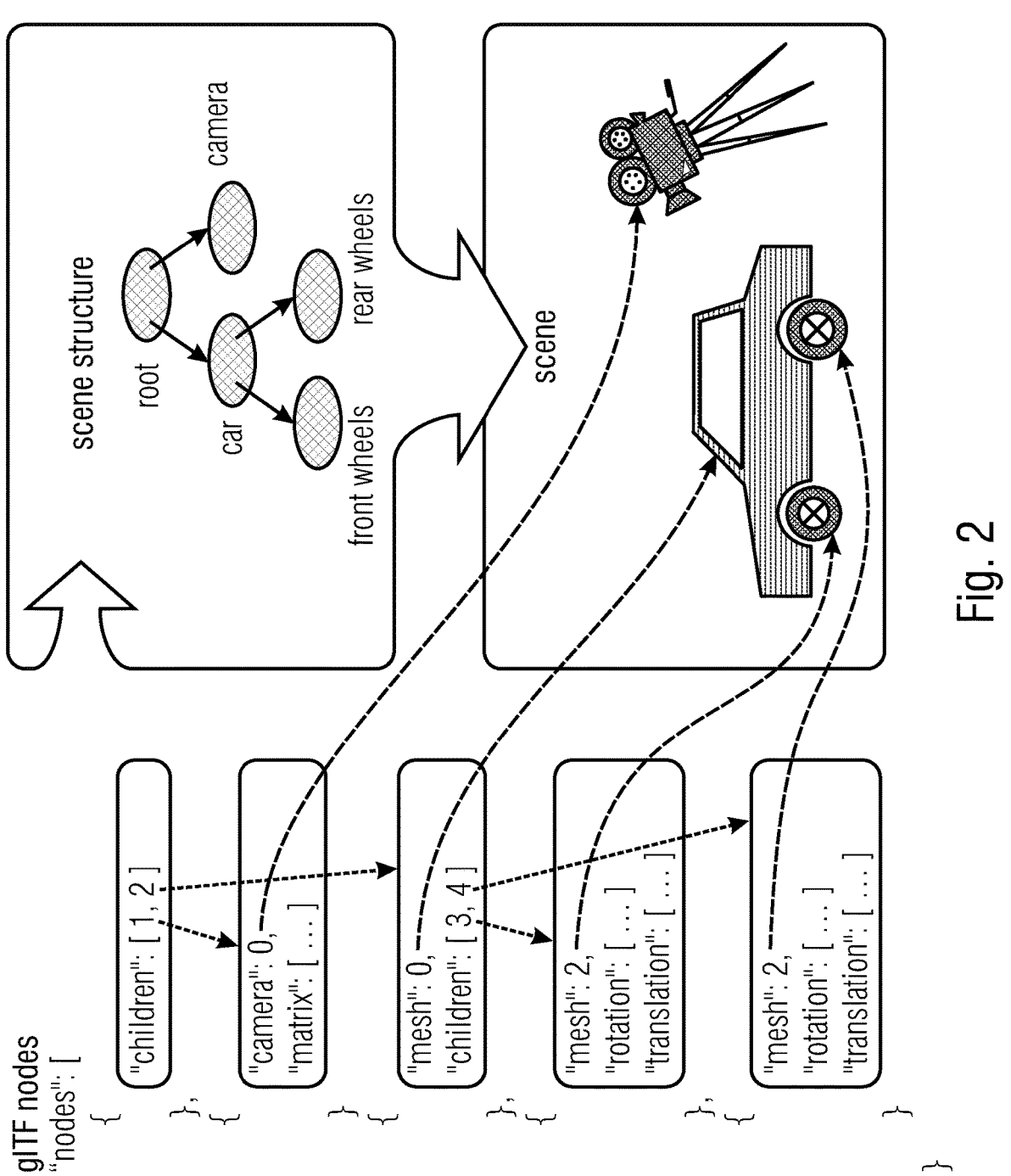
FIG. 2 shows a scene graph representation stored in the gITF JSON.

Each node can contain an array called children that contains the indices of its child nodes. So each node is one element of a hierarchy of nodes, and together they define the structure of the scene as a scene graph. See FIG. 2. Each of the nodes that are given in the scene can be traversed, recursively visiting all their children, to process all elements that are attached to the nodes. FIG. 2 shows a scene graph representation stored in the gITF JSON.

Each node can have a local transform. Such a transform will define a translation, rotation and/or scale. This transform will be applied to all elements attached to the node itself and to all its child nodes. For example:

```
"node0": {
        "translation": [ 10.0, 20.0, 30.0 ],
        "rotation": [ 0.259, 0.0, 0.0, 0.966 ],
        "scale": [ 2.0, 1.0, 0.5 ]
}
```

When computing the final, local transform matrix of the node, these matrices are multiplied together. The convention is to compute the local transform matrix as LocalMatrix=translation*rotation*scale.

The global transform of a node is given by the product of all local transforms on the path from the root to the respective node:

| structure | local transform | global transform |
| --- | --- | --- |
| root | R | R |
| +−nodeA | A | R*A |
| +−nodeB | B | R*A*B |
| +−nodeC | C | R*A*C |

Figure 3:
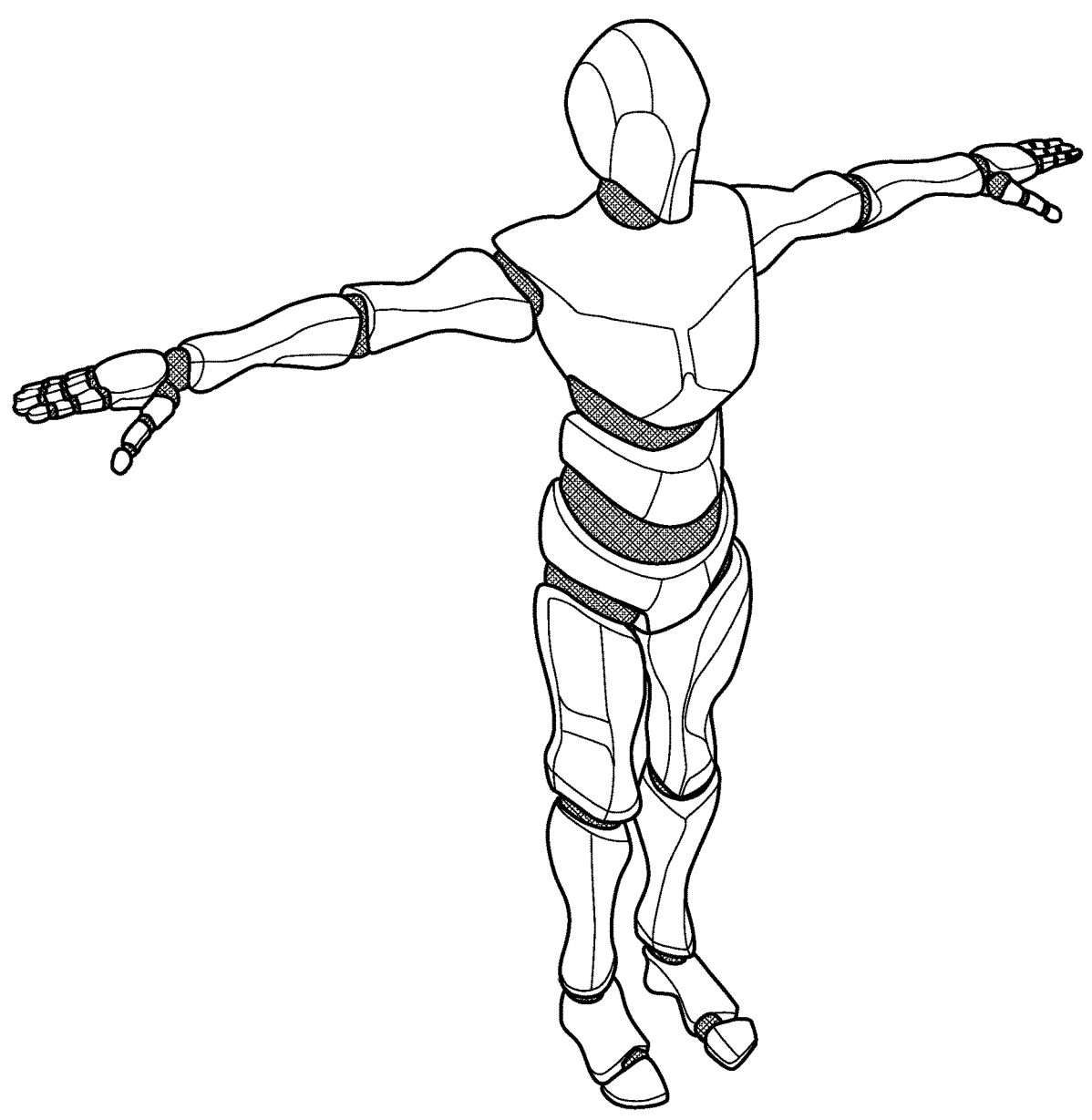
FIG. 3 shows a 3D asset.

One can import such a gITF file to any renderer which understand the gITF syntax. Microsoft Office suite also allow one to add a gITF asset to a word or ppt file. FIG. 3 shows a 3D asset.

2 gITF Animations

Each node has a local transform. An animation can be used to describe the translation, rotation or scale of a node changing over time. In the example shown in FIGS. 4-1, 4-2, and 4-3, the node at index 0 has a local transform property of rotation=[0.0, 0.0, 0.0, 1.0].

FIGS. 4-1, 4-2, and 4-3 show a valid gITF file which represents a triangle and includes an animation which rotates the triangle.

The top-level animations array contains a single animation object. It consists of two elements:

Samplers: Samplers which describe the sources of animation data

Channels: The channels which can be imagined as connecting a "source" (i.e. sampler) of the animation data to a "target"

In the given example there is one sampler. Each sampler defines an input and an output property. They both refer to accessor object. Here, these are the times accessor (with Index 2) and the rotations accessor (with index 3). Additionally, the sampler defines an interpolation type, which is "LINEAR" in this example.

There is also one channel in the example shown in FIGS. 4-1, 4-2, and 4-3. This channel refers to the only sampler (with index 0) as the source of the animation data. The target of the animation is encoded in the channel.target object; it contains an ID that refers to the node whose property should be animated. The actual node property is named in the path. So, the channel target in the given example says that the "rotation" property of the node with index 0 should be animated.

The animation data is in the buffer at index 1. Animation.sampler.input and Animation.sampler.output point to accessor at index 2 and index 3 respectively. accessor 2 and accessor 3 both point to bufferView at index 2. The bufferView at index 2 point to buffer at index 1. This is how animations data is reached solving these dependencies.

During the animation, the animated values are obtained from the "rotations" accessor. They are interpolated linearly, based on the current simulation time and the key frame times that are provided by the times accessor. The interpolated values are then written into the "rotation" property of the node with index 0.

3 Rigged 3D Object

Rigging is a technique used in skeleton animations for representing a 3D character model using a series of interconnected digital bones. Specifically, rigging refers to the process of creating the bone structure of a 3D model. This bone structure is used to manipulate the 3D model. The 3D object could be anything, space ship, a solider, a galaxy, a door. Rigging is most common in animated characters for games and movies. This technique simplifies the animation process. Once rigged with skeleton bones, any 3D object can be controlled and deformed as needed. Once a 3D object is rigged, it is animatable.

Figure 5A:
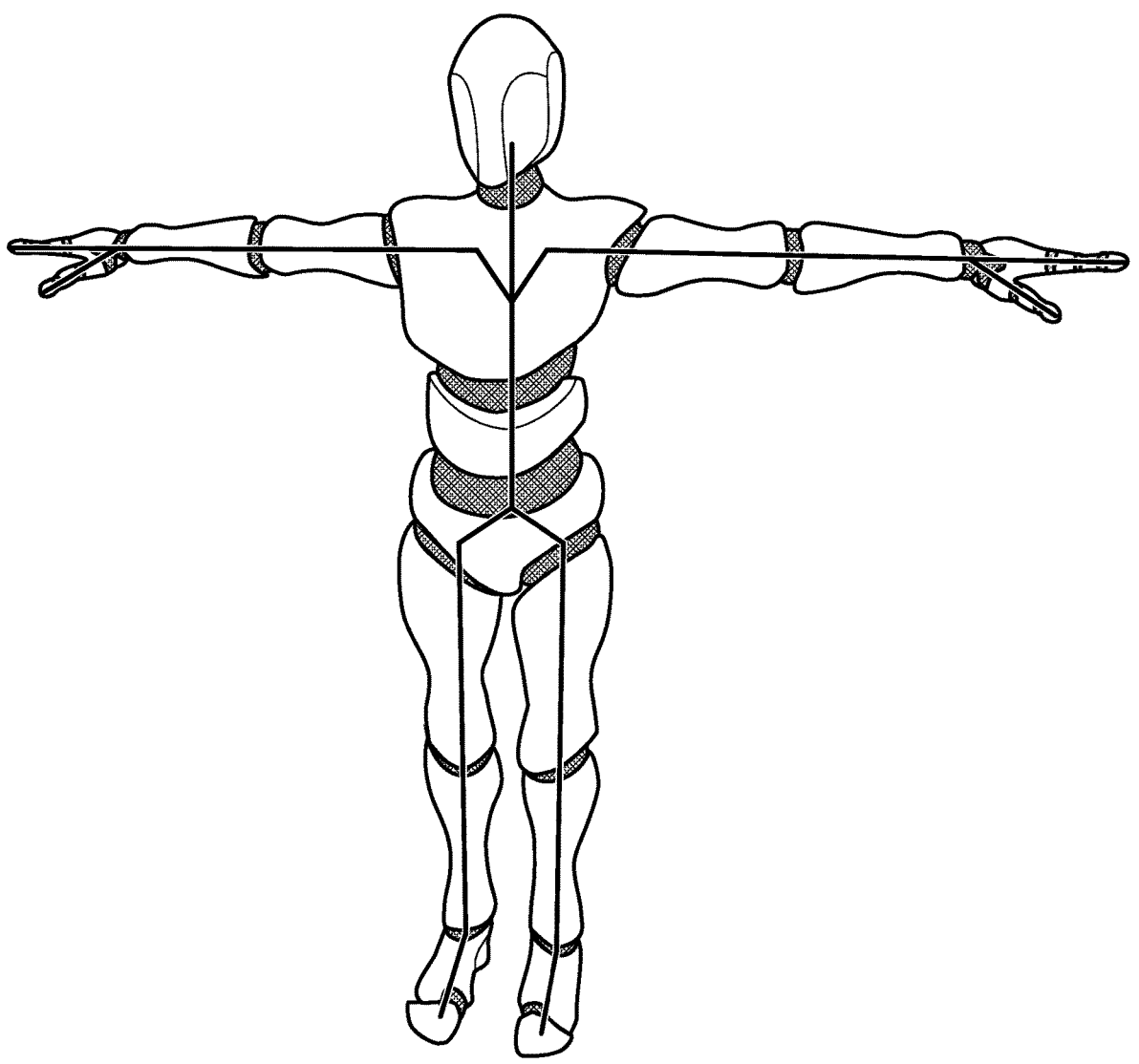
FIG. 5a shows a rigged 3D humanoid in T-pose.
Figure 5B:
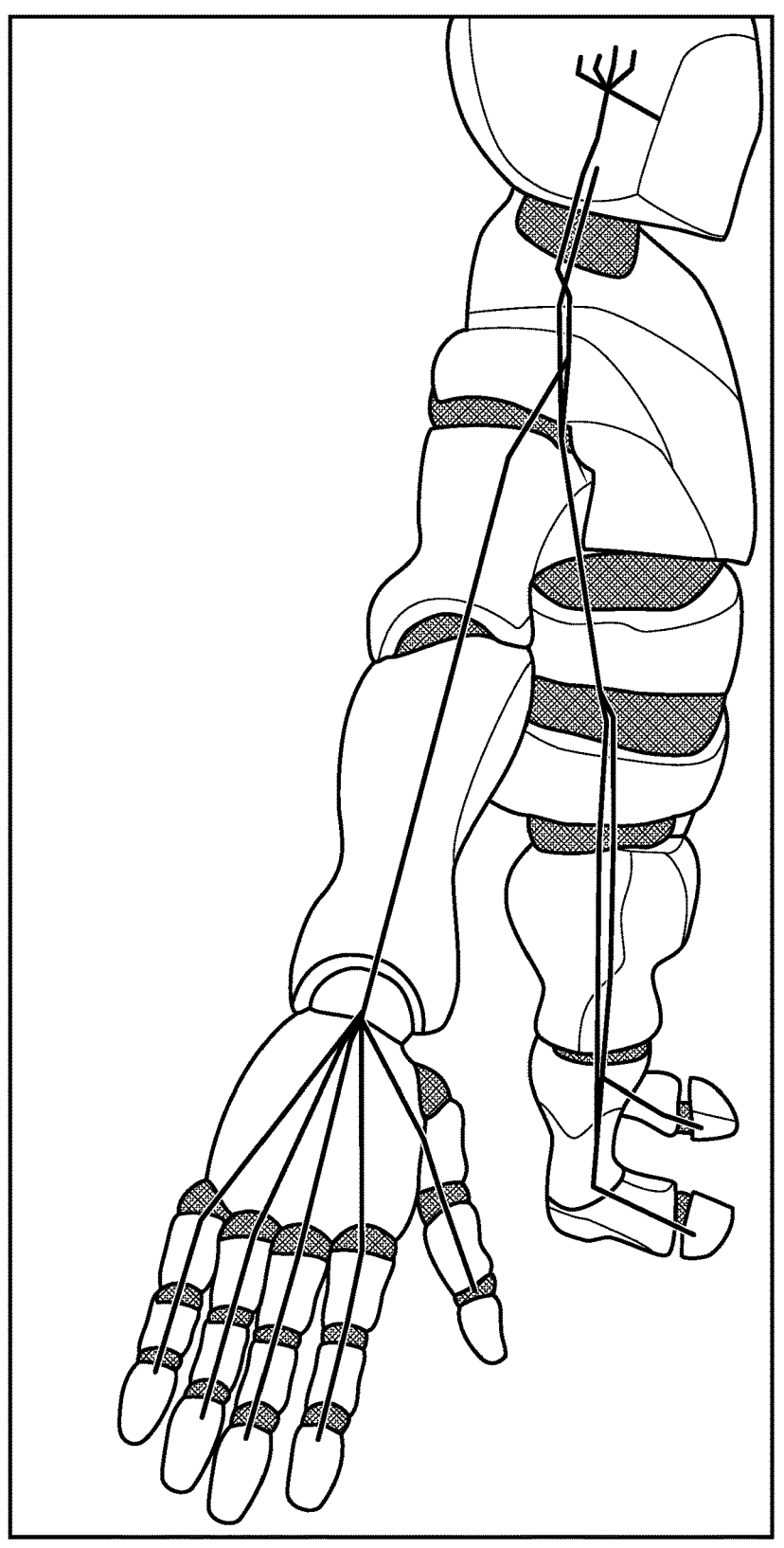
FIG. 5b shows a view of fingers in a rigged 3D humanoid.

FIG. 5a shows a rigged 3D humanoid in T-pose and FIG. 5b shows a view of fingers in a rigged 3D humanoid.

Most 3D animation packages come with a solution for rigging a model. Maya, 3Ds Max, Blender, Cinema4D and Houdini all contain skeleton animation functionality. This is a direct rigging onto the asset of interest.

There could be also implicit rigging for a simple 3D object (without a skeleton). The 3D object will have vertex correspondences to a template 3D object which is already rigged. For example; a volumetric capture of an actor can be implicitly rigged by establishing the vertex correspondences to a humanoid representation which resembles the actors.

3.1 Skeleton

The skeleton is expressed by the joint hierarchy. An example of such skeleton structure is shown in the pseudo file representing joint hierarchy shown in FIGS. 6-1 and 6-2. The Hip joint node has children: Spine→Spine1→Spine2→Neck. Each joint node has a list of children property which describes the dependent node for a particular node. That is how a hierarchy is expressed in a gITF. The local transformations of the joint nodes describe the pose of the skeleton. The skeleton is attached to the mesh whereby each joint controls a set of vertices and the influence of the controlled vertices. Upon transformation of the joint node, the vertices are deformed as well.

The transformation of the joint could be accompanied by animations as well as explained in section 2. Animation controls the transformation of joint using channel. At a given instance only one property of the joint node can be transformed. Therefore, the complete joint transformation is decomposed into multiple channels which when combined together results in final output.

For example, a JointTransformationSample contains the transformation values for the model. These transformation values will be passed to the player and each joint node will receive an update transformation value.

3.2 Animating a Rigged 3D Object

Figure 8:
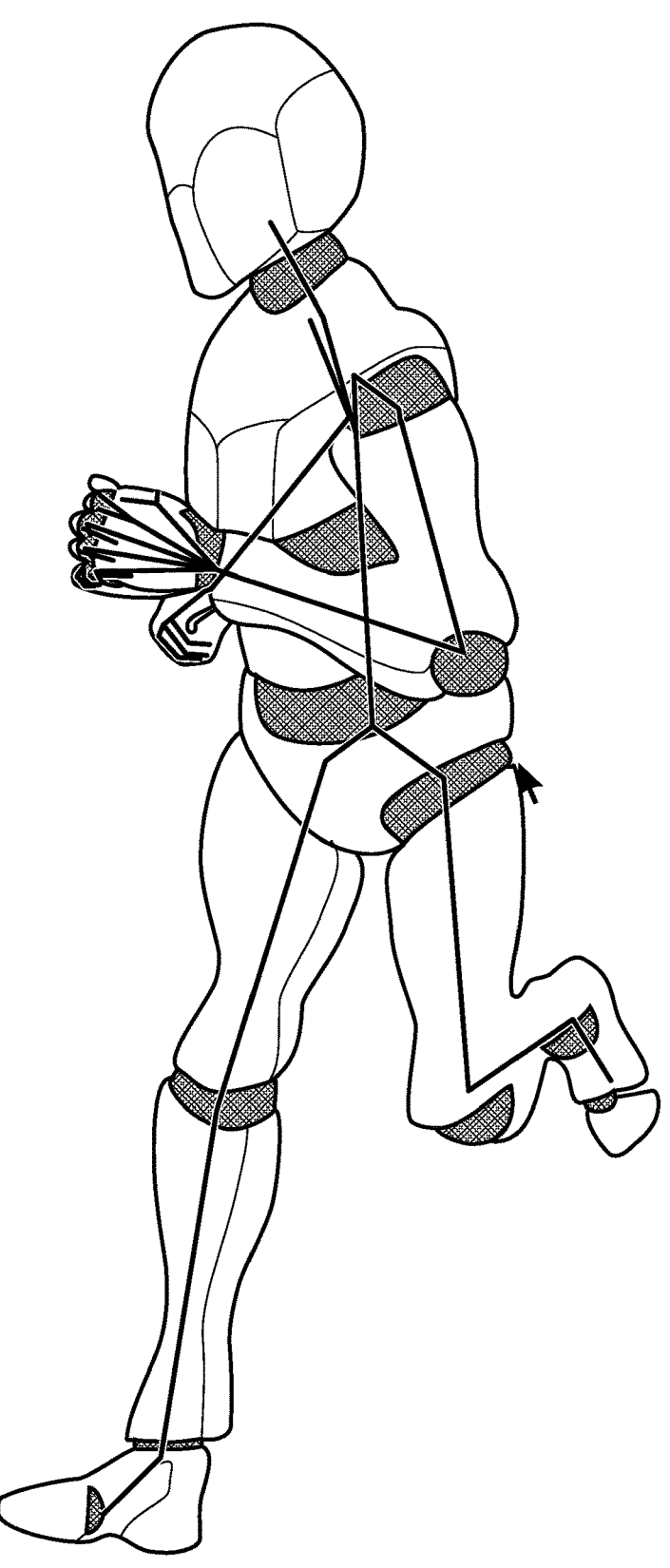
FIG. 8 shows a GIF of a running animation on a 3D model.

The rigging process results in a hierarchical structure where each joint is in a parent/child relationship with the joint it connects to. This simplifies the animations process as a whole. How the 3D model interacts with the joints is determined by a weight scale. As shown in FIG. 7 the data which represents the influence of joints to a vertex is in JOINTS_0 and how much each joint influences a vertex is in WEIGHTS_0. (reference is to accessor index) Vertices in the 3D object are attached to joints of the skeleton and influence of the joints over the vertex deformations is determined by a weight value for each vertex. For example; the vertices around the shoulder geometry associated to the shoulder joint will have a higher weight value than the vertices around the neck. FIG. 8 shows a GIF of a running animation on a 3D model.

Some characters share the same skeleton structures. For example; a male 3D object and a female 3D object will share similar structure, so an animation defined for a male 3D object can be also applied to a female 3D object. Similarly, in a scene there can be multiple instances of a male 3D object (rigged), each object placed at a different position in the scene. Imagine a dance animation is presented, and player is interested to apply the same animation to all the rigged male 3D objects. For example; 3D Bollywood dancers each performing the same dance sequence in the background.

A directly or indirectly rigged volumetric scan be also be used to apply such animations.

4 Solutions

One of the issues with the current approach that is identified comes with the looping functionality. There are cases where looping cannot simply mean restart the animation. E.g., let's consider an animation that resembles a person walking that starts with a step with the left foot and ends with a step with the left foot. Simply looping over would result in the person stepping twice with the left foot which would not make sense.

Figure 11:
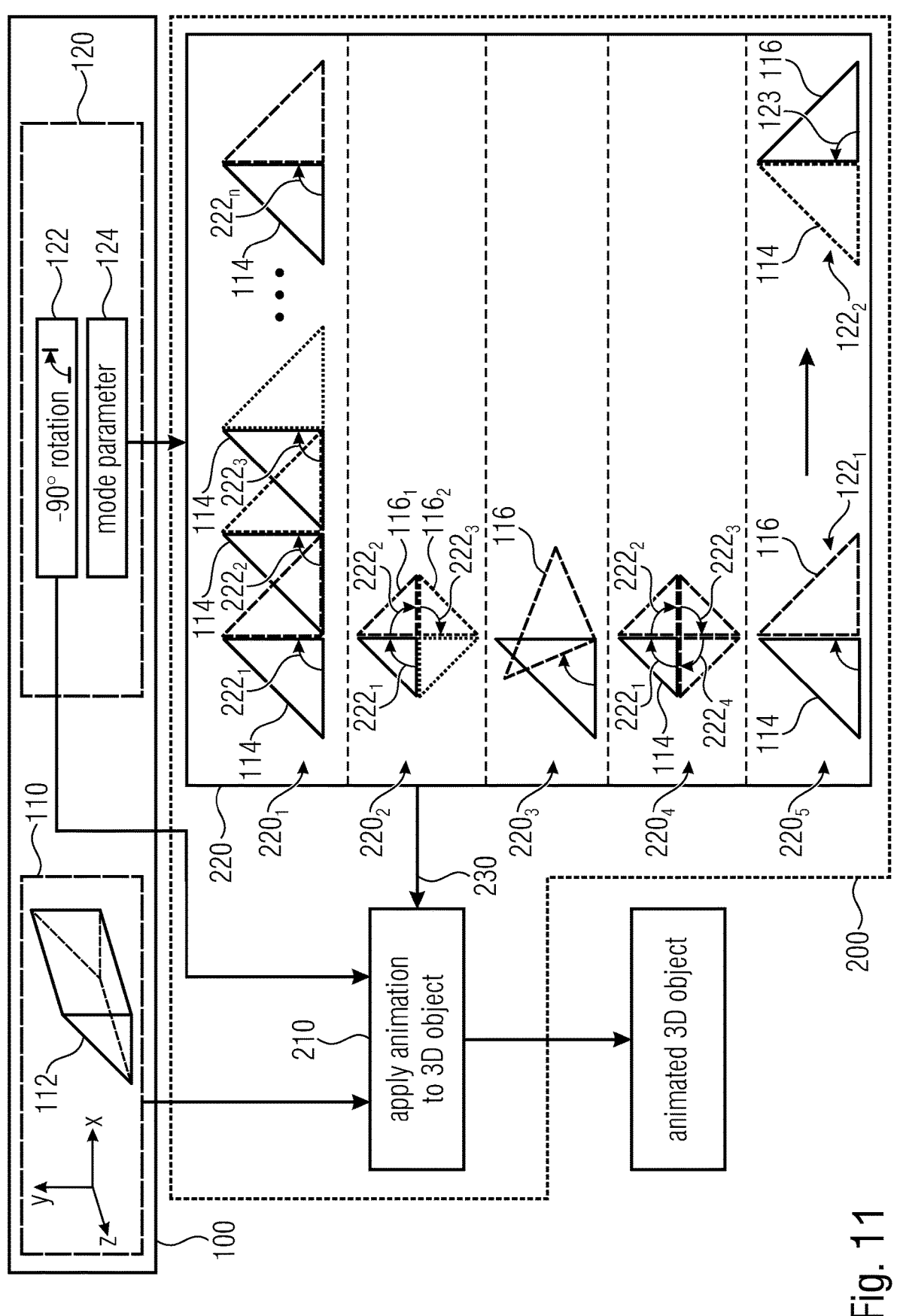
FIG. 11 shows an embodiment of scene description data and of an apparatus for animating a 3D object using a mode parameter.

FIG. 11 shows an embodiment of scene description data 100 and of an apparatus 200 for animating a 3D object 112 using the scene description data 100, which both tackle this problem.

The scene description data 100 comprises first data 110 defining a 3D object 112. FIG. 11 shows exemplarily a triangular prism as the 3D object 112, but it is clear that the 3D object 112 defined by the first data 110 is not restricted to triangular prism. Any 3D object 112, as well as a human being, can be defined be the first data 110.

Additionally, the scene description data 100 comprises second data 120 triggering an animation 122 of the 3D object 112. FIG. 11 shows exemplarily a −90° rotation as the animation 122, but it is clear that also more complex animations 122 like a run or a jump of a person or a bending of an arm of a person, can be indicated by the second data 120. The second data 120 triggers an application 210 of the animation 122 to the 3D object 112 and comprises a parameter 124, e.g. a mode parameter, discriminating between several animation modes 220 of the application 210.

The apparatus 200 obtains from the scene description data 100 the first data 110 and the second data 120 and applies 210 the animation 122 to the 3D object 112 dependent on the mode parameter 124. The apparatus, for example, is configured to select one of the several animation modes 220 based on the mode parameter 124, e.g. to obtain a selected mode 230, and apply 210 the animation 122 to the 3D object according to the selected mode 230.

FIG. 11 shows five different animation modes $220_1$ to $220_5$ from which at least one has to be comprised be the several animation modes 220. Additionally to this at least one animation mode, the several animation modes 220 may comprise further animation modes, which are not depicted in FIG. 11.

According to one of the animation modes $220_1$, e.g., a first animation mode, the apparatus 200 is configured to apply 210 the animation 122 to the 3D object 112 repeatedly in loops $222_1$ to $222_n$ with starting each loop from an initial pose 114 of the 3D object 112.

According to another animation mode $220_2$, e.g., a second animation mode, the apparatus 200 is configured to apply 210 the animation 122 to the 3D object 112 repeatedly in loops $222_1$ to $222_3$ with using a pose assumed by the 3D object at the end of one loop for starting a subsequent loop. As shown in FIG. 11, the end pose $116_1$ obtained at the end of the first loop $222_1$ is the initial pose of the second loop $222_2$ and the end pose $116_2$ obtained at the end of the second loop $222_2$ is the initial pose of the third loop $222_3$. Thus, a smooth rotation of the 3D object can be realized with this animation mode $220_2$. FIG. 11 shows three loops $222_1$ to $222_3$ of the animation 122 applied to the 3D object according to the animation mode $220_2$. However, it is clear that it is also possible to apply 210 the animation 122 only in two loops $222_1$ and $222_2$ to the object 112 or in more than the three loops $222_1$ to $222_3$.

At another animation mode $220_3$, e.g., a third animation mode, the apparatus 200 is configured to apply 210 the animation 122 to the 3D object 112 with maintaining a pose 116 assumed by the 3D object 112 at the end of the animation 122. The animation 122, for example, is applied 210 for a certain duration and then stopped to end the animation 122. The pose 116 assumed by the 3D object 112 at this stop of the animation 122 is then maintained. This mode $220_3$ might be combinable with one of the other modes, e.g., $220_1$, $220_2$, $220_4$ and/or $220_5$, of the several modes 220. Thus, the animation 122 might be applied 210 to the 3D object 112 in several loops 222 and the pose assumed by the 3D object at an stop of the animation 122, i.e. at the end of the animation 122, is then maintained. The end of the animation 122 might be defined by the second data 120 of the scene description data 100, e.g. by indicating a stopping of the animation 122. The end of the animation might differ from a predetermined end associated with the animation 122. The animation 122 indicated by the second data 120 may run for a predetermined duration and end at the predetermined end. Mode $220_3$ allows to stop the animation 122 at a time other than the predetermined end and to maintain the pose 116 assumed by the 3D object 112 at this other end of the animation 122.

According to another animation mode $220_4$, e.g., a fourth animation mode, the apparatus 200 is configured to apply 210 the animation 122 to the 3D object 112 with returning to a pose 114, e.g. an initial pose, assumed by the 3D object 112 upon a start of the application 210 of the animation 122 to the 3D object 112. As shown in FIG. 11, the 3D object 112 does not end at the initial pose 114 if the animation 122 is applied 210 to the 3D object only once. Therefore, in this case, the animation 122 is applied in loops, e.g., in loops $222_1$ to $222_4$, so that the 3D object returns to the initial pose 114. However, at other animations 122, like a 360° rotation, the animation 122 is applied 210 only once and an end pose equaling the initial pose 114 is then kept.

According to another animation mode $220_5$, e.g., a fifth animation mode, the apparatus 200 is configured to apply 210 the animation $122_2$, e.g., once or repeatedly in loops 222, to the 3D object 112 in reverse 123 with starting from a pose 116 assumed by the 3D object 112 at the end of a previously applied animation $122_1$. The previously applied animation $122_1$ might be the animation 122 indicated by the second data 120 or might be a different animation.

With mode $220_2$ the object 112 could be rotated by 90 degrees and by looping such an animation the rotation could be continued further 90 degrees (achieving overall 180 degrees) or rotating again the same 90 degrees (achieving overall 270 degrees). Another alternative would be to mirror the animation by rotating backwards 90 degrees 123 to return to the origin position 114 afterwards, see mode $220_5$.

In a first embodiment signalling, e.g., the mode parameter 124, is provided to indicate how the looping should be carried out. The looping indication contains one or more of the following parameters (or combinations thereof):

Start of the animation (from where to loop over)

End of the animation (at which point to loop over)

Return to the initial state (go back to the initial pose of the object at each loop), e.g., mode $220_4$ Continue the animation (keep the last pose of the object at each loop), e.g., mode $220_2$ Inverse the animation from last position, i.e. "mirroring" (e.g. when rotating clockwise 90 degrees start rotating anti-clockwise 90 degrees), e.g., mode $220_5$ Do not loop and go back to initial pose, e.g., mode $220_4$ Do not loop and keep the last pose, e.g., mode $220_3$ Examples of how the syntax could look like are shown in the following.

One option would be to use the existing "state" syntax, see FIG. 9, and add further values, see table 2. Thus, the "state" syntax may represent the mode parameter 124.

TABLE 2

| Semantics of state value of glTFAnimationSample | | |
| --- | --- | --- |
| value | identifier | description |
| 0 | play | Play the animation |
| 1 | stop | Stop the animation and return to the initial state |
| 2 | pause | Pause animation |
| 3 | restart | Restart the animation, equivalent to stopping animation and playing it from the beginning. |
| 4 | update | Update the animation characteristic, e.g. speed |
| 5 | loop | Sets the animation to be run repeatedly in a loop. |
| 6 | loop_cycle | Every loop begins from the initial state of the animation (i.e. reset to the original pose), e.g., mode $220_1$ |
| 7 | loop_relative | The loop begins from the last state of the previous animation (continue with the last pose), e.g., mode $220_2$ |
| 8 | keep_final | At animation end, keep the final state (stop animation but keep the last pose), e.g., mode $220_3$ |
| 9 | go_to_initial | At animation end, go back to initial state (stop animation and go back to initial pose), e.g., mode $220_4$ |

TABLE 2-continued

| Semantics of state value of gITFAnimationSample | | |
|---|---|---|
| value | identifier | description |
| 10 | mirror | The loop begins mirroring the previous interval from the last state of the previous animation, e.g., mode $220_5$ |
| 11 . . . 63 | reserved | Reserved for future use |

Another alternative would be to extend the Animation sample with further syntax elements, as shown in FIG. 12 and table 3.

TABLE 3

| Semantics of further syntax elements | |
|---|---|
| Property | Description |
| start_frame | frame offset in order to reposition the start of the animation |
| end_frame | frame offset in order to reposition the end of the animation |
| loop_mode | Behaviour of the animation at the end key-frame in case of loop<br>0.  Cycle: The animation restarts from the beginning (same as 6 above in table 1)<br>1.  Relative: the animation continues from the last key value(same as 7 above in table 1)<br>2.  Keep_Final: the animation will stop at the last key value (same as 8 above in table 1)<br>3.  Mirror (same as 10 above in table 1)<br>4.  Go_to_Initital (same as 9 above in table 1)<br>[5-63] Reserved |

According to the embodiment shown in FIG. 12, offsets start_frame 126$_1$ and end_frame 126$_2$ are added to indicate that not the whole animation 122 is played. For instance, when loops 222 are used so that a loop event is triggered at the end_frame 126$_2$ and looped over at start_frame 126$_1$. Also an additional loop_mode syntax 124 is used instead of using the state value as before, but the same option could be indicated for this case (i.e., cycle, relative, mirror, go_to_initial, keep_final). Thus, the loop_mode syntax 124 may represent the mode parameter.

In addition to the use-case of looping, the start_frame 126$_1$ and end_frame 126$_2$ syntax could also be useful when not looping, e.g. when a subset of an animation 122 needs to be played, which could also be entailed when playing it alone or back to back sequentially with other animations so that the end result looks acceptable. I.e., scenarios where multiple animations are sequenced to convey a story, it would include smooth transition from one animation to another animation as the playback progress. In such a case, the presence of the two syntax elements would not be only based on the state being "loop" but the syntax could be extended as shown in FIG. 13 and table 4.

TABLE 4

| Semantics of further syntax elements | |
|---|---|
| Property | Description |
| enable_offsets | if equal to True, the animation will be included start_frame and end_frame |

*Further syntax as described above

A trimming parameter 126, as will be described in more detail with regard to FIG. 14, might be represented by the syntax elements start_frame 126$_1$ and end frame 126$_2$.

Figure 14:
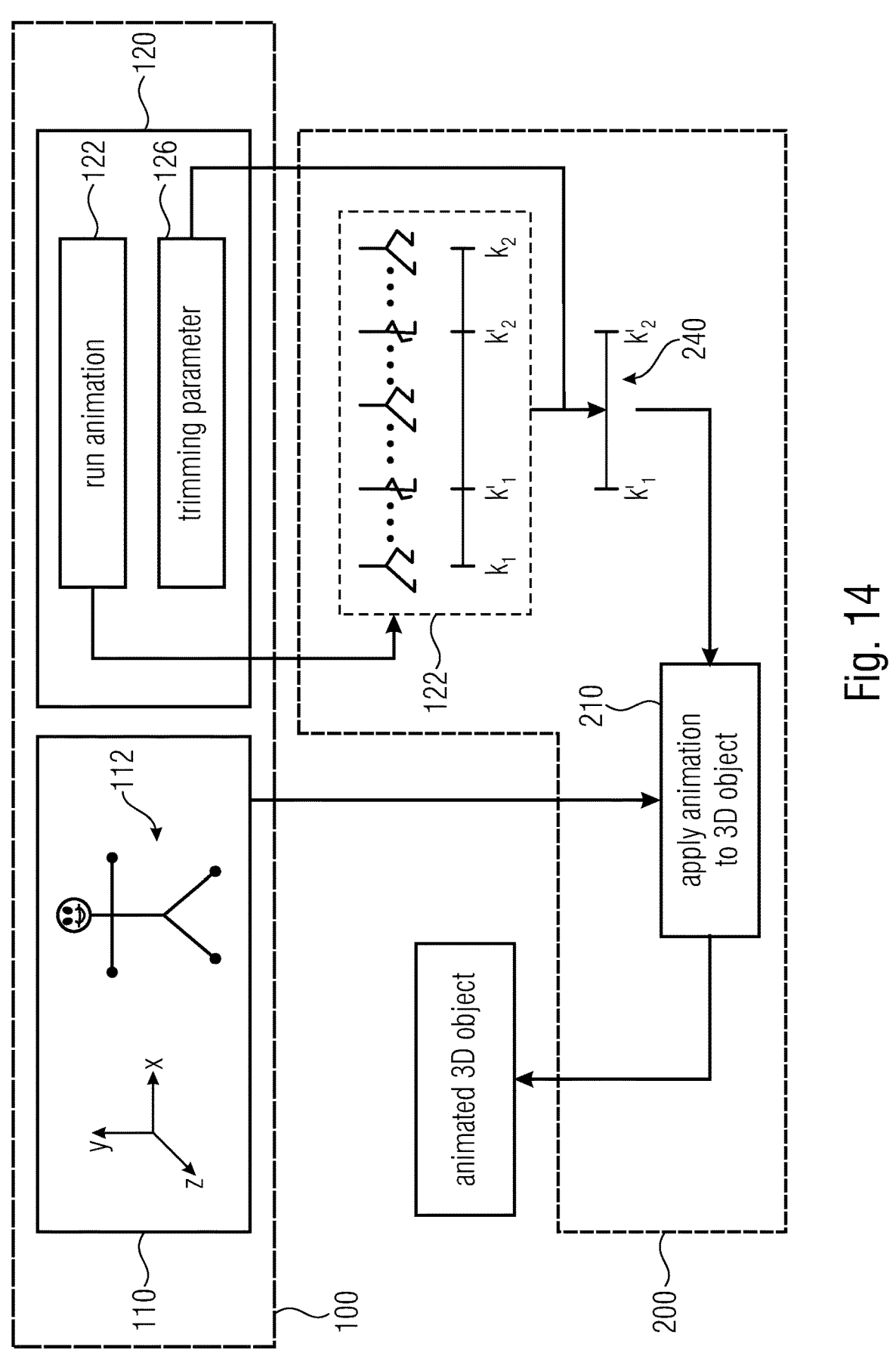
FIG. 14 shows an embodiment of scene description data and of an apparatus for animating a 3D object using a trimming parameter.

FIG. 14 shows an embodiment of scene description data 100 and of an apparatus 200 for animating a 3D object 112 using the scene description data 100.

The scene description data 100 comprises first data 110 defining a 3D object 112. FIG. 14 shows exemplarily a human person as the 3D object 112, but it is clear that the 3D object 112 defined by the first data 110 is not restricted to human persons. Any 3D object 112, as well as animals or geometric 3D objects, can be defined be the first data 110.

Additionally, the scene description data 100 comprises second data 120 triggering an animation 122 of the 3D object 112. FIG. 14 shows exemplarily a run animation as the animation 122, but it is clear that also other animations 122 are possible. The second data 120 triggers an application 210 of the animation 122 to the 3D object 112 and comprises a trimming parameter 126, e.g. a timing parameter or a key frame parameter, controlling as to which temporal subinterval 240 of the animation 122 or of a cyclic application 210 of the animation 122 is applied 210 to the 3D object 112.

The apparatus 200 obtains from the scene description data 100 the first data 110 and the second data 120 and applies 210 the temporal subinterval 240 of the animation 122 or of a cyclic application 210 of the animation 122 to the 3D object 112 based on the trimming parameter 126.

According to an embodiment, the trimming parameter 126 indicates a start frame k'$_1$ and an end frame k'$_2$ of the temporal subinterval 240 of the animation 122 or of the cyclic application of the animation 122 to be applied to the 3D object 112.

As shown in FIG. 14, the animation 122 can indicate movements of feet of the object 112, wherein one foot is placed in front of the other. Exemplarily the initial pose k$_1$ equals the last pose k$_2$ of the animation 122. The trimming parameter 126 enables to select a subinterval 240 of the animation 122 at which, for example, the object 112 starts the run with a different food than originally intended by the animation 122. Thus, it is possible to adapt a predetermined animation 122 using the trimming parameter 126 so that a smooth transition from one animation to another animation might be achieved. This is based on the idea that the subinterval 240 can be chosen so that the initial pose k'$_1$ associated with a start of the subinterval 240 and a last pose k'$_2$ associated with an end of the subinterval 240 enable a smooth transition between a previous animation applied to the object 112 and a subsequent animation to be applied to the 3D object 112 after the subinterval 240, since the two poses k'$_1$ and k'$_2$ can at least partly be adapted to different start and end positions of other animations.

In case of the animation 122 being looped, i.e. a cyclic application 210 of the animation 122, a subinterval 240 of a duration of all loops might be chosen. Thus, it is possible that the initial pose k'$_1$ of the subinterval equals a pose of the first loop k$_1$ to k$_2$ and that the last pose k'$_2$ of the subinterval 240 equals a pose of a subsequent loop of the animation 122, e.g., a pose in the last loop of the animation 122.

According to another embodiment, the subinterval 240 of the animation 122 can be applied 210 to the 3D object 112 in loops, i.e. a cyclic application 210 of the subinterval 240 to the object 112.

The cyclic application 210 of the animation 122 to the object 112 or the cyclic application 210 of the subinterval 240 to the object 112 might be indicated by a mode parameter 124, which can be comprised by the second data 120 and which can be associated with features and/or functionalities, as described with regard to the mode parameter in FIG. 11.

As discussed above, another aspect that is tackled herein is the case that there are multiple animations 122 acting on the same target. For this, purpose, it is identified how these several animations 122 are used to transform the object 112.

On one embodiment, a weight, e.g., a weight parameter 128, is provided that may indicate how much of each animation is taken for each of the final results. This is based on the idea that if several animations are acting on the same joints and/or bones of the object 112 it might look more realistic, if not all animations are applied to 100% to the object 112. Especially the inventors found, that it is advantageous to dampen or amplify individual pose movements associated with an animation, since only some pose movements associated with one animation might be applied to the same joints and/or bones of the object 112 as pose movements associated with another animation.

Figure 15:
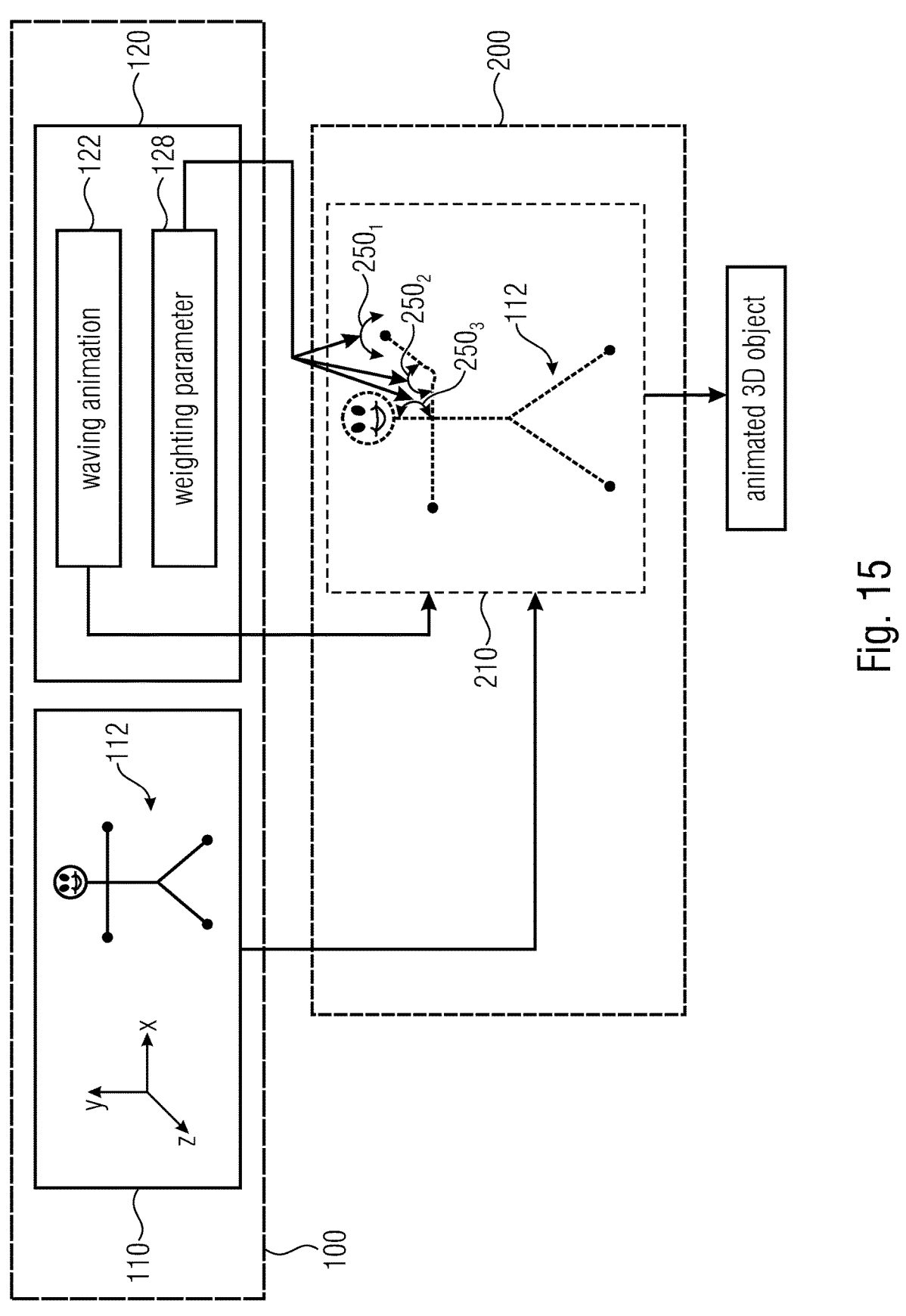
FIG. 15 shows an embodiment of scene description data and of an apparatus for animating a 3D object using a weighting parameter.

FIG. 15 shows an embodiment of scene description data 100 and of an apparatus 200 for animating a 3D object 112 using the scene description data 100, wherein the weighting parameter 128 is described in more detail.

The scene description data 100 comprises first data 110 defining a 3D object 112, see also the description with regard to FIG. 11 and/or FIG. 14.

Additionally, the scene description data 100 comprises second data 120 triggering an animation 122 of the 3D object 112. FIG. 15 shows exemplarily a waving animation as the animation 122, but it is clear that also other animations 122 are possible. Additionally, the second data 120 comprises a weighting parameter 128 amplifying or dampening pose movements 250, e.g., 250₁ to 250₃, of the 3D object 112 caused by the animation 122.

The apparatus 200 obtains from the scene description data 100 the first data 110 and the second data 120 and amplifies or dampens the pose movements 250 of the 3D object 112 caused by the animation 122 using the weighting parameter 128.

According to an embodiment, the weighting parameter 128 indicates for at least one of the pose movements 250 associated with the animation 122 a weight specifying how much the respective pose movement is to be amplified or dampened.

According to an embodiment, the weighting parameter 128 can indicate for all pose movements 250 associated with the animation 122 the same amplification or damping. Alternatively, the weighting parameter 128 can indicate for each pose movements 250 associated with the animation 122 a different amplification or damping or the weighting parameter 128 can indicate for some pose movements 250 associated with the animation 122 the same amplification or damping and for others a different amplification or damping. The weighting parameter 128 may also indicate whether some pose movements 250 may not be amplified or dampened. This might either be realized by specifying a weight of one for a pose movement 250, which is not to be amplified or dampened, or by specifying no weight for this pose movement 250, wherein the apparatus 200 may then be configured to infer that pose movements 250 to which no weight is assigned are not to be amplified or dampened.

The inventors found that such a weighting of pose movements 250 associated with an animation are advantageous in terms of flexibility and in terms of providing a more realistically animated object 112. This is based on the idea that the weighting parameter 128 allows to adapt a predetermined animation 122 to different objects 112 to be animated or to different scenes comprising the object 112 to be animated. With the weighting parameter 128 an object 112 can be animated very individually avoiding or reducing an unrealistic animation of the respective object 112.

The weighting parameter 128 is especially advantageous, if more than one animation 112 is applied to the same object 112, since it is possible to amplify or dampen pose movements 250 of two or more animations 122 associated with the same joints and/or bones of the object.

According to the following three embodiments, the animation 122 triggered by the second data 120 represents a first animation of the 3D object 112, and the scene description data comprises additionally third data triggering a second animation of the 3D object 112. The third data triggers the second animation of the 3D object 112 so that the first animation and the second animation are running simultaneously at least for a certain time interval. The first animation of the 3D object 112 is defined in the scene description data 100 in a manner decomposed into a first set of channels and, for example, into remaining channels, and the second animation of the 3D object 112 is defined in the scene description data 100 in a manner decomposed into a second set of channels and, for example, into remaining channels. For each channel of the first set of channels, the respective channel defines a pose movement for a joint of the 3D object 112 and, for each channel of the second set of channels, the respective channel defines a pose movement for a joint of the 3D object. Pose movements defined by the one or more channels of the first set of channels are applied to the same joints, e.g., common joints, as pose movements defined by the one or more channels of the second set of channels, e.g., the channels of the first- and second set of channels are associated with the same joints.

According to a first embodiment, the weighting parameter 128 comprised by the second data 120 amplifies or dampens the pose movements 250 defined by the one or more channels of the first set of channels and leaving the pose movements 250 of the 3D object 112 caused by the first animation 122 uninfluenced with respect to the remaining channels into which the first animation is decomposed. The third data comprises another weighting parameter amplifying or dampening the pose movements defined by the one or more channels of the second set of channels and leaving the pose movements of the 3D object caused by the second animation uninfluenced with respect to the remaining channels into which the second animation is decomposed.

According to a second embodiment, the weighting parameter 128 comprised by the second data 120 amplifies or dampens the pose movements 250 defined by the one or more channels of the first set of channels and a further weighting parameter is to be inferred, which further weighting parameter amplifies or dampens the pose movements 250 of the 3D object 112 caused by the first animation 122 with respect to the remaining channels into which the first animation is decomposed. The third data comprises another weighting parameter amplifying or dampening the pose movements defined by the one or more channels of the second set of channels and a further another weighting parameter is to be inferred, which further another weighting parameter amplifies or dampens the pose movements of the 3D object caused by the second animation with respect to the remaining channels into which the second animation is decomposed.

According to a third embodiment, the weighting parameter 128 comprised by the second data 120 amplifies or dampens the pose movements 250 defined by the one or more channels of the first set of channels and the second data 120 comprises a further weighting parameter amplifying or dampening the pose movements 250 of the 3D object 112 caused by the first animation 122 with respect to the remaining channels into which the first animation is decomposed. The third data comprises another weighting parameter amplifying or dampening the pose movements defined by the one or more channels of the second set of channels and the third data comprises a further another weighting parameter amplifying or dampening the pose movements of the 3D object caused by the second animation with respect to the remaining channels into which the second animation is decomposed.

According to an embodiment, additionally to the features described in one of the embodiments one to three above, the following feature might be implemented: The second animation can be added to the first animation 122 so that a combined animation is applied to the 3D object 112, wherein the combined animation is obtained by forming a sum of pose movements caused by the first animation 122 and the second animation, e.g., a sum of all pose movements, i.e. of the amplified or dampened pose movements and of the unprocessed (e.g., unamplified or undampened) pose movements, divided by a number of animations adding to the combined animation, e.g. divided by two, if only the first and the second animation are running at the same time.

According to an alternative embodiment, additionally to the features described in one of the embodiments one to three above, the following feature might be implemented: The second data might trigger the first animation 122 so that the first animation 122 is applied to the 3D object 112 during a first time interval, and the third data triggers the second animation of the 3D object so that the second animation is applied to the 3D object during a second time interval, wherein the first time interval and the second time interval are at least partially overlapping so that the first animation and the second animation are running simultaneously at least for the certain time interval, e.g. the time interval during which the first animation and the second animation are overlapping represents the certain time interval. The second animation is added to the first animation so that a combined animation is applied to the 3D object during the certain time interval, wherein the combined animation is obtained by forming a sum of pose movements caused by the first animation and the second animation (e.g., a sum of all pose movements, i.e. of the amplified or dampened pose movements and of the unprocessed (e.g., unamplified or undamped) pose movements), divided by a number of animations adding to the combined animation (e.g. divided by two, if only the first and the second animation are running at the same time).

Additionally, the weighting parameter may amplify or dampen the pose movements of the 3D object 112 caused by the first animation 122 and the second animation during the certain time interval using a first scaling and during the remaining first time interval using a second scaling and/or during the remaining second time interval using a third scaling.

According to an embodiment, the second data 120 comprises two or more weighting parameter amplifying or dampening pose movements 250 of the 3D object 112 caused by the animation 122, e.g., a weighting parameter per joint or a weighting parameter per channel.

According to an embodiment, the scene description data 100 and/or the apparatus 200 may comprise features and/or functionalities which are described with regard to one of FIGS. 16 to 20.

In the example provided in FIG. 16 a weight attribute 128, i.e. the weighting parameter, is added to the animation Sample, e.g., comprised by the second data 120.

Note that animations typically involve acting onto several joints or bones (represented by nodes in a gITF file) of a skeleton and providing a single weight value for the whole animation might lead to results that look visually unrealistic. One could envision for instance two animations; one acting on all joints and another only acting on a subset thereof. Therefore, the joints that are only affected by one animation could be fully affected (weight of 100%) by the single animation that has an impact on these joints while the other joints could be weighted differently (e.g. 50% each animation if there are two).

Therefore, in another embodiment a more flexible weight signalling is provided that allows a finer granular approach. For instance, one weigh per joint or even one weight per transformation described for a joint.

Figures 17A, 17B:
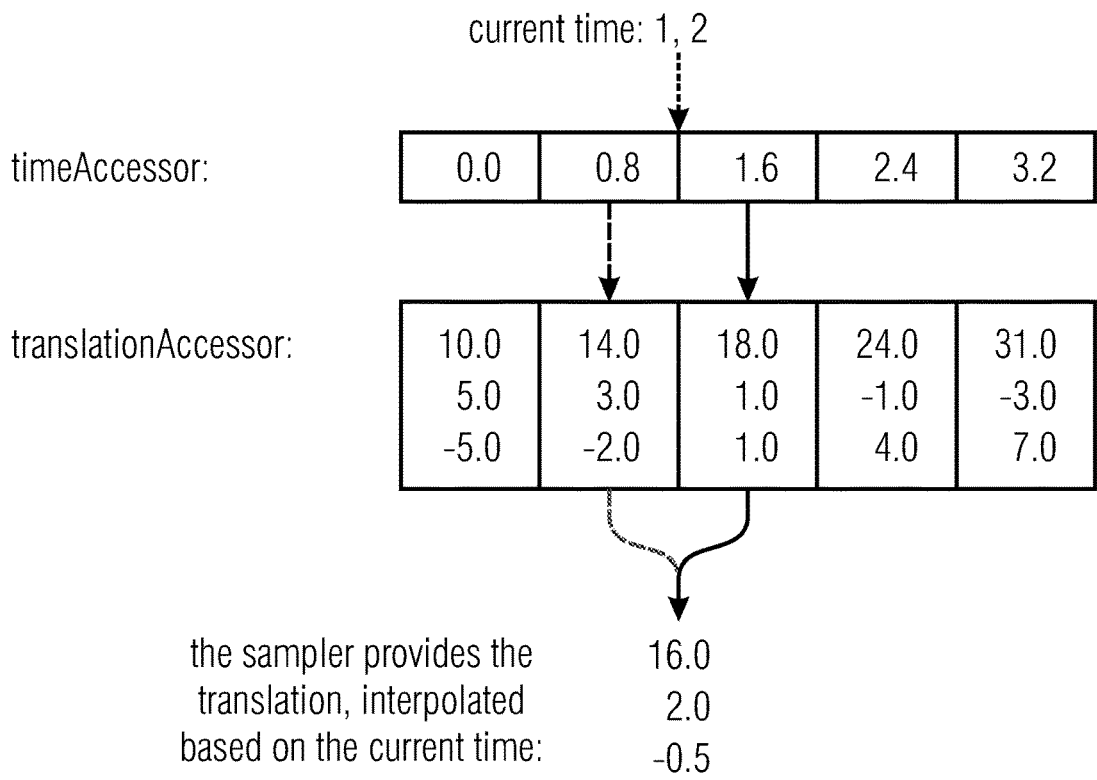
FIG. 17a shows how an animation works.
FIG. 17b shows an interpolation between key frames for a playback of an animation.

An example is shown in FIGS. 17a and 17b on how simple animations work. In the example node 2 corresponds to a joint in the skeleton. In a gITF file there is an animation available which transforms(translate) the node 2. As per the animation in the index 0 in the animations array; node 2 is translated linearly. The key frame values of translation and time are present in the samplers.input and samplers.output respectively. During the playback of the animation, the translation value for the node 2 is calculated for each frame as an interpolated value between the keyframes as shown in FIG. 17b.

Note that gITF can describe more complex animations with more than one transformation. In fact, for example, it describes an animation 122 as a collection of transformations, i.e. pose movements 250, in the form of channels. An example is shown in FIG. 18.

So, basically samplers are defined that indicate in the "input": a time interval and as the "output": the transformation key-frame values. Then an animation (e.g. Animation1) has a given set of channels that point to the index in the samplers array that needs to be applied to perform an animation and indicate which node (target) is affected thereby. For example, the animation 122 of the 3D object 112 is defined in the scene description data 100 (e.g., the scene description data 100 shown in FIG. 15) in a manner decomposed into channels. Each channel might be associated with one of the pose movement 250 associated with the animation 122 and each channel might indicate the node, i.e. the joints and/or bones, to which the respective pose movement 250 is to be applied 210. Note also that an animation can have more than one channel that affect a particular node, e.g. node 0 in the example for Animation1 has a channel attached that indicates rotation and a channel that indicates translation. The animation 122 may comprise for each pose movement 250 a separate channel.

According to an embodiment, the weighting parameter 128 amplifies or dampens the pose movements 250 of the 3D object 112 caused by the animation 122 dependent on the channel with which the respective pose movement 250 is associated, e.g., the weighting parameter 128 amplifies or dampens the pose movements 250 of the 3D object 112 channel individually. FIG. 19 shows an example of syntax using this property of animation to be able to weight each of the channels (separately provided transformation for each node) separately. The weight attribute 128, i.e. the weighting parameter, may be representable by weight[i][j] specifying the weight to be applied to the j-th channel of the animation 122, e.g., in units of $\frac{1}{255}$.

According to an embodiment, the weighting parameter 128 amplifies or dampens the pose movements 250 of the 3D object caused by the animation 122 specifically with respect to one or more predetermined channels and leaves the pose movements of the 3D object caused by the animation uninfluenced with respect to remaining channels. For example, only channels, which assign a pose movement 250 to a node to which one or more further pose movements 250 associated with another animation, i.e. a second animation, have to be applied, are amplified or dampened using to the weighting parameter 128. For example, the scene description data 100 comprises additionally third data triggering the second animation of the 3D object 112. The third data may trigger the second animation of the 3D object 112 so that the animation 122, i.e. a first animation, and the second animation are running simultaneously at least for a certain time interval.

According to another embodiment, the weighting parameter 128 amplifies or dampens the pose movements 250 of the 3D object 112 caused by the animation 122 specifically with respect to one or more predetermined channels. Additionally, the second data 120 comprises another weighting parameter amplifying or dampening pose movements 250 of the 3D object 112 caused by the animation 122 with respect to one or more further channels. Alternatively, the weighting parameter 128 may indicate for each channel of the one or more predetermined channels and of the one or more further channels individually a weight specifying the amplification or damping for the respective channel.

According to an embodiment, the weighting parameter 128 may indicate channel individually a weight specifying the amplification or damping for the respective channel. The weighting parameter may not indicate for each channel into which the animation 122 is decomposed a weight. In case the weighting parameter 128 does not specify a weight for a channel, the apparatus 200 may be configured to infer that this channel is not to be amplified or dampened.

For example, the channels into which the animation 122 is decomposed consist of the one or more predetermined channels and the remaining channels. The one or more predetermined channels may correspond to channels associated with joints and/or bones of the 3D object 112 to which one or more animations are applied simultaneously and remaining channels may correspond to channels associated with joints and/or bones of the 3D object 112 to which only the animation 122 is applied.

Note that the animation 122 described within a gITFAnimationSample and for which a weight, i.e. a weighting parameter 128, and a channel_index are provided might have a different number of channels than the animation describe in gITF that is triggered.

One possibility would be that the non-listed channels get a weight of 1 (meaning fully applied). Another possibility is that they get a weight of 0 (meaning not applied). A further possibility is that a default weight is specified for the other channels as shown in FIG. 20 (default_channel_weight).

According to the embodiment shown in FIG. 20, the weighting parameter 128 amplifies or dampens the pose movements 250 of the 3D object 112 caused by the animation 122 specifically with respect to one or more predetermined channels. Additionally, a second weighting parameter for amplifying or dampening the pose movements 250 of the 3D object 112 caused by the animation 122 with respect to one or more second channels is absent in the scene description data 100 and is to be inferred to be set to a predetermined value.

An important aspect of such transformations is that the order in which they are applied plays an important role, in particular if there is rotation involved in the transformation. Such information is clearly provided in FIG. 20 by the appearance of each of the animations in the for loop, meaning that animations happening first in the loop are applied first and further animations are applied afterwards.

Figure 21:
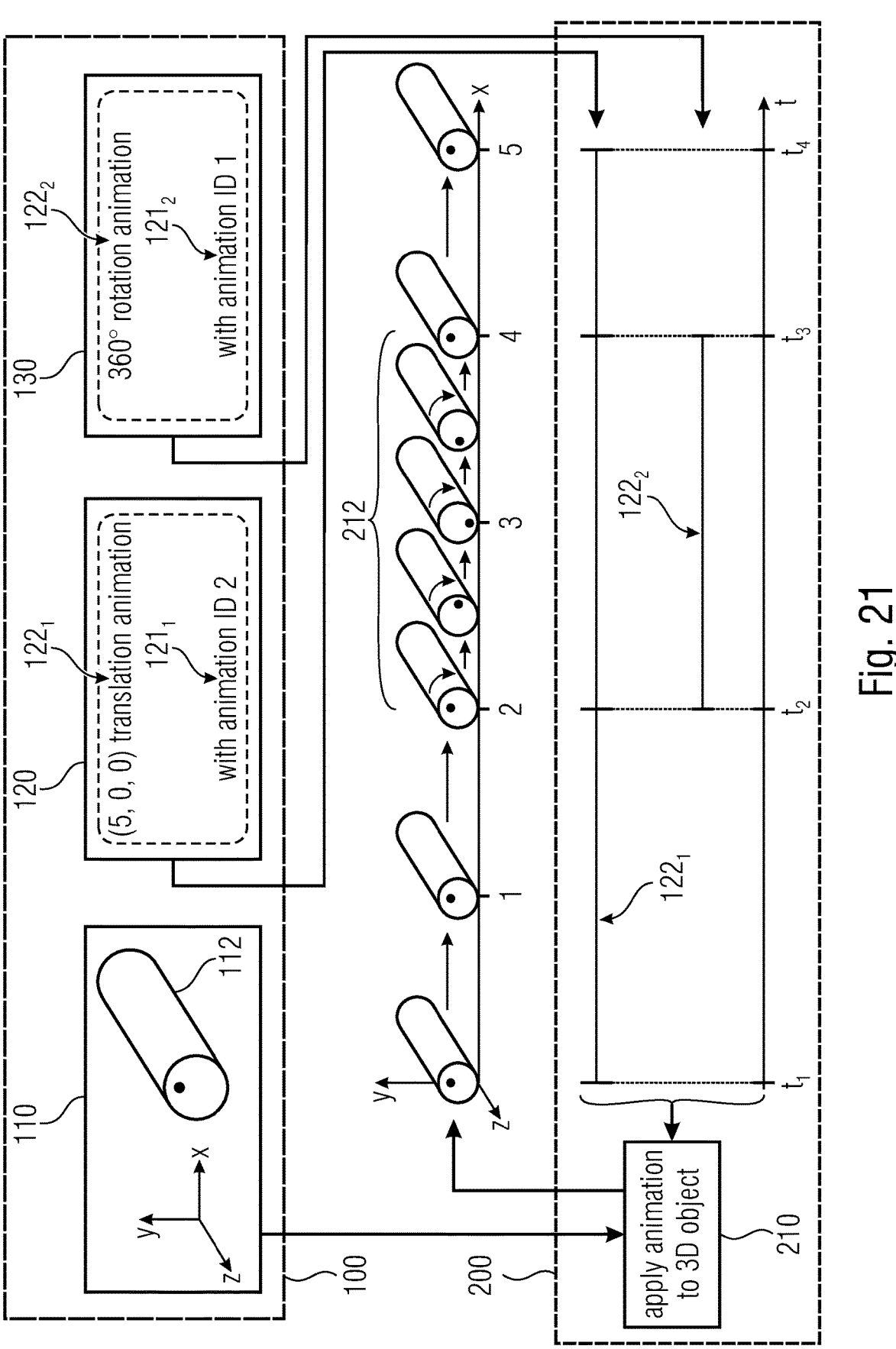
FIG. 21 shows an embodiment of scene description data and of an apparatus for animating a 3D object using two animations.
Figure 22:
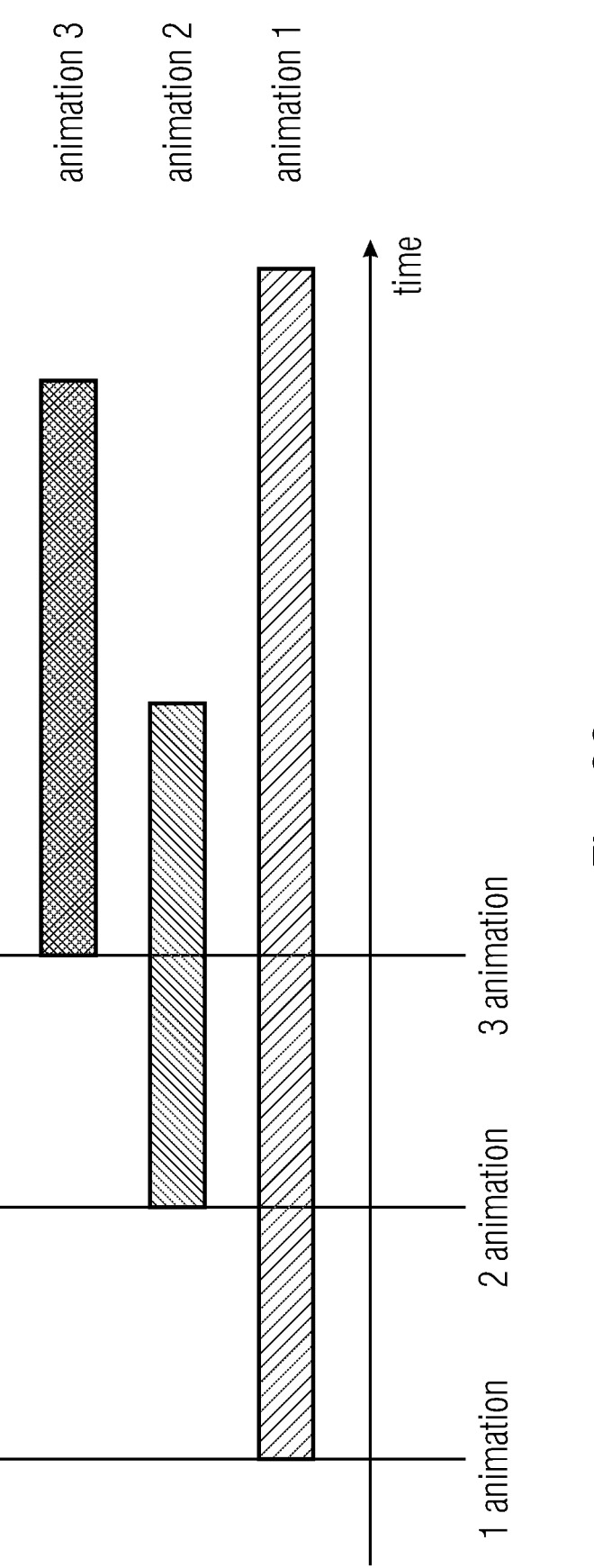
FIG. 22 shows temporally overlapping animations for the same object.

One of the issues with such an approach is for the case that there are overlapping animations as shown in FIGS. 21 and 22.

FIG. 21 shows an embodiment of scene description data 100 and of an apparatus 200 for animating a 3D object 112 using the scene description data 100, wherein two animations 122₁ and 122₂ are acting on the same object 112.

The scene description data 100 comprises first data 110 defining a 3D object 112, see also the description with regard to FIG. 11 and/or FIG. 14.

Additionally, the scene description data 100 comprises second data 120 triggering a first animation 122₁ of the 3D object 112 and third data 130 triggering a second animation 122₂ of the 3D object 112. FIG. 21 shows exemplarily a (5, 0, 0) translation animation as the first animation 122₁ and a 360° rotation as the second animation 122₂, but it is clear that also other animations 122 are possible. Additionally, the second data 120 may indicate a first animation ID 121₁ associated with the first animation 122₁ and a second animation ID 121₂ associated with the second animation 122₂.

The apparatus 200 obtains from the scene description data 100 the first data 110, the second data 120 and the third data 130.

The second data 120 triggers the first animation 122₁ of the 3D object 112 so that the first animation 122₁ is running during a first time interval $t_1$ to $t_4$ and the third data 130 triggers the second animation 122₂ of the 3D object 112 so that the second animation 122₂ is running during a second time interval $t_2$ to $t_3$, wherein first time interval and the second time interval are overlapping at least for a certain time interval, e.g., in this case $t_2$ to $t_3$.

The apparatus 200 is configured to apply 210 the first animation 122₁ and the second animation 122₂ to the 3D object 112 so that the first animation 122₁ and the second animation 122₂ are running simultaneously at least for the certain time interval $t_2$ to $t_3$ and the second animation 122₂ is applied 210 in a manner acting on the 3D object 112 along with the first animation 122₁. As shown in FIG. 21 with reference numeral 212, the animated 3D object 112, e.g. a cylinder, performs a translation along the x-axis and at the same time a rotation during the certain time interval $t_2$ to $t_3$. During the time intervals $t_1$ to $t_2$ and $t_3$ to $t_4$, in which only the first animation 122₁ is acting on the 3D object 112, the 3D object 112 performs only a translation along the x-axis.

The apparatus 200 is configured to apply the first 122₁ and second 122₂ animation to the 3D object 112 dependent on the animation IDs 121₁ and 121₂. The animation IDs 121₁ and 121₂ may indicate an order according to which the first 122₁ and second 122₂ animation might be applied to the 3D object 112 at least during the certain time interval $t_2$ to $t_3$.

According to an embodiment, the first 121₁ and second 121₂ animation IDs are defined on an ordinal scale and the apparatus 200 is configured to determine a final animation 212 of the 3D object 112 emerging from the first 122₁ and second 122₂ animations based on a rank of the second animation ID 121₁ relative to the first animation ID 121₂. For example, the apparatus 200 is configured to derive an order according to which the two animations 122₁ and 122₂ have to be applied 210 to the 3D object 112 based on the rank. For example, animations 122 associated with an animation ID 121 with a lower value are applied before animations 122 associated with an animation ID 121 with a higher value. In case multiple animations 122 are acting on the same object 112 and running simultaneously at least for a certain time interval, the apparatus 200 might be configured to apply 210 the animations 122 dependent on their associated animation ID 121, wherein the animations are applied according to an animation ID order starting with the animation associated with the lowest animation ID and ending with the animation associated with the highest animation ID. According to the example shown in FIG. 21, the first animation ID 121₁ is two and the second animation ID 121₂ is one. Therefore, based on this animation IDs 121₁ and 121₂, the apparatus 200 might be configured to first apply the second animation 122₂ and then the first animation 122₁ to the 3D object 112 so that both animations 122₁ and 122₂ are running simultaneously at least for the certain time interval t₂ to t₃.

According to an embodiment, the scene description data 100 has the first 122₁ and second 122₂ animations defined therein using fourth data in a manner where each animation 122 is tagged with the associated animation ID 121₁ and the second 120 and third 130 data trigger the first 122₁ and second 122₂ animations by indexing the first 122₁ and second 122₂ animations using the first 121₁ and second 121₂ animation IDs. For example, the second 120 and third 130 data may both only indicate the respective animation ID 121 and a time instant at which the animation 122 associated with the respective animation ID 121 is to be started by the apparatus 200. The apparatus 200 may be configured to derive the animation 122 associated with the respective animation ID 121 from the fourth data.

Note that animations 122 are timed in the sense that any animation 122 described in gITF is described as a set of transformations, e.g., pose movements, of an object 112 applied during the timeframe of the given animation, e.g. the time frame t₁ to t₄ of the first animation 122₁ and the time frame t₂ to t₃ of the second animation 122₂. This means that when a gITFAnimationSample, e.g. the second data 120 and/or the third data 130, is provided to a player triggering the start of an animation 122 the time instant of that sample indicates the time at which the animation 122 is started but the current duration of the animation is not as for regular video a single timed output but can be longer as determined already by the animation 122 itself that is described for a particular time interval. Thus, it can be seen in the FIG. 22 that there are 3 animations, each with a particular duration, that are triggered at 3 different time instants and the playback of such animations can be overlapping.

In such a case, at any point a new animation 122 is added, an Animation sample is updated, with all active animations at each time (see the indicated points in time).

In a further embodiment, in order to not have to redundantly have to re-introduce already running animations 122 into a sample, explicit signalling to indicate ordering information, i.e. the animation IDs 121₁ and 121₂, is added, see FIG. 23.

As already discussed with respect to FIGS. 15 to 20, for example, each animation can be weighted which to express the influence of in the final output.

Concerning FIG. 22 in combination with FIG. 23, the animation ID 121, e.g., order_id, thus would allow to not include Animation1 in the second sample. Simply, the second sample includes Animation2 and does not say anything about Animation1, which is activated before, and then during the time frame where more than one animation is running, the transformations are applied in increasing order_id.

In most scenarios, the mode later referred to as "additive", i.e., simply adding the animations as they are, seems to be the most appropriate.

However, there might be other scenarios for which other options different from simply applying this additive operation could be envisioned. For instance, whenever a further animation is added the weights can be scaled appropriately (e.g. the provided weights are multiplied by 1 divided by the number of active animations 122, wherein the weights might be provided by a weighting parameter 128). Or similarly, if two animations 122 are started at the same time but they have a different duration, whether there is an implicit scaling that is considered for the time that two animations are played simultaneously and a further scaling for the time interval when there is a single animation could make sense. In this case, for example, the data 120/130 triggering the respective animation 122 of the object 112 may comprise two or more weighting parameter 128 associated with different time intervals of the respective animation 122, wherein each of the two or more weighting parameter 128 may indicate amplifications and/or attenuations of pose movements 250 associated with the respective animation 122.

A further option could be that an animation 122 simply overrides a previous animation, meaning only one is applied.

Therefore, in another embodiment, shown in FIG. 24, another signalling, e.g. an inter-animation-control parameter 129, is added that says beyond the order, i.e. the animation ID 121, how to combine those animations 122.

TABLE 5

| Semantics of the syntax element order_mode |
|---|
| order_mode | Mode of the animation order |

0. Override: An animation can override the animation with a lower order_id. The apparatus 200 might be configured to apply 210 the second animation 122₂ overriding the first animation 122₁ so that the first animation 122₁ is not applied to the 3D object 112 as long as the second animation 122₂ lasts. For example, the first animation 122₁ might only be applied 210 to the object 112 in the time intervals t₁ to t₂ and t₃ to t₄ and in the time interval t₂ to t₃ only the second animation 122₂ may be applied to the object 112. Alternatively, apparatus 200 might be configured to apply the second animation 122₂ overriding the first animation 122₁ with respect to a portion of the 3D object 112 affected by the first animation 122₁, e.g., so that the first animation 122₁ is not applied to joints of the 3D object 112, which joints the first animation 122₁ has in common with the second animation 122₂, as long as the second animation 122₂ lasts.

1. Normalized: If several animations act on the same target, they will be combined together according to their weight value normalized by the number of animations, i.e. multiplied by 1 divided by the number of animations. The apparatus 200 might be configured to add the second animation 122₂ to the first animation 122₁ so that a combined animation is applied to the 3D object 112, wherein the combined animation is obtained by forming a sum of pose movements caused by the first animation 122₁ and the TABLE 5-continued Semantics of the syntax element order_mode second animation $122_2$, divided by a
number of animations adding to the
combined animation.
2. Additive: If several animations act on the
same target, their animation
transformation will be added together with
exactly the weight indicated explicitly. The
apparatus 200 might be configured to add
the second animation $122_2$ to the first
animation $122_1$ so that a combined
animation is applied to the 3D object 112,
wherein the combined animation is
obtained by forming a sum of pose
movements of the first animation and the
second animation
[3-63] Reserved Although the syntax with a single weight 128 per animation is shown in FIG. 24, it obviously applies for the fine granular weight syntax approach. This means that if channels are provided to control animations 122, the particular mode could be applied only to channels. For instance, if the "override" mode is chosen, only the channels (applicable to a node/joint) that appear in both animations would be override while not overriding the channels that are applicable to a node by a single animation. Similarly, in the normalized mode, the "normalization", i.e. sum according to their weight 128 and multiplied by 1 divided by the number of animations affecting a node would be applied to each node separately.

5 Volumetric Video in gITF and Animations

Similar to the combination of several animations, a combination of dynamic behaviour from animations and real-capture can be done with volumetric video. A volumetric video is a sequence of 3D captures of a subject/actor. The actor or the subject may have a pose of their own in each volumetric frame. For example; a human actor is volumetrically captured in three dimensions. The volumetric capture may be self-rigged or indirectly rigged for example using the method of vertex correspondence whereby the volumetric scan is virtually glued to a model with underlying skeleton. The pose of the subject is conveyed by the skeleton structure as explained in section 3.1.

For example, gITF may also contain different animations as humanoid animations using third-party providers such as https://www.mixamo.com/. Such animations can be statically stored in a gITF file. Thereby an application may be interested in applying the gITF animations to a volumetrically captured subject.

Importantly, with volumetric video the base 3D geometry is dynamic and changes over time. This means that the default-pose of the captured object is not a static one but changes over time. The associated pose of the human body in a frame is a characteristic which could be expressed by e.g. the joint location of the skeleton for the volumetric capture. Any update in the pose of the human body can be carried out in JointsTransformationSample or other mechanism that provides such an update to the pose corresponding to the volumetric video.

The first question that arises is how the volumetric video is attached to the scene and then whether the volumetric scan and animations can be applied simultaneously, as there might be transformations that are not combinable, e.g. a volumetric scan video that is jumping and animation that is laying on the floor.

Figure 25:
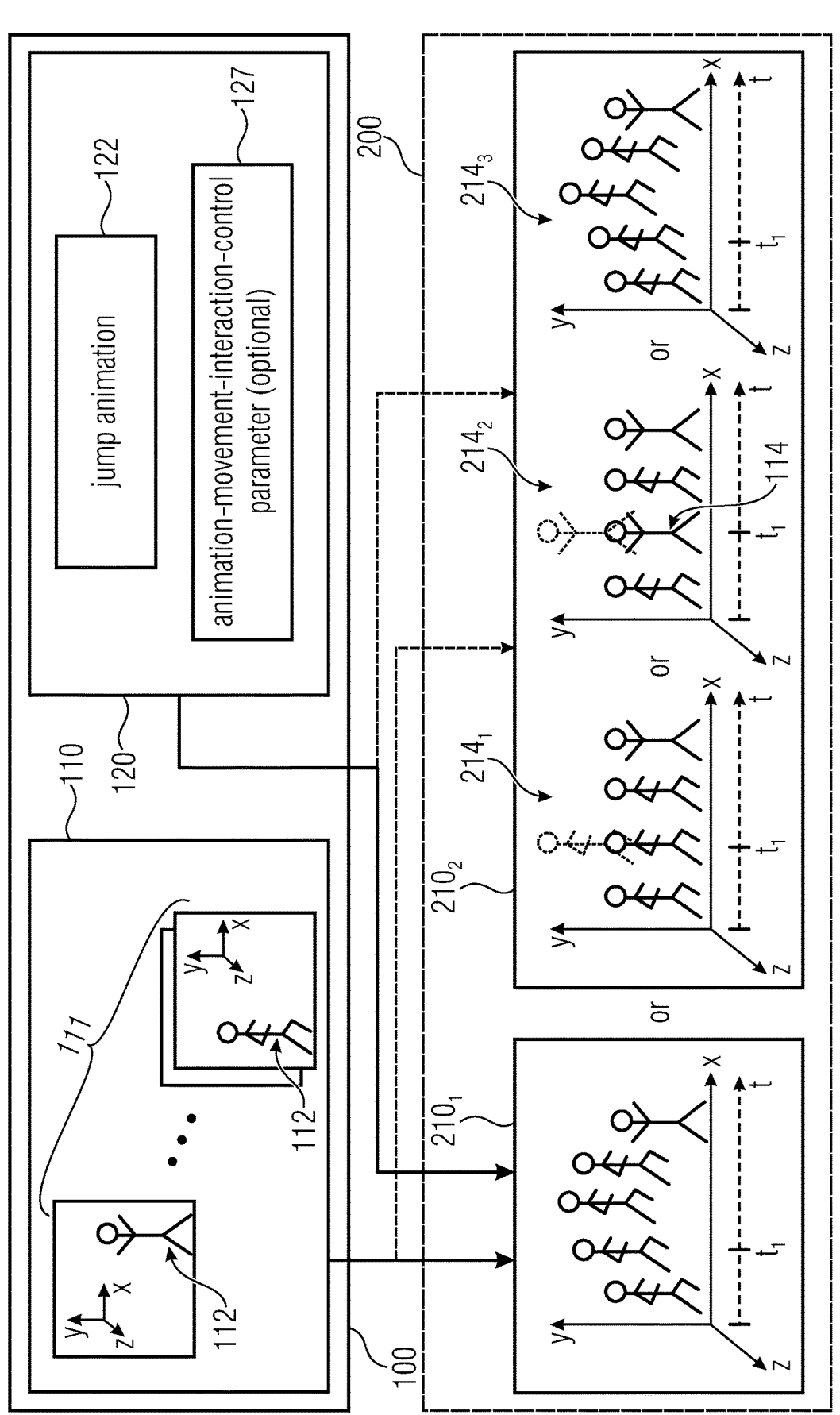
FIG. 25 shows an embodiment of scene description data and of an apparatus for animating a moving 3D object.

FIG. 25 shows an embodiment of scene description data 100 and of an apparatus 200 for animating a moving 3D object 112 using the scene description data 100.

The scene description data 100 comprises first data 110 defining a 3D object 112 and a movement of the 3D object 112. The first data might represent a volumetric video of the object 112. The movement of the 3D object 112 might be specified by a sequence 111 of 3D captures of the 3D object 112. In other words, the movement of the 3D object 112 might be defined by a sequence of frames, wherein each frame defines a certain pose of the 3D object 112 and wherein a pose of the 3D object changes over the sequence of frames.

Additionally, the scene description data 100 comprises second data 120 triggering an animation 122 of the 3D object 112. FIG. 25 shows exemplarily a jumping animation as the animation 122, but it is clear that also other animations 122 are possible. Additionally, the second data 120 comprises optionally an animation-movement-interaction-control parameter 127 specifying how the animation 122 and the movement of the 3D object 112 might be combined. However, this parameter 127 might only be necessary, if different modes for combining the animation and the movement are selectable.

The apparatus 200 obtains from the scene description data 100 the first data 110 and the second data 120 and applies $210_1/210_2$ the animation 122 to the moving 3D object 112. In the example, shown in FIG. 25, the sequence 111 of frames defines a run of the 3D object 112 along the x-axis as the movement of the 3D object 112 and the second data triggers a jump animation 122 of the object 112 at a time instant $t_1$.

The apparatus 200 might be configured to apply $210_1$ the animation 122 to the 3D object 112 in a manner acting on the 3D object 112 along with the movement of the 3D object 112 defined by the first data 110. In this case, the animation-movement-interaction-control parameter 127 is not needed. As shown in FIG. 25, starting at the time instant $t_1$ the jump animation 122 acts on the 3D object 112 along with the run movement for the duration of the jump animation 122.

This might be achieved by decomposing the movement defined by the first data 110 into time frames defining poses of the 3D object 112 at different time instants over time and combining per time frame these poses with pose movements associated with the animation 122 at the respective time instant.

Alternatively, the apparatus 200 might be configured to use the animation-movement-interaction-control parameter 127 for selecting a mode $214_1$ to $214_3$ according to which the animation 122 is to be applied to the moving 3D object 112. At a first mode $214_1$ the apparatus 200 might be configured to apply $210_2$ the animation 122 in a manner overriding the movement defined by the first data 110 by using a pose of the 3D object at the time instant $t_1$ at which the animation 122 is triggered by the second data 120 as an initial pose of the 3D object 112 to which the animation 122 is applied. At a second mode $214_2$ the apparatus 200 might be configured to apply $210_2$ the animation 122 in a manner overriding the movement defined by the first data 110 by using a default pose 114 as an initial pose of the 3D object 112 to which the animation 122 is applied instead of the pose of the 3D object 112 at the time instant $t_1$ at which the animation 122 is triggered by the second data 120. At a third mode $214_3$ the apparatus 200 might be configured to apply $210_2$ the animation 122 as described with regard to the application $210_1$ of the animation 122 to the moving 3D object 112.

According to an embodiment, the scene description data 100 and/or the apparatus 200 may comprise features and/or functionalities which are described with regard to one of FIGS. 26 to 36.

5.1 Volumetric Video in gITF

In a gITF anything that is to be added to the scene, will be added in the scene property of the gITF scene. Like in the example shown in FIG. 26; node at index 0 is added to the scene. The mesh for the node at index 0 is available at mesh.index=0 in meshes array.

Similarly, a volumetric video can be attached in the scene using a node. In the example shown in FIG. 27, a node named "volumetric video node" is added to the scene. The 3D geometric data is accessed through the node.mesh property. The node.mesh property refers an mesh.index which contains data reference in the binary blob. Mesh.primitives define the overall structure of the 3D object. The value in "POSITION" refers to the index in accessors array where the vertex data is available. In a volumetric video, the vertex data will be dynamic. FIG. 27 might be an example for first data 110 defining a 3D object and a movement of the 3D object.

5.2 Volumetric Video+gITF Animations

In a gITF, the absolute transformation values are provided for animations 122 (see sampler.output). This means that during an animation 122 the object 112 transformed from one absolute state to another absolute state. Both start state and end state are independent. However, it is also interesting to note that there might be cases where each state is dependent on the other. For example: Move objectA by (1,0,0) units in 1 second, and then move ObjectA by (5,0,0) units but relative to the previous position (1,0,0), thus final state being ObjectA sitting at 6,0,0 position.

To this extent, in a further embodiment signalling, e.g., by the animation-movement-interaction-control parameter 127, is provided that indicates how to act at the receiver side as shown in table 6 below.

There might be different mode to applying the gITF animation to a volumetric video.

TABLE 6

| Semantics of the syntax element mode | | |
|---|---|---|
| Value | Mode | Description |
| 0 | Last-frame relative | Use the last frame pose of the volumetric vide (last received jointTransformationSample value) as the initial pose for the subject in animation. (e.g., the first mode $214_1$) |
| 1 | T-Posed | Apply a T-pose animation and overriding the pose of the volumetric video. (e.g., the second mode $214_2$) |
| 2 | Combinatory | Use the joint transformation of the subject in each frame and current interpolated value of the joint from the gITF animations; and combine the two animations using methods as described in section 7. It may be that the "rotation" of the joints is controlled by the animation and "translation" of the joint node 2 is controlled by the ChannelTransformationSample. (e.g., the third mode $214_3$) |

Figure 29:
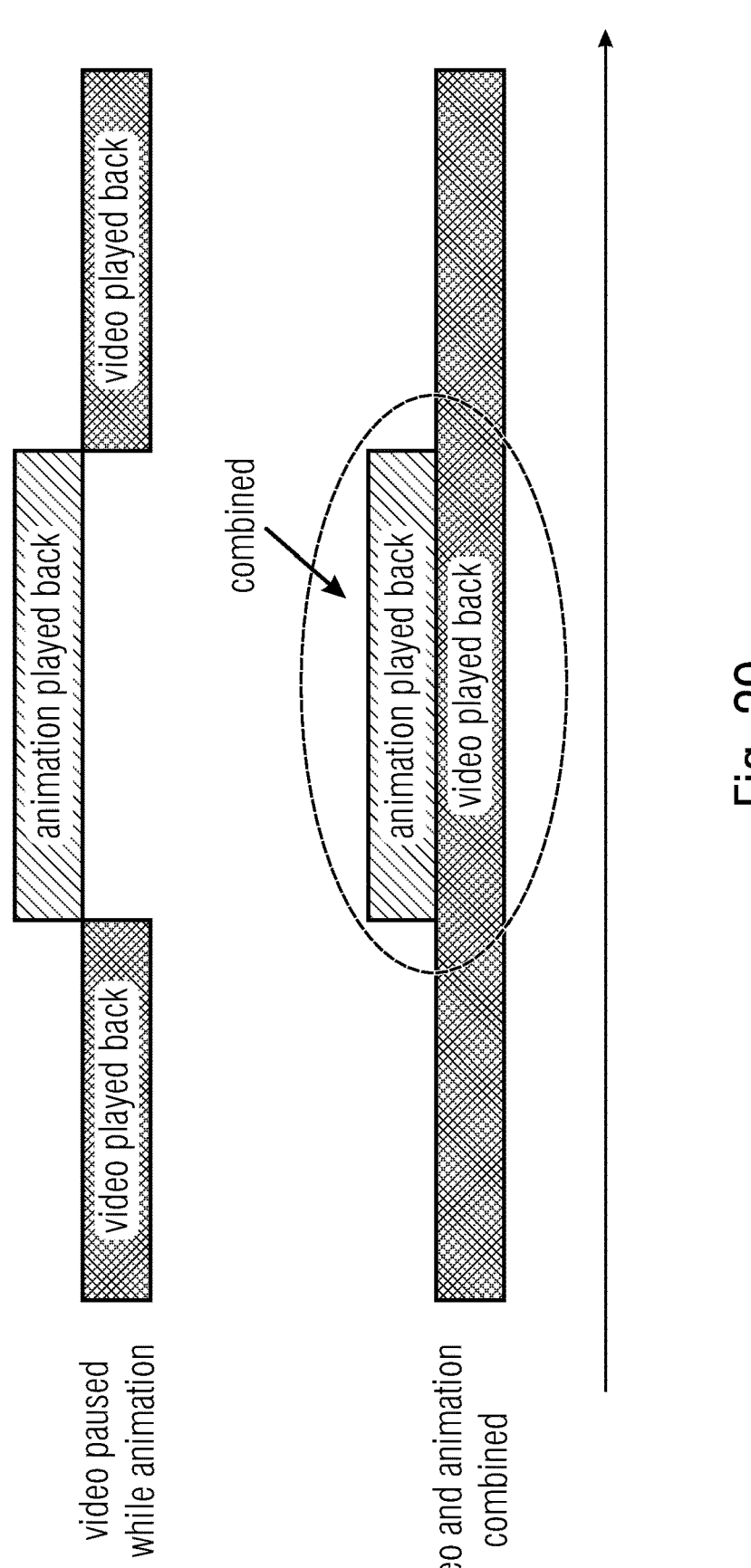
FIG. 29 shows different options for combining a volumetric scan video with an animation.

Thereby, for instance if they cannot be combined and the animation 122 is activated, the video needs to be paused. The signalling of whether they are to be combined, or whether the video is paused and the T-pose is used for the animation 122 or the last frame of the video before it is paused is used, need to be signalled to the user. An example is shown in FIG. 28, where there is an additional mode indicated in the animation by the animation-movement-interaction-control parameter 127. FIG. 29 shows an embodiment of a mode at which the movement defined by the first data 110 is pause while the animation 122 runs and a mode at which the movement defined by the first data 110 and the animation 122 are combined.

For the case that they are combinable similarly as shown for multiple animations, it might be necessary to provide to what extent each transformation is considered. In a further embodiment, shown in FIG. 30, a weight, e.g., a weighting parameter 128*b*, is provided to be applied for the volumetric scan (vol_scan_weight in the example shown in FIG. 30).

However, there is an issue on how to identify which is the volumetric object $112_1$ or $112_2$ to which the weights described above apply. This is illustrated in FIG. 31, where there are two volumetric scan videos $260_1$ and $260_2$ that attached to two different nodes of the scenes.

Figure 31:
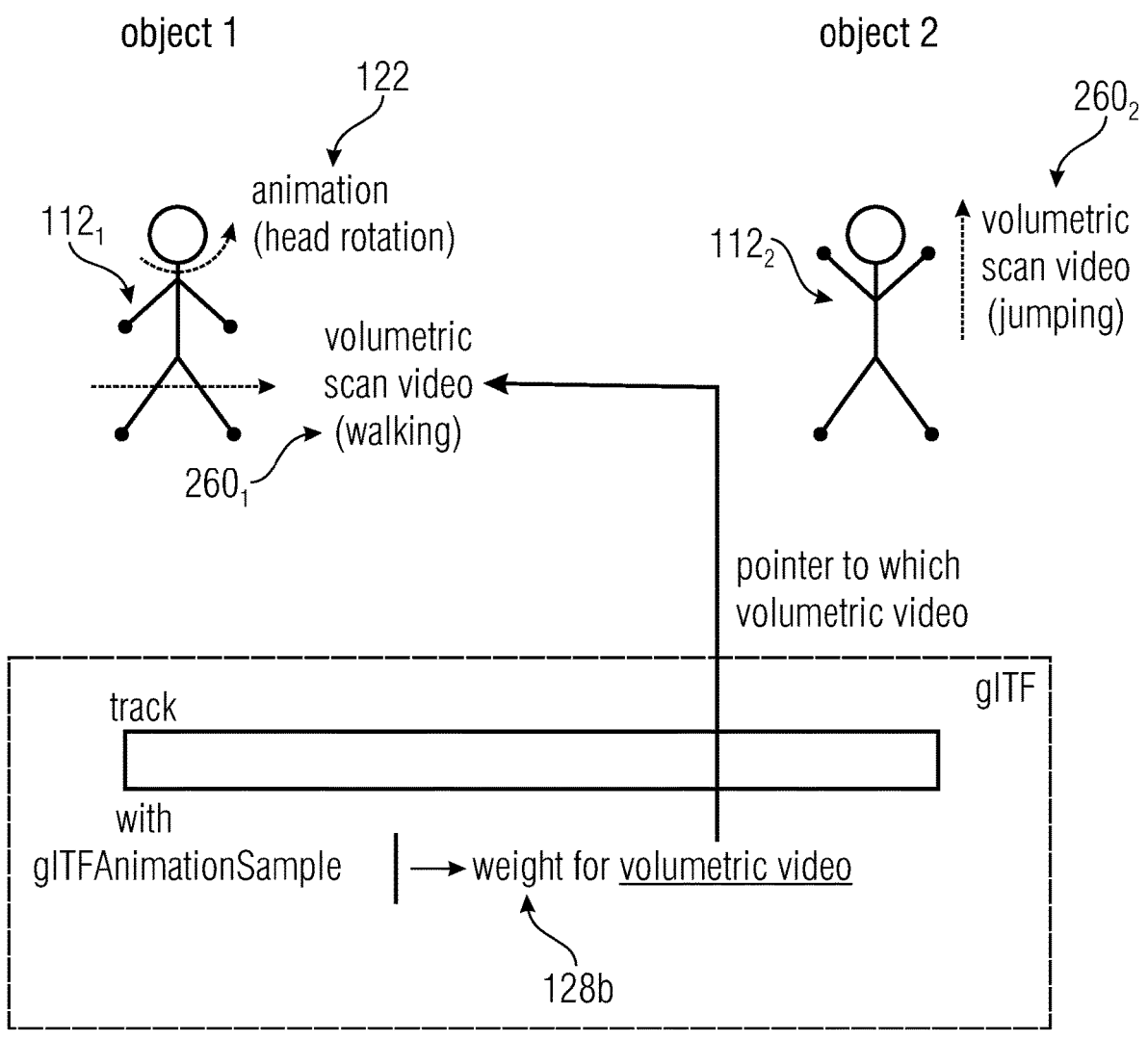
FIG. 31 shows how a moving object can be identified to whose volumetric scan a weight is to be applied.
Figure 33:
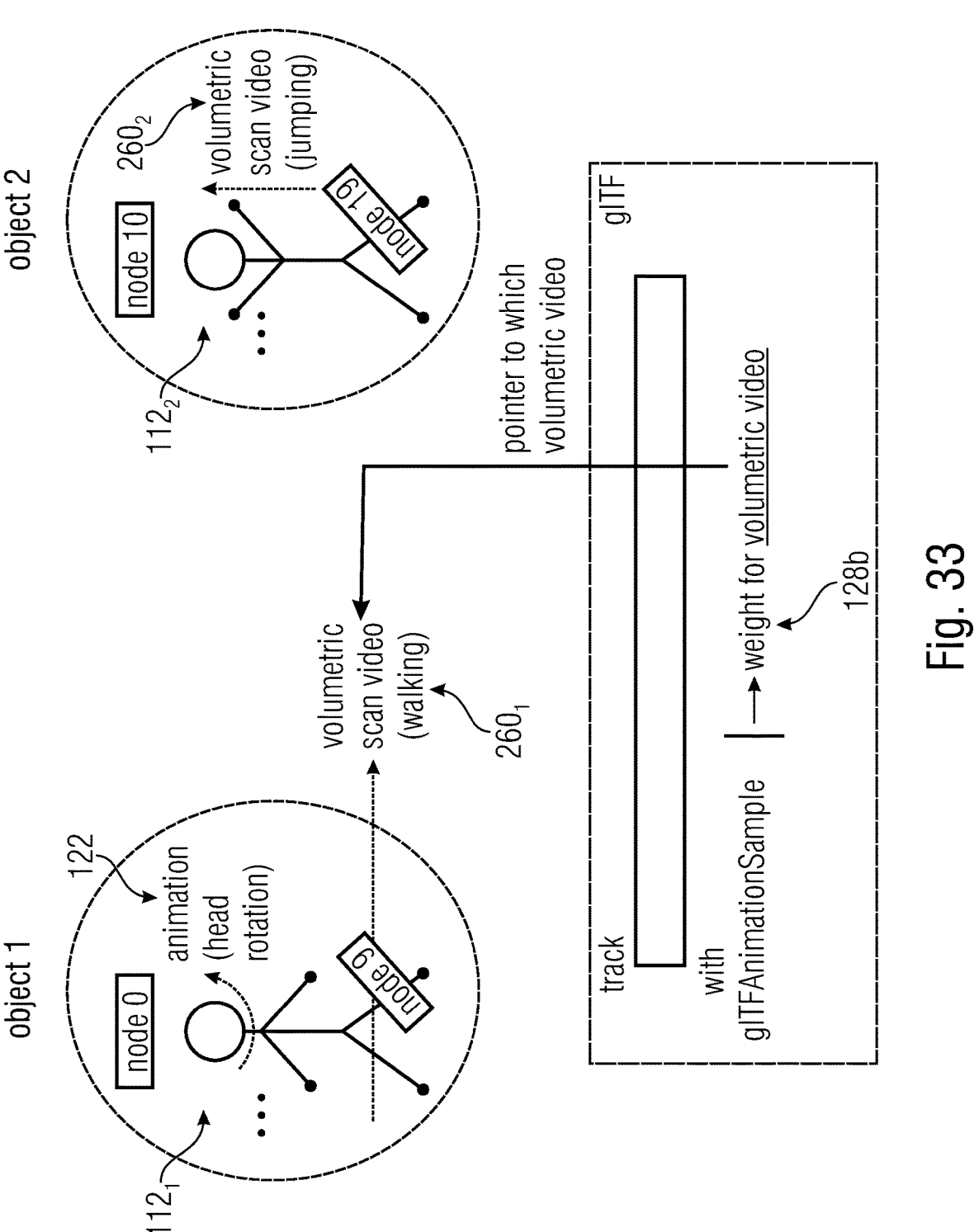
FIG. 33 shows schematically such a link to an object.

Linking the weight 128*b* of the volumetric video $260_1$ specified in the gITFAnimationSample to a particular volumetric scan video $260_1$ is entailed as indicated in FIG. 31.

A first option consists of limiting the provided syntax of a gITFAnimationSample to apply to a single object 112. This can be made by linking the gITFAnimationSample to the object $112_1$ in gITF so that is known to what transformation vol_scan_weight applies.

The linkage of the gITFAnimationSample to the object $112_1$ in the gITF can be provided under the extension on "MPEG_ANIMATION_TIMING", as shown in FIG. 32. The target_node value represents the node index of the volumetric video. The animations 122 triggered in the animationSample corresponds to animations for the specific object at target_node. For example, in the gITF as shown in FIG. 32, a target node is identified which corresponds to the volumetric video object 112.

In the example this link to an object 112 is done by target node pointing to node 0. Note that gITF describes nodes to which properties are attached, such as meshes, etc. In the example given, where there are 2 objects $112_1$ and $112_2$ (see FIG. 33), Node0 . . . Node9 would correspond to the object 1 to which the target gITFAnimationSample is intended and Node 10 . . . 19 to which the target gITFAnimationSample is not intended.

For example, an animation 122 associated with a first set of nodes, e.g., node0 to node9, corresponding to the 3D object $112_1$ is triggered. An animation associated with a second set of nodes, e.g., node10 to node 19, differing from the first set of nodes may be associated to a further 3D object $112_2$ and further data comprised in the scene description data 100 might trigger such an animation of the further 3D object $112_2$. Alternatively, the second data 120 might comprise an object identification associated with the animation 122 to be triggered to identify the 3D object $112_1$ to which the animation 122 is to be applied.

The provided solution means that the animations 122 are grouped into gITFAnimationSample that only apply to an object 112, while this is not necessary. Actually, since animations 122 in gITF clearly define which nodes are affected by the transformation described therein, a gITFAnimationSample could be kept generic and not be linked in gITF as described above to a single object $112_1$ or $112_2$.

Another alternative to avoid this is to keep gITFAnimationSample as generic as is currently, being able to indicate several animations that apply to different objects. In such a case, the object to which vol_scan_weight 128*b* applies needs to be indicated. For instance, as shown in FIG. 34.

The object_index could be the node index to which an object 112 is attached. So in particular, this means that the linking of which is the weight 128*b* of the volumetric scan 260 to an object 112 is done within the gITFAnimation-Sample by pointing to the node (e.g., node 0 in the previous example).

As for the animation case described above, there may be scenarios where different joints in the skeleton are affected and the combination cannot use a single weight 128*b* for all joints. In another embodiment several weights 128*b* are provided.

Figure 35:
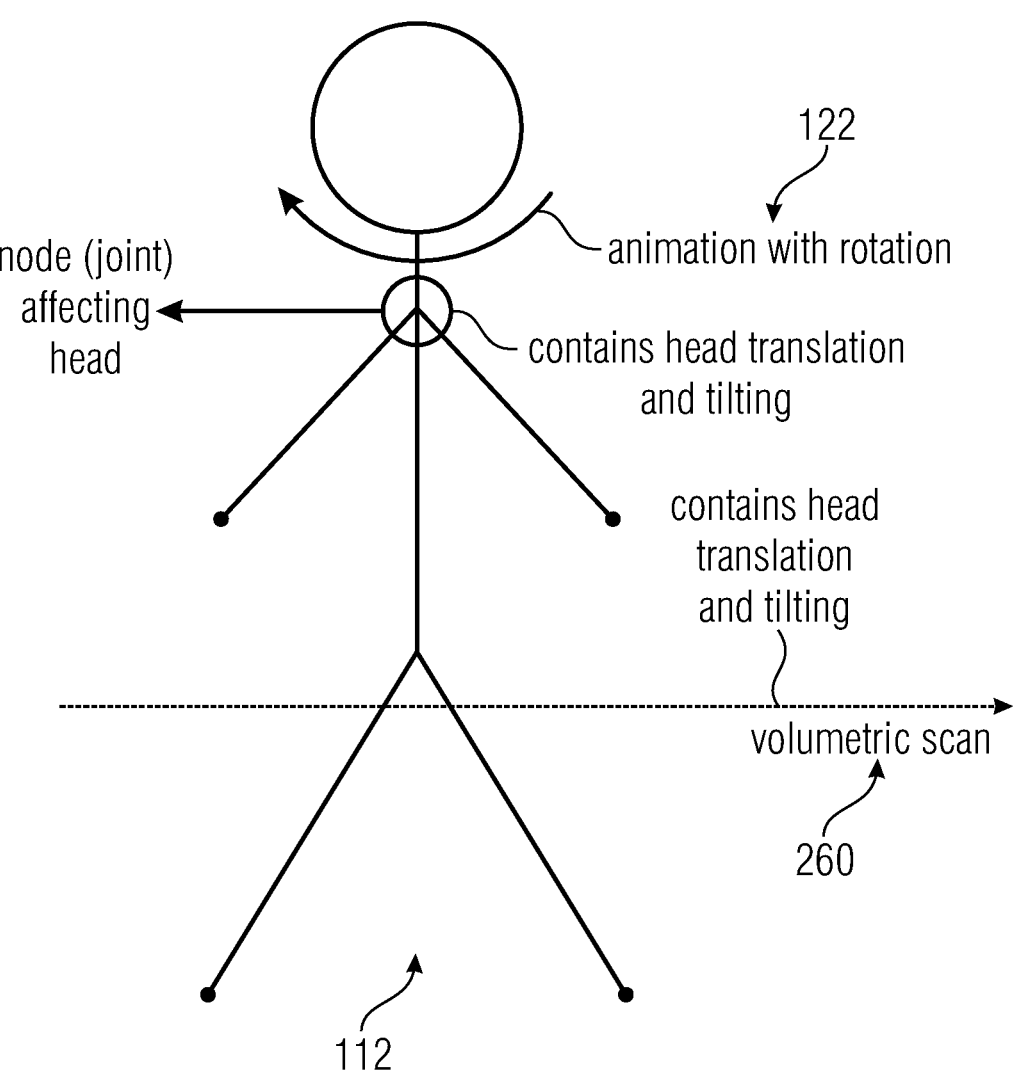
FIG. 35 shows schematically such a link to an object.

An example of such a case is shown in FIG. 35 with a volumetric scan 260 of a walking person 112 to which an animation 122 involving a rotation of the head is applied. The walking involves also movement of the head, e.g. translation, tilting. If the rotation of the head is desired to be applied from the animation 122 but all other transformations are to be applied from the video 260 the transformations of the video 260 need to be provided decomposed so that any transformation that involves rotation can be ignored (for the given example).

Then, it is possible to apply different weights 128*b* to the different components of the transformation of the video 260. For instance, in the example given above, the weight 128*b* of a potential head rotation movement in the volumetric scan 260 can be set to 0 so that the rotation is only taken from the animations 122. Obviously, other values for weights 128*b* (non-zero as in the mentioned example) for other examples can benefit of weighting different transformation differently.

An example is shown in FIG. 36.

Please note that the highlighted syntax introduced earlier than this example can be incorporated in this gITFAnimationSample syntax format.

TABLE 7

| Semantics of syntax elements used in FIG. 36 | |
| --- | --- |
| Property | Description |
| num_objects | Number of objects for which animations are triggered. These objects may receive additional transformational information |
| vol_num_channels | number of transformations for the object |
| vol_channel_index | The index of the transformation for the object |
| vol_scan_weight | The weight for each of the transformation |
| order_id | The order for the object |
| object_index | The node index value to which the object is attached to |
| num_channels | Number of channels for an animation |
| weight | The weight value for each channel in an animation |
| channel_index | The index of the channel in an animation |

Above, different embodiments for using a weighting parameter for volumetric scans are described. In the following it is described how the weighting parameter can be incorporated in the embodiment described with regard to FIG. 25.

According to an embodiment, the application 210₁ and/or the application 210₂ might be performed using a weighting parameter 128*b* comprised by the first data 110 to amplify or dampen the movement 260 of the 3D object 112 defined by the first data 110 and/or using a weighting parameter 128 comprised by the second data 120 to amplify or dampen pose movements 250 of the 3D object 112 caused by the animation 122. The weighting parameter 128 might be used as described with regard to one or more of FIGS. 15 to 20.

According to an embodiment, the animation 122 of the 3D object 112 is defined in the scene description data 100 in a manner decomposed into channels and the apparatus 200 is configured to, using the weighting parameter 128 comprised by the second data 120, amplify or dampen the pose movements 250 of the 3D object 112 caused by the animation 122 dependent on the channel with which the respective pose movement 250 is associated.

According to an embodiment, the movement 260 of the 3D object 112 is defined in the scene description data 100 in a manner decomposed into channels, e.g., the movement 260 of the 3D object can be split into individual movements and each channel defines an individual movement 260 to be applied to a certain joint of the 3D object, e.g., using a rigged 3D object. For example, different channels might define different movements for the same joint of the 3D object. Additionally, the apparatus 200 is configured to, using the weighting parameter 128*b* comprised by the first data 110, amplify or dampen individual movements corresponding to the movement 260 of the 3D object 112 defined by the first data 110 dependent on the channel with which the respective individual movement 260 is associated.

Optionally features and/or functionalities as described with regard to the weighting parameter 128 in one of FIGS. 15 to 20 might be adapted such that these features are applicable for the weighting parameter 128*b* to amplify or dampen correspondingly the movement 260 of the 3D object 112.

According to an embodiment, the apparatus 200 is configured to obtain, from the scene description data 100, third data defining a further 3D object 112₂ and a movement 260₂ of the further 3D object 112₂, and obtain, from the scene description data 100, a weighting parameter 128*b* associated with an object identification. The apparatus 200 may be configured to decide based on the object identification whether the weighting parameter 128*b* is to be used to amplify or dampen the movement 260₁ of the 3D object 112₁ or the movement 260₂ of the further 3D object 112₂.

6 Channel Transformations

The discussion above is mainly focused on how a set of animations 122 can be trigged and combined. Additionally, the animations 122 can be combined with the volumetric video 260 as well. There are syntaxes available above which point to the volumetric_object and volumetric object_channel which could be combined together. Each operation could be weighted or ordered as explained above, e.g., as described with regard to one of FIGS. 15 to 36.

The discussion on how skeleton transformation can be carried out is presented in section 3.1. The jointTransformationSample might provide a complete joint transformation value. However, it might also be interesting to provide a much finer control over the different individual property transformations of the joint. That is a jointNode is translated and rotated. Rather than combining these two-transformation property in a single JointTransformationSample, provide a separate for the concern property.

Figure 37:
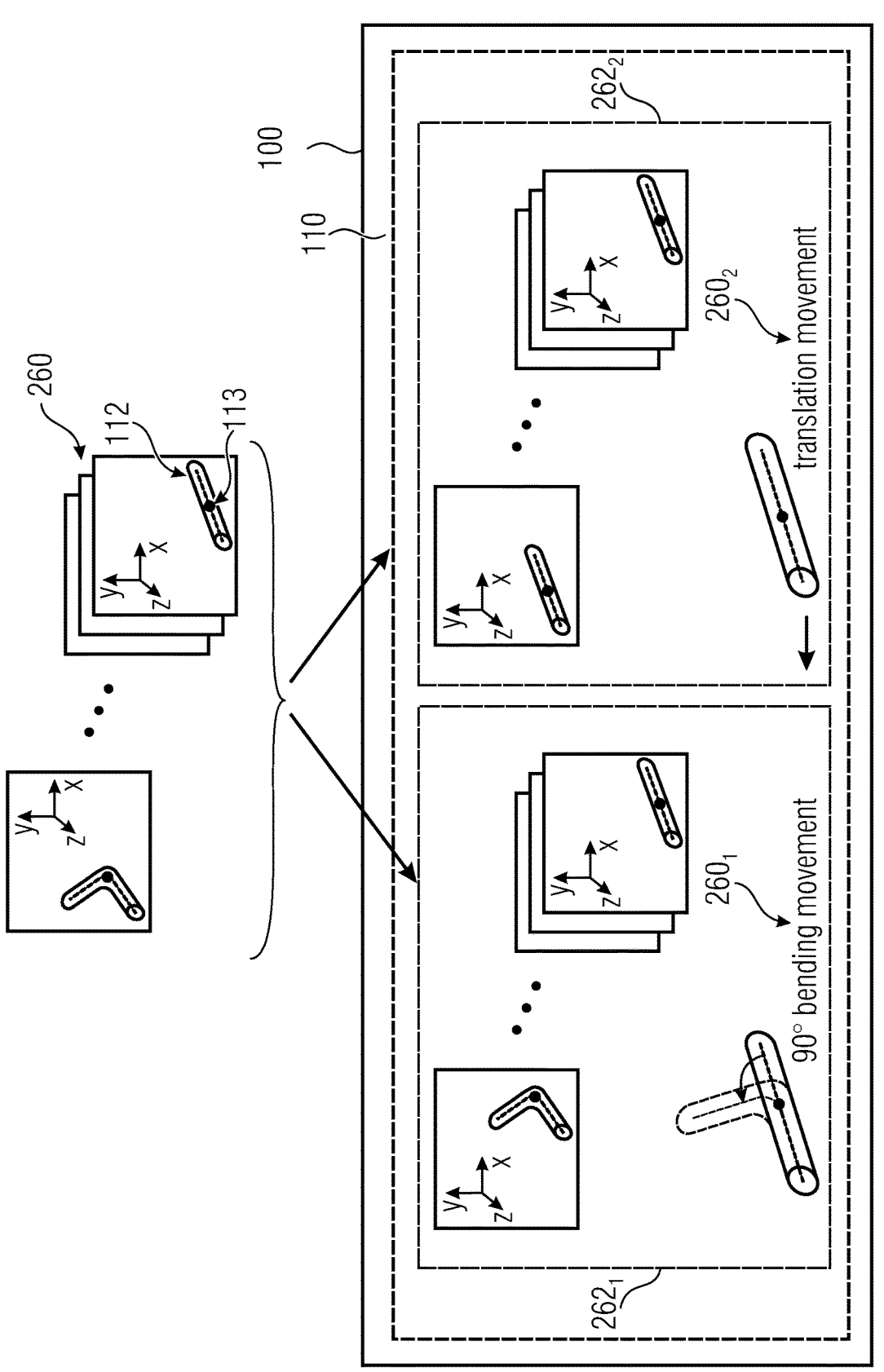
FIG. 37 shows an embodiment of scene description data in which a movement of the 3D object is defined by a set of one or more channels.

This is, for example, shown in FIG. 37. FIG. 37 shows Scene description data 100 comprising first data 110 defining a 3D object 112 and a movement 260 of the 3D object 112. The first data 110 defines the movement 260 of the 3D object 112 into a set of one or more channels, e.g. the two channels 262₁ and 262₂, so that one joint 113 of the 3D object 112 is moved 260, concurrently, by more than one channel, i.e. by the two channels 262₁ and 262₂.

The two or more channels 262₁ and 262₂ define different movements 260₁/260₂ associated with the same joint 113 of the 3D object 112. In the example shown in FIG. 37 a first channel 262₁ defines a 90° bending movement 260₁ and a second channel 262₂ defines a translation movement 260₂. However it is clear that also other movements 260 of a 3D object can be decomposed into two or more channels and that this is also applicable for other 3D objects than a cylinder.

An apparatus for animating or moving a 3D object might be configured to receive the scene description data 100 and obtain from the scene description data 100 the first data. The apparatus is configured to apply the movements 260$_1$ and 260$_2$ defined by the one or more channels of the set of one or more channels to the one joint, e.g., by the two or more channels of the set of two or more channels to the one joint.

Therefore, from a volumetric video stream, e.g., the movement 260, an additional timed metadata track can be used to facilitate how many such node.property transformations, e.g., pose movements 260$_1$ and 260$_2$ or channels 262$_2$ and 262$_2$, are applied to the volumetric video 260$_1$ and which node.property transformations are affecting the node. Each node.property transformation is indexed which could be accessed by other samples such as gITFAnimation-Sample. So in the section below, node.property transformations can be understood as channels 262$_2$ and 262$_2$ where a channel 262 affects only one particular property, e.g., a particular pose movements 260$_1$ and 260$_2$, of a node at a time.

This metadata track discussed here is the one that provides the updates of the skeleton (joints of the object) over time so that additional transformations provided by the animation 122 as discussed previously can be applied.

Also, instead of adding a single transformation, e.g., a particular pose movement 260$_1$ or 260$_2$, to achieved the end position, as different transformations need to be indexed (see discussion on channels above and vol_channel_index in the exemplary syntax in FIG. 36), the transformation in the metadata track is provided as a set of transformation that are indexable and are mapped to a particular node indicated in the gITF file. Thus, the gITFAnimationSample can point and weight such transformations separately.

As shown in FIG. 38, a channel transformation box ("ctab") may store an array of transformations for nodes available in the scene. Each transformation value only affects one node at a time. Multiple transformations can affect the same node as well. The transformation, e.g., pose movements 260$_1$ and 260$_2$, could be translation, rotation, scaling or weight (for Morph target transformations). The 90° bending movement shown in FIG. 37 might represent a rotation transformation.

The samples are provided in tracks which stores the actual transformation value for each channel 262 as defined. Each channel 262 has a target node, e.g., a joint 113, which is accessed by the node_index. The transform_property of the channel 262 determines the transformation type for the node. Multiple channels 262 can transform the same node. Each channel can be accessed by its unique channel_index.

According to an embodiment, each channel 262$_1$ and 262$_2$ of the set of one or more channels indicates a pose movement 260$_1$ and 260$_2$ for a joint 113 of the 3D object 112. Two or more channels 262 of the set of one or more channels 262 might be associated with the same joint 113 of the 3D object 112. For example, each channel 262 is only associated with one joint 113 of the 3D object 112, but more than one channel 262 can be applied to the same joint 113 of the 3D object 112, whereby different pose movements 260 can be applied to the same joint 113. Second data, e.g., representing the sample, might store the actual transformation value for each channel of the set of one or more channels.

In the example shown in FIG. 39, the channel_index is explicitly given in channelTransformationConfigBox. However, the channel_index can be implicitly derived as per the loop on number_of_channels. In the example shown in FIG. 39, the channel_index and number_of_channels properties are static. However, in another embodiment, the number_of_channels and channel_index can be dynamic and expressed in the ChannelTransformationSample.

7 Dynamic Animation

In the above section 5 we have discussed how a volumetric video 260 can be attached to a gITF scene. For example; in the gITF pseudo file, shown in FIG. 40, a volumetric video 260 is attached to the node.index 0. The dynamic 3D geometry data(mesh) data for the volumetric data is contained in assessor.index 2 as referred by the "POSITION" attribute.

So, the motion of the volumetric video is expressed by the dynamically update of the corresponding mesh data.

In some cases, when there is enough throughput to transmit the data, the framerate of the volumetric video could be high enough to provide a smooth movement 260. In such a case, rendering the transmitted volumetric scan frames would be good enough. However, in other cases, as e.g., when the throughput of the network is not high enough, only some key fames would be transmitting and some kind of interpolation would be used at the rendering side.

In one embodiment, signalling is provided that indicates whether such kind of interpolations is entailed or not. Also the type of interpolation to be applied could be signalled.

Figure 41:
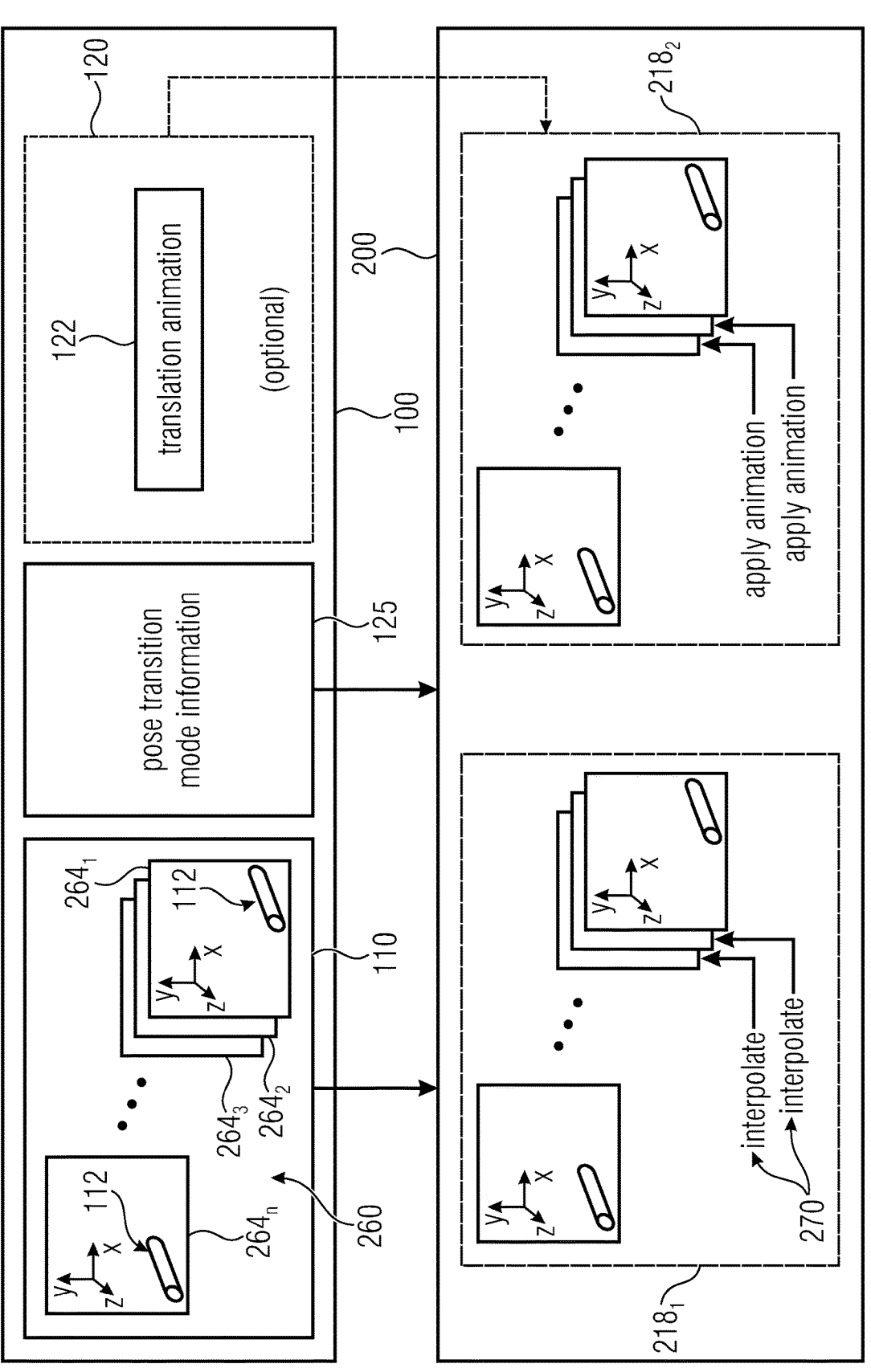
FIG. 41 shows an embodiment of scene description data and of an apparatus for moving a 3D object using a pose transition mode information.

FIG. 41 shows how this can be realized. According to an embodiment, scene description data 100 comprises first data 110 defining a 3D object 112 and a movement 260 of the 3D object 112. The movement 260 of the 3D object 112 is defined by the first data 110 in units of time frames 264, e.g., 264$_1$ to 264$_n$, so that per time frame 264 a pose of the 3D object 112 is defined. Additionally, the scene description data 100 comprises second data 125, e.g., a pose transition mode information, which is indicative of a pose transition mode 218, e.g., 218$_1$ or 218$_2$, to be applied so as to render the 3D object 112 on the basis of the first data 110.

An apparatus 200 obtains the first data 110 and the second data 125 from the scene description data 100. The apparatus 200 is configured to apply a pose transition mode 218 indicated by the second data 125 to render the 3D object 112 on the basis of the first data 110.

If the second data 125 indicates a first predetermined mode 218$_1$, e.g., a first predetermined pose transition mode, the apparatus 200 is configured to interpolate 270 between the poses of the 3D object 112 at the time frames 264. The apparatus 200 is configured to interpolate between poses of two temporally adjacent/neighbouring time frames 264, so that a smooth transition is realized between this two time frames 264. Thus, the apparatus 200 may interpolate between a current time frame i and a temporally subsequent time frame i+1, wherein $1 \le i \le n-1$ for a movement 260 defined by n time frames. This interpolation 127 might be done between all received temporally neighbouring time frames defining the movement 260. Received temporally neighbouring time frames represent the time frames received by the apparatus 200, e.g., from the scene description data 100.

If the second data 125 indicates a second predetermined mode 218$_2$, e.g., a second predetermined pose transition mode, the apparatus 200 is configured to obtain, form the scene description data 100, third data 120 which triggers, for each of one or more of the time frames 264, one or more animations 122 of the 3D object 112. The apparatus 200 is configured to apply the one or more animations 122 to transition the 3D object 112 between the pose of the 3D object 112 at the respective time frame i towards the pose of the object 112 at a subsequent time frame i+1, wherein 1≤i≤n−1 for a movement 260 defined by n time frames. By applying the one or more animations 122 to a pose defined by a time frame 264 a smooth transition between this pose and a pose of a temporally subsequent time frame is possible. The movement 260 defined by the time frames 264 is in the example shown in FIG. 41 a simple translation along the x-axis. Therefore, it is enough to trigger one translation animation 122 at each of one or more of the time frames 264. This one translation animation 122 might even be the same animation for each of the one or more of the time frames 264. Alternatively, it is also possible that the third data 120 triggers for some or for each of the one or more of the time frames 264 one or more different animations. In case a pose changes from one time frame to a subsequent time frame in a more complicated movement than by simple transformation like a translation, it might be necessary that the third data 120 triggers two or more animation so that the apparatus 200 achieves a smooth transition between the two poses by applying the two or more animations to the pose of the current frame.

According to an embodiment, the second data 125 defines the animation 122 of the 3D object 112 or each of the animations of the 3D object 112 as a set of one or more channels each of which indicates a pose movement for a joint of the 3D object 112 and into a set of samplers defining values for a pose movement at certain time instants. The second data 125 defines the one or more animations to be applied to the 3D object in a manner so that values for a pose movement at time instants between the certain time instants defined by the sampler are interpolated for the respective channel.

The signalling could be just added to gITF as an extension to the meshes as shown in FIG. 42. The "interpolate" attribute would indicate that interpolation and what type should be applied between consecutive frames.

Another possible way of doing it, would be to use gITF animations. Animations 122 in gITF provide the functionality to deform the 3D geometry. The deformation of the 3D geometry is controlled through animation.channel and animation.sampler. Therefore, the dynamic motion update of the volumetric video 260 could also be expressed by a set of corresponding animation.sampler and animation.channel.

In such a mechanism, as discussed, the mesh data would not necessarily has to be update constantly. Rather the deformations of the mesh data which represent the motion of the actual motion 260 of the character 112 can be expressed with gITF animations 122.

This can be understood in line with video coding. Similarly like, a mesh data is provided periodically or randomly in the volumetric video sequence (like Intra pictures) and updates in the representing the changes in the period are addressed by gITF animations (like Inter pictures) using actual mesh data as the reference for the animations.

Therefore, a volumetric video sequence 260 can be expressed as a set of key-frame states 264. The client interpolates 270 between the key-frames 264 to give an illusion of a motion 260. The volumetric captured object 112 and its relevant pose information is stored in a gITF file. The sampler.output and sampler.input point to the key frame timing and transformation property for a node. The information received in the jointTransformationSample can be put in dynamic buffers which could be accessed by time accessors. The sampler.output and sampler.input store the index values of the timedAccessors to retrieve dynamic update for the animation. The key idea would be to indicate that the key frames 264 used for animation 122 are taken from a volumetric video scan. See, for example FIG. 43.

Accessor 5 and accessor 6 can be a timedAccesors (i.e. The buffer data referred by the accessors is dynamic). The relevant dynamic buffers data of different joints nodes should be updated. Therefore, the pose update received should also include the relevant accessors index to where the transformations data gets stored in binary blob.

Above, different inventive embodiments and aspects have been described in a chapter "Solutions", in a chapter "Volumetric video in gITF and animations", in a chapter "Channel transformations" and in a chapter "Dynamic Animation".

Also, further embodiments will be defined by the enclosed claims.

It should be noted that any embodiments as defined by the claims can be supplemented by any of the details (features and functionalities) described in the above mentioned chapters.

Also, the embodiments described in the above mentioned chapters can be used individually, and can also be supplemented by any of the features in another chapter, or by any feature included in the claims.

Also, it should be noted that individual aspects described herein can be used individually or in combination. Thus, details can be added to each of said individual aspects without adding details to another one of said aspects.

It should also be noted that the present disclosure describes, explicitly or implicitly, features usable in an encoder and in a decoder. Thus, any of the features described herein can be used in the context of an encoder and in the context of a decoder.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as will be described in the section "implementation alternatives".

Implementation Alternatives:

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream [e.g. the scene description data] or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus comprising a microprocessor or electronic circuit, configured to
  receive scene description data,
  acquire, from the scene description data, first data defining a 3D object;
  acquire, from the scene description data, second data triggering an animation of the 3D object,
  apply the animation to the 3D object dependent on a mode parameter comprised by the second data, by selecting a selected animation mode among a set of animation modes according to the mode parameter and applying the animation to the 3D object according to the selected animation mode, the set of animation modes comprising
    applying the animation to the 3D object repeatedly in loops with starting each loop from an initial pose of the 3D object, and
    applying the animation to the 3D object repeatedly in loops with using a pose assumed by the 3D object at the end of one loop for starting a subsequent loop, and
    applying the animation to the 3D object with maintaining a pose assumed by the 3D object at the end of the animation, and
    applying the animation to the 3D object with returning to a pose assumed by the 3D object upon a start of the application of the animation to the 3D object.

2. An apparatus comprising a microprocessor or electronic circuit, configured to
  receive scene description data,
  acquire, from the scene description data, first data defining a 3D object;
  acquire, from the scene description data, second data triggering an animation of the 3D object,
  apply a temporal subinterval of the animation or of a cyclic application of the animation to the 3D object based on a trimming parameter comprised by the second data, wherein the trimming parameter controls as to which temporal subinterval of the animation or of a cyclic application of the animation is to be applied to the 3D object by the apparatus,
  wherein the trimming parameter indicates a start frame and an end frame of the temporal subinterval of the animation or of the cyclic application of the animation to be applied to the 3D object.

3. The apparatus according to claim 2, configured to
  apply the animation to the 3D object dependent on a mode parameter comprised by the second data, according to one of several animation modes, comprising one or more of
    apply the animation to the 3D object repeatedly in loops with starting each loop from an initial pose of the 3D object, and
    apply the animation to the 3D object repeatedly in loops with using a pose assumed by the 3D object at the end of one loop for starting a subsequent loop, and apply the animation to the 3D object with maintaining a pose assumed by the 3D object at the end of the animation, and apply the animation to the 3D object with returning to a pose assumed by the 3D object upon a start of the application of the animation to the 3D object, and apply the animation to the 3D object in reverse with starting from a pose assumed by the 3D object at the end of a previously applied animation.

4. An apparatus comprising a microprocessor or electronic circuit, configured to receive scene description data, acquire, from the scene description data, first data defining a 3D object;

acquire, from the scene description data, second data triggering an animation of the 3D object, and amplify or dampen pose movements of the 3D object caused by the animation using a weighting parameter comprised by the second data, a) wherein the animation triggered by the second data represents a first animation of the 3D object, and the apparatus is configured to acquire, from the scene description data, third data triggering a second animation of the 3D object, and apply the first animation and the second animation to the 3D object so that the first animation and the second animation are running simultaneously at least for a certain time interval, wherein the first animation of the 3D object is defined in the scene description data in a manner decomposed into a first set of channels and the second animation of the 3D object is defined in the scene description data in a manner decomposed into a second set of channels, wherein for each channel of the first set of channels, the respective channel defines a pose movement for a joint of the 3D object and wherein for each channel of the second set of channels, the respective channel defines a pose movement for a joint of the 3D object, wherein the apparatus is configured to apply pose movements defined by one or more channels of the first set of channels to the same joints as pose movements defined by one or more channels of the second set of channels, and the apparatus is configured to, using the weighting parameter comprised by the second data, amplify or dampen the pose movements defined by the one or more channels of the first set of channels and leave the pose movements of the 3D object caused by the first animation uninfluenced with respect to remaining channels, and the apparatus is configured to, using another weighting parameter comprised by the third data, amplify or dampen the pose movements defined by the one or more channels of the second set of channels and leave the pose movements of the 3D object caused by the second animation uninfluenced with respect to remaining channels, or b) the animation triggered by the second data represents a first animation of the 3D object, and the apparatus is configured to acquire, from the scene description data, third data triggering a second animation of the 3D object, and apply the first animation and the second animation to the 3D object so that the first animation and the second animation are running simultaneously at least for a certain time interval, wherein the first animation of the 3D object is defined in the scene description data in a manner decomposed into a first set of channels and the second animation of the 3D object is defined in the scene description data in a manner decomposed into a second set of channels, wherein for each channel of the first set of channels, the respective channel defines a pose movement for a joint of the 3D object and wherein for each channel of the second set of channels, the respective channel defines a pose movement for a joint of the 3D object, wherein the apparatus is configured to apply pose movements defined by one or more channels of the first set of channels the same joints as pose movements defined by one or more channels of the second set of channels, and the apparatus is configured to, using the weighting parameter comprised by the second data, amplify or dampen the pose movements defined by the one or more channels of the first set of channels and the apparatus is configured to infer a further weighting parameter and, using the further weighting parameter, amplify or dampen the pose movements of the 3D object caused by the first animation with respect to remaining channels, and the apparatus is configured to, using another weighting parameter comprised by the third data, amplify or dampen the pose movements defined by the one or more channels of the second set of channels and the apparatus is configured to infer a further another weighting parameter and, using the further another weighting parameter, amplify or dampen the pose movements of the 3D object caused by the second animation with respect to remaining channels, or c) the animation triggered by the second data represents a first animation of the 3D object, and the apparatus is configured to acquire, from the scene description data, third data triggering a second animation of the 3D object, and apply the first animation and the second animation to the 3D object so that the first animation and the second animation are running simultaneously at least for a certain time interval, wherein the first animation of the 3D object is defined in the scene description data in a manner decomposed into a first set of channels and the second animation of the 3D object is defined in the scene description data in a manner decomposed into a second set of channels, wherein for each channel of the first set of channels, the respective channel defines a pose movement for a joint of the 3D object and wherein for each channel of the second set of channels, the respective channel defines a pose movement for a joint of the 3D object, wherein the apparatus is configured to apply pose movements defined by one or more channels of the first set of channels to the same joints as pose movements defined by one or more channels of the second set of channels, and the apparatus is configured to, using the weighting parameter comprised by the second data, amplify or dampen the pose movements defined by the one or more channels of the first set of channels and the apparatus is configured to, using a further weighting parameter comprised by the second data, amplify or dampen the pose movements of the 3D object caused by the first animation with respect to remaining channels, and the apparatus is configured to, using another weighting parameter comprised by the third data, amplify or dampen the pose movements defined by the one or more channels of the second set of channels and the apparatus is configured to, using a further another weighting parameter comprised by the third data, amplify or dampen the pose movements of the 3D object caused by the second animation with respect to remaining channels.

5. The apparatus of claim 4, wherein the animation of the 3D object is defined in the scene description data in a manner decomposed into channels and the apparatus is configured to, using the weighting parameter, amplify or dampen the pose movements of the 3D object caused by the animation dependent on the channel with which the respective pose movement is associated.

6. The apparatus of claim 4, wherein the animation of the 3D object is defined in the scene description data in a manner decomposed into channels and the apparatus is configured to, using the weighting parameter, amplify or dampen the pose movements of the 3D object caused by the animation specifically with respect to one or more predetermined channels and leave the pose movements of the 3D object caused by the animation uninfluenced with respect to remaining channels.

7. The apparatus of claim 4, wherein the animation of the 3D object is defined in the scene description data in a manner decomposed into channels and the apparatus is configured to, using the weighting parameter, amplify or dampen the pose movements of the 3D object caused by the animation specifically with respect to one or more predetermined channels and the apparatus is configured to infer a second weighting parameter by setting the second weighting parameter to a predetermined value and, using the second weighting parameter, amplify or dampen the pose movements of the 3D object caused by the animation with respect to one or more second channels.

8. The apparatus of claim 4, wherein the animation of the 3D object is defined in the scene description data in a manner decomposed into channels and the apparatus is configured to, using the weighting parameter, amplify or dampen the pose movements of the 3D object caused by the animation specifically with respect to one or more predetermined channels and the apparatus is configured to, using another weighting parameter comprised by the second data, amplify or dampen pose movements of the 3D object caused by the animation with respect to one or more further channels.

9. The apparatus of claim 4, configured to add the second animation to the first animation so that a combined animation is applied to the 3D object, wherein the apparatus is configured to acquire the combined animation by forming a sum of pose movements caused by the first animation and the second animation, divided by a number of animations adding to the combined animation.

10. The apparatus of claim 4, wherein the apparatus is configured to apply the first animation to the 3D object during a first time interval triggered by the second data, and wherein the apparatus is configured to apply the second animation to the 3D object during a second time interval triggered by the third data, wherein the first time interval and the second time interval are at least partially overlapping so that the first animation and the second animation are running simultaneously at least for the certain time interval, wherein the apparatus is configured to add the second animation to the first animation so that a combined animation is applied to the 3D object during the certain time interval, wherein the apparatus is configured to acquire the combined animation by forming a sum of pose movements caused by the first animation and the second animation, divided by a number of animations adding to the combined animation.

11. The apparatus of claim 10, configured to, using the weighting parameter, amplify or dampen the pose movements of the 3D object caused by the first animation and the second animation during the certain time interval using a first scaling and during the remaining first time interval using a second scaling and/or during the remaining second time interval using a third scaling.

12. The apparatus of claim 4, configured to, using two or more weighting parameter comprised by the second data, amplify or dampen pose movements of the 3D object caused by the animation.

13. The apparatus of claim 4, wherein the scene description data is a gITF file.

14. An apparatus comprising a microprocessor or electronic circuit, configured to receive scene description data, acquire, from the scene description data, first data defining a 3D object;

acquire, from the scene description data, second data triggering an animation of the 3D object, acquire, from the scene description data, third data triggering a second animation of the 3D object, apply the first animation and the second animation to the 3D object so that the first animation and the second animation are running simultaneously at least for a certain time interval, wherein the apparatus is configured to apply the second animation to the 3D object based on an inter-animation-control parameter comprised by the third data, wherein the inter-animation-control parameter discriminates between different animation combination modes, comprising two or more of applying the second animation overriding the first animation so that the first animation is not applied to the 3D object as long as the second animation lasts;

applying the second animation overriding the first animation with respect to a portion of the 3D object affected by the first animation;

adding the second animation to the first animation so that a combined animation is applied to the 3D object, wherein the combined animation is acquired by forming a sum of pose movements caused by the first animation and the second animation, divided by a number of animations adding to the combined animation, adding the second animation to the first animation so that a combined animation is applied to the 3D object, wherein the combined animation is acquired by forming a sum of pose movements of the first animation and the second animation.

15. The apparatus of claim 14, configured to apply the first and second animation to the 3D object dependent on animation IDs, wherein a first animation ID is associated with the first animation and a second animation ID is associated with the second animation.

16. An apparatus comprising a microprocessor or electronic circuit, configured to receive scene description data, acquire, from the scene description data, first data defining a 3D object and a movement of the 3D object;

acquire, from the scene description data, second data triggering an animation of the 3D object, wherein the apparatus is configured to apply the animation based on an animation-movement-interaction-control parameter comprised by the second data, wherein the animation-movement-interaction-control parameter discriminates between different modes of applying the animation to the 3D object, comprising two or more of applying the animation in a manner overriding the movement defined by the first data by using a pose of the 3D object at the time instant at which the animation is triggered by the second data as an initial pose of the 3D object to which the animation is applied;

applying the animation in a manner overriding the movement defined by the first data by using a default pose as an initial pose of the 3D object to which the animation is applied instead of the pose of the 3D object at the time instant at which the animation is triggered by the second data; and applying the animation to the 3D object in a manner acting on the 3D object along with the movement defined by the first data.

17. The apparatus of claim 16, wherein the apparatus is configured to apply the second animation to the 3D object in a manner acting on the 3D object along with the movement of the 3D object using a weighting parameter comprised by the first data to amplify or dampen the movement of the 3D object defined by the first data and/or a weighting parameter comprised by the second data to amplify or dampen pose movements of the 3D object caused by the animation, and/or wherein the apparatus is configured to, in case of the animation-movement-interaction-control parameter indicating the mode, applying the animation to the 3D object in a manner acting on the 3D object along with the movement defined by the first data using a weighting parameter comprised by the first data to amplify or dampen the movement of the 3D defined by the first data and/or a weighting parameter comprised by the second data to amplify or dampen pose movements of the 3D object caused by the animation.

18. The apparatus of claim 17, wherein the animation of the 3D object is defined in the scene description data in a manner decomposed into channels and the apparatus is configured to, using the weighting parameter comprised by the second data, amplify or dampen the pose movements of the 3D object caused by the animation dependent on the channel with which the respective pose movement is associated.

19. The apparatus of claim 17, wherein the movement of the 3D object is defined in the scene description data in a manner decomposed into channels and the apparatus is configured to, using the weighting parameter comprised by the first data, amplify or dampen individual movements corresponding to the movement of the 3D object defined by the first data dependent on the channel with which the respective individual movement is associated.

20. The apparatus of claim 16, configured to acquire, from the scene description data, third data defining a further 3D object and a movement of the further 3D object, and acquire, from the scene description data, a weighting parameter associated with an object identification, wherein the apparatus is configured to decide based on the object identification whether the weighting parameter is to be used to amplify or dampen the movement of the 3D object or the movement of the further 3D object.

* * * * *